US012753871B2

(12) United States Patent
Burns

(10) Patent No.: US 12,753,871 B2
(45) Date of Patent: Oct. 6, 2026

(54) VEE MANIFOLD WITH AT LEAST THREE FLOW CHANNELS

(71) Applicant: Rooftop Research, LLC, New Wilmington, PA (US)

(72) Inventor: Robert S. Burns, New Wilmington, PA (US)

(73) Assignee: Rooftop Research, LLC, New Wilmington, PA (US)

( * ) Notice: Subject to any disclaimer, the term of this patent is extended or adjusted under 35 U.S.C. 154(b) by 92 days.

(21) Appl. No.: 18/816,435

(22) Filed: Aug. 27, 2024

(65) Prior Publication Data

US 2026/0063231 A1 Mar. 5, 2026

(51) Int. Cl.
*F16L 41/02* (2006.01)
*B67D 3/00* (2006.01)
*E04D 15/07* (2006.01)

(52) U.S. Cl.
CPC .......... *F16L 41/023* (2013.01); *B67D 3/0012* (2013.01); *E04D 15/07* (2013.01)

(58) Field of Classification Search
CPC ..... F16L 41/023; B67D 3/0012; E04D 15/07; E04D 5/148
See application file for complete search history.

(56) References Cited

U.S. PATENT DOCUMENTS

| | | | |
|---|---|---|---|
| 2,112,160 A | | 3/1938 | Johnson |
| 2,125,542 A | | 8/1938 | Catterlin |
| 3,223,083 A | | 12/1965 | Cobey |
| 3,390,814 A | | 7/1968 | Creighton, Jr. et al. |
| 3,558,063 A | * | 1/1971 | Goff ........................ E04D 15/07 239/431 |
| 3,884,388 A | | 5/1975 | Holcomb |
| 4,121,739 A | | 10/1978 | Devaney et al. |
| 4,506,665 A | | 3/1985 | Andrews et al. |
| 4,557,261 A | | 12/1985 | Reugheimer |
| 4,852,387 A | | 8/1989 | Bingham |

(Continued)

FOREIGN PATENT DOCUMENTS

| | | | |
|---|---|---|---|
| WO | WO 9639212 | A2 | 12/1996 |
| WO | WO2010/095047 | A2 | 8/2010 |

OTHER PUBLICATIONS

Huyett, Pipe Thread Basics, 2021. https://www.huyett.com/attachment/get/1288620/6254465d6a2c4926356586.pdf.

*Primary Examiner* — David Bochna
(74) *Attorney, Agent, or Firm* — Dority & Manning, P.A.

(57) ABSTRACT

An exit portion of a manifold configured for a first substance and a second substance to travel therethrough is provided. The exit portion includes a connection portion defining a connection portion longitudinal axis; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

35 Claims, 41 Drawing Sheets

(56) References Cited

U.S. PATENT DOCUMENTS

| | | | |
|---|---|---|---|
| 4,852,563 | A | 8/1989 | Gross |
| 4,979,942 | A | 12/1990 | Wolf et al. |
| 5,104,375 | A | 4/1992 | Wolf et al. |
| 5,116,315 | A | 5/1992 | Capozzi et al. |
| 5,309,906 | A | 5/1994 | LaBombard |
| 5,324,274 | A | 6/1994 | Martin |
| 5,344,074 | A | 9/1994 | Spriggs et al. |
| 5,443,183 | A | 8/1995 | Jacobsen et al. |
| 5,464,396 | A | 11/1995 | Barta et al. |
| 5,474,540 | A | 12/1995 | Miller et al. |
| 5,558,124 | A | 9/1996 | Randall |
| 5,575,767 | A | 11/1996 | Stevens |
| 5,582,596 | A | 12/1996 | Fukunaga et al. |
| 5,665,067 | A | 9/1997 | Linder et al. |
| 5,676,280 | A | 10/1997 | Robinson |
| 5,887,755 | A | 3/1999 | Hood, III |
| 6,047,729 | A | 4/2000 | Hollister et al. |
| 6,132,396 | A | 10/2000 | Antanavich et al. |
| 6,161,730 | A | 12/2000 | Heusser et al. |
| 6,202,698 | B1 | 3/2001 | Stearns |
| 6,527,749 | B1 | 3/2003 | Roby et al. |
| 6,764,026 | B2 | 7/2004 | Hunter et al. |
| 6,811,096 | B2 | 11/2004 | Frazier et al. |
| 6,832,621 | B1 | 12/2004 | Williams |
| 6,936,033 | B2 | 8/2005 | McIntosh et al. |
| 6,994,686 | B2 | 2/2006 | Cruise et al. |
| 7,037,694 | B2 | 5/2006 | Aksenov et al. |
| 7,290,541 | B2 | 11/2007 | Ivri et al. |
| 7,641,075 | B2 | 1/2010 | Crews |
| 8,088,099 | B2 | 1/2012 | McIntosh et al. |
| 8,152,777 | B2 | 4/2012 | Campbell et al. |
| 9,242,846 | B2 | 1/2016 | Burns |
| 10,610,837 | B2 | 4/2020 | Burns |
| 12,023,705 | B2 | 7/2024 | Burns |
| 2003/0069537 | A1 | 4/2003 | Spero et al. |
| 2003/0191496 | A1 | 10/2003 | Edwards et al. |
| 2003/0209612 | A1 | 11/2003 | Hahnen |
| 2007/0187434 | A1 | 8/2007 | Schrafel |
| 2008/0144426 | A1 | 6/2008 | Janssen et al. |
| 2009/0038701 | A1 | 2/2009 | Delmotte |
| 2009/0108091 | A1 | 4/2009 | Steffen |
| 2009/0266918 | A1 | 10/2009 | Fortier et al. |
| 2010/0249829 | A1 | 9/2010 | Rissman et al. |
| 2011/0092899 | A1 | 4/2011 | Ohri et al. |
| 2011/0268845 | A1 | 11/2011 | Fantappie |
| 2011/0282381 | A1 | 11/2011 | Cronin et al. |
| 2012/0012054 | A1 | 1/2012 | Galvin et al. |
| 2012/0035335 | A1 | 2/2012 | Ladet et al. |
| 2012/0292343 | A1 | 11/2012 | Zimmerman et al. |
| 2020/0062574 | A1 | 2/2020 | Burns |
| 2020/0197884 | A1 | 6/2020 | Burns |
| 2020/0246816 | A1 | 8/2020 | Burns |

* cited by examiner

SECTION A-A

DETAIL B

FIG. 24
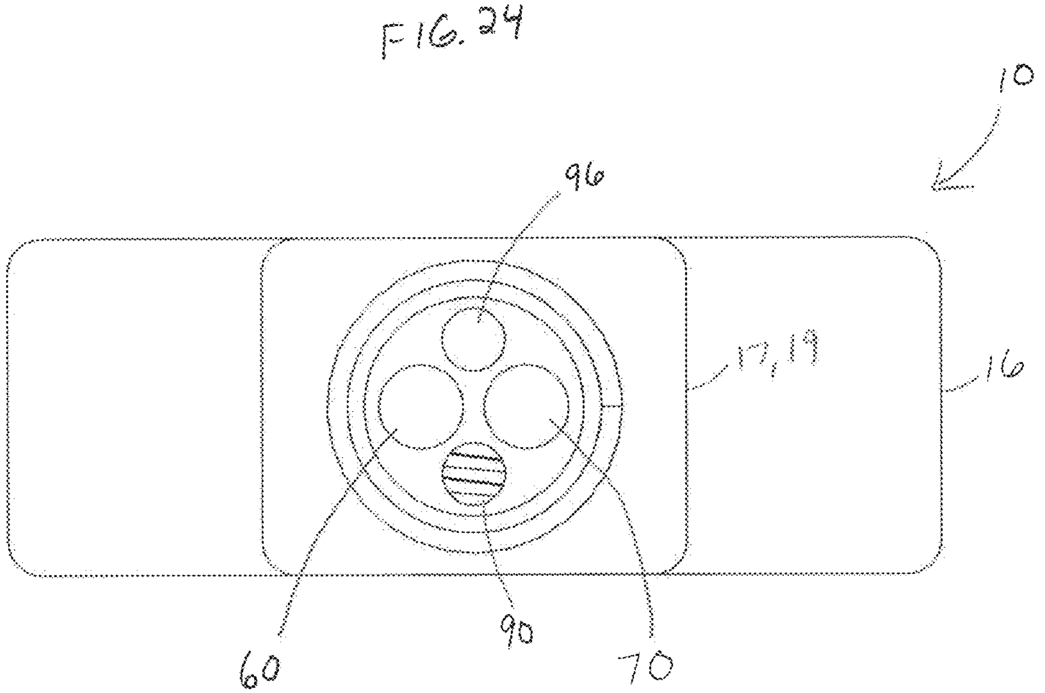
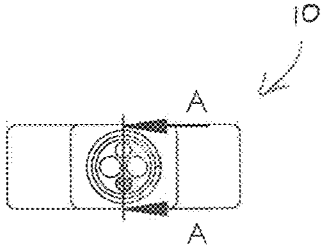
FIG. 25
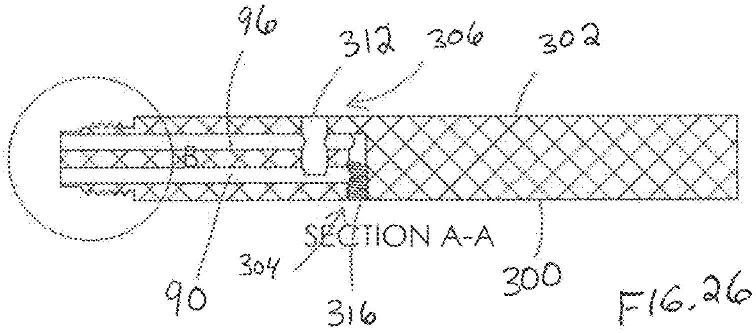
FIG. 26
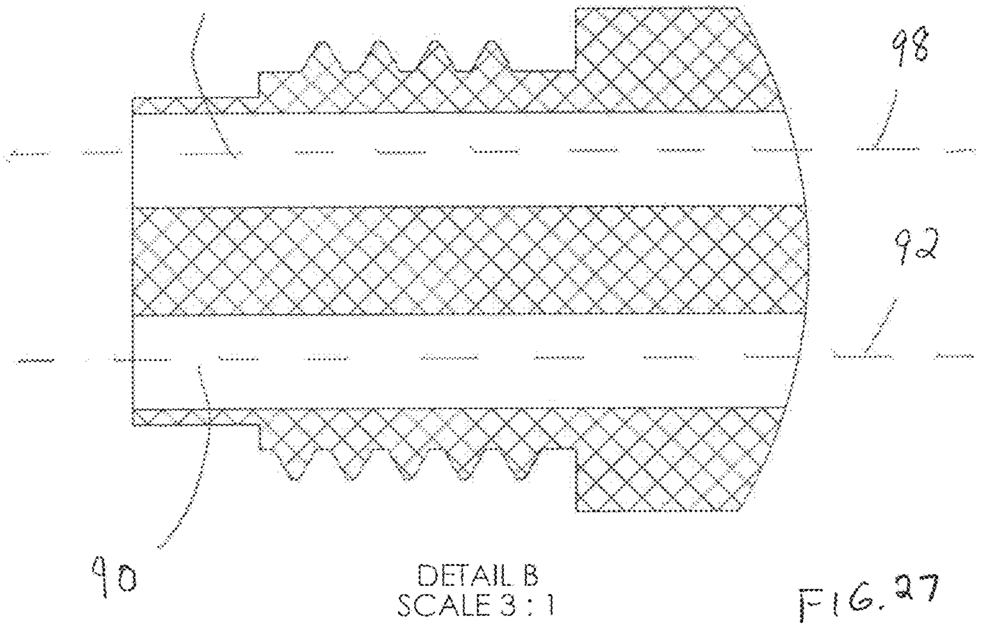
DETAIL B
SCALE 3 : 1
FIG. 27

SECTION A-A

DETAIL B

SECTION A-A

SECTION A-A
SCALE 1 : 3

REDUCED DIAMETER INSERT

SECTION A-A

FIG. 71
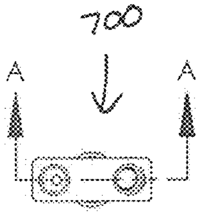
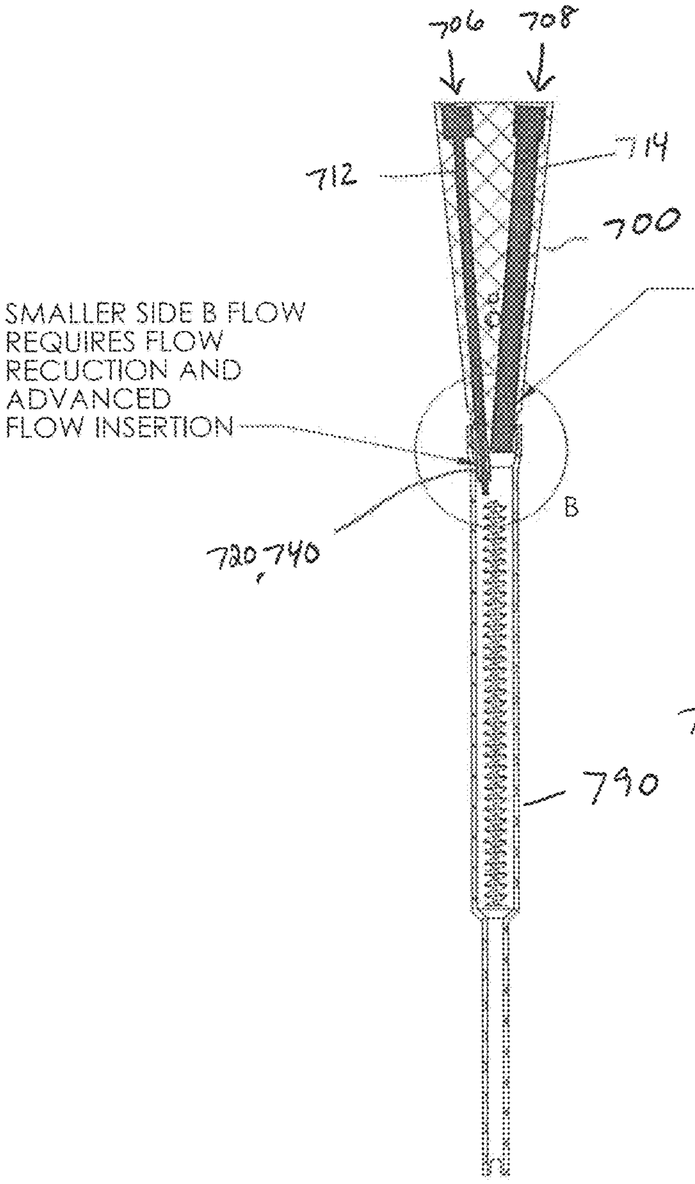
FIG. 72
SECTION A-A
SCALE 1 : 4
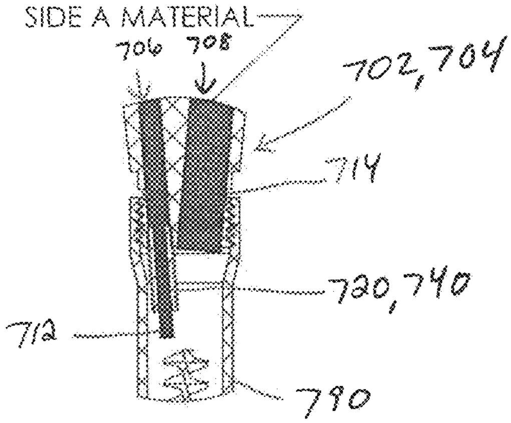
DETAIL B
SCALE 1 : 2
FIG. 73

SECTION A-A

DETAIL B

SECTION A-A

SECTION A-A

SECTION A-A

VEE MANIFOLD WITH AT LEAST THREE FLOW CHANNELS

FIELD OF THE INVENTION

The present subject matter relates to an improved manifold for dispensing of multiple component adhesives and other liquids or substances. More particularly, the present subject matter provides an improved manifold that is easily cleanable and includes an air channel.

BACKGROUND OF THE INVENTION

The delivery of liquid materials through tubing, hoses, or pipes is simple and well known. Differing materials traveling concurrently through separate tubes are also common. It is frequently desirable for differing materials traveling through multiple tubes to converge into one tube. As liquids flow towards this point of convergence, the contour of the tube path will impact the flow performance of the liquid, increase or decrease the frictional resistance of the liquid, and affect the ease with which the tubes can be maintained, cleaned or unclogged.

The joining of multiple liquids requires a special tubing manifold such as a wye manifold. The design of the adapter is critical to liquid delivery performance. This apparatus is particularly important when used by an operator to apply a multiple component liquid such as a coating or an adhesive to a surface.

The wye manifold derives its name from the fact that it has a generally Y-shaped body or housing when it is configured to interconnect two upper tubular strings ("chemical feed tubes") to a single lower tubular string ("discharge tube"). As used herein, the term "wye manifold" includes configurations in which two or more chemical hoses are interconnected to another discharge tube by the wye manifold body or housing.

A prior art dual manifold, as illustrated in FIG. 5 of U.S. patent application publication 2012/0012054 A1 is used to apply two-part adhesives utilizing a wye manifold wherein the shape of an internal path is constructed with 90 degree angles as parallel first paths. The 90 degree angled paths are created from partially drilling faces of the wye manifold and connecting with a perpendicular path. Such prior art wye manifolds have flow paths with angles which require increased pressure for use.

In addition, when wye manifolds clog due to chemical reaction or physical change of the materials within, cleaning is not readily accomplished by applying pressure or by drilling due to the configuration of the internal pathways and the angles at which they are disposed within the manifold. Wye manifolds are often utilized for the purpose of merging the flow path of liquids. The merging of liquids frequently causes a chemical reaction with many multiple component coatings and adhesives. When the stream of materials is stopped or slowed, the chemicals begin to react right at this merge point. Often the curing of these liquids begins at the merge point and then progresses upstream past the angle change and up into the inlets of the wye manifold. The curing process results in clogging as the physical state changes from that of a liquid to a solid or gel. The resulting hardened mass takes on the shape of the wye. The inside walls of the wye manifold act like a mold while the materials set up and cure. This hardened mass could be forcibly moved downstream and out of the wye manifold if the shape of the tubing were straight. But the change in the angle of the flow path molds this mass into a shape with an elbow. This elbow of the mass is now locked into place by the angled elbow of the wye manifolds. If pressure is applied in an attempt to dislodge this clog, the hardened mass cannot flow past the corner and the wye manifold is clogged. It is not possible to eject this hardened mass by increasing the pressure of the fluids.

Restoring this wye manifold into a usable part is normally accomplished with mechanical means. A drill bit can be inserted into the outlet of wye. The spinning drill bit will remove the clogged mass from the lower part of the wye outlet. In order to access this opening, the downstream plumbing must be removed. Examples of downstream plumbing are spray nozzles and static mixing tips. In order to access the inlets of the wye manifolds, the liquid supply lines must also be removed. Cleaning out the manifold requires not only drilling up from the outlet and down through the inlet, but also a side plug must be removed to allow the drill to be inserted to clean out the horizontal portion of the clogged path. At that point, the drill bit can be inserted into each opening to clear out the hardened mass clog. This process is not only time consuming but extremely messy, expensive, and wasteful as the liquid in the supply lines usually flows out and cannot be recovered.

For overnight storage, the flow path of the wye manifold must be purged to prevent hardening of the materials. Additionally, it is often recommended that the outlets be filled with grease to prevent hardening. This shut down procedure at the end of each use is quite time consuming and the grease has to be purged prior to the next start up.

In view of the foregoing, it will be appreciated that a need exists for improved manifolds.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an exit portion of a manifold configured for a first substance and a second substance to travel therethrough is provided. The exit portion includes: a connection portion defining a connection portion longitudinal axis; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

In certain exemplary embodiments, the first channel is configured to receive the first substance.

In certain exemplary embodiments, the second channel is configured to receive the second substance.

In certain exemplary embodiments, the third channel is configured to receive a flow of air.

In certain exemplary embodiments, the first substance is a first part of a multiple component adhesive and the second substance is a second part of the multiple component adhesive.

In certain exemplary embodiments, the third channel is parallel to the connection portion longitudinal axis.

In certain exemplary embodiments, the third channel is oblique to the connection portion longitudinal axis.

In certain exemplary embodiments, the exit portion includes a fourth channel extending through the connection portion, the fourth channel defining a fourth channel longitudinal axis, wherein the fourth channel within the connection portion is oblique to the first channel and the second channel.

In certain exemplary embodiments, the fourth channel is configured to receive the flow of air. As the flow of air enters an air inlet port, the air travels to the third channel. In other exemplary embodiments, as the flow of air enters the air inlet port, the air travels to both the third channel and the fourth channel.

In certain exemplary embodiments, the connection portion defines a diameter of approximately 0.75 inches.

In certain exemplary embodiments, the connection portion includes a nose portion that has a diameter smaller than the connection portion, wherein the nose portion defines a diameter of approximately 0.655 inches.

In certain exemplary embodiments, the connection portion comprises a threaded connection portion.

In certain exemplary embodiments, the connection portion comprises a twist lock securing tab connection portion.

In certain exemplary embodiments, a distance between the first channel longitudinal axis and the second channel longitudinal axis at the exit portion is approximately 0.31 inches.

In another exemplary embodiment of the present disclosure, a manifold for a first substance and a second substance to travel therethrough is provided. The manifold includes a block having an inlet portion and an exit portion, the exit portion comprising a connection portion defining a connection portion longitudinal axis, wherein a first portion of the block defines an air inlet port; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the third channel is in fluid communication with the air inlet port, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

In certain exemplary embodiments, the first channel is configured to receive the first substance.

In certain exemplary embodiments, the second channel is configured to receive the second substance.

In certain exemplary embodiments, the third channel is configured to receive a flow of air.

In certain exemplary embodiments, the first substance is a first part of a multiple component adhesive and the second substance is a second part of the multiple component adhesive.

In certain exemplary embodiments, the third channel is parallel to the connection portion longitudinal axis.

In certain exemplary embodiments, the third channel is oblique to the connection portion longitudinal axis.

In certain exemplary embodiments, the manifold includes a fourth channel extending through the connection portion, the fourth channel defining a fourth channel longitudinal axis, wherein the fourth channel within the connection portion is oblique to the first channel and the second channel.

In certain exemplary embodiments, the fourth channel is configured to receive the flow of air. In certain exemplary embodiments, the fourth channel is parallel to the connection portion longitudinal axis and the third channel.

In certain exemplary embodiments, wherein the fourth channel is in fluid communication with the air inlet port.

In certain exemplary embodiments, a third portion of the block defines a grease port, wherein the first channel is in fluid communication with the grease port.

In certain exemplary embodiments, wherein the second channel is in fluid communication with the grease port.

In another exemplary embodiment of the present disclosure, a multiple component adhesive mixing system is provided. The multiple component adhesive mixing system includes a mixing component configured to mix a first substance and a second substance; and a manifold component connectable to the mixing component. The manifold component has an exit portion that includes: a connection portion defining a connection portion longitudinal axis; a first channel extending through the connection portion, the first channel defining a first channel longitudinal axis, the first channel is configured to receive the first substance; a second channel extending through the connection portion, the second channel defining a second channel longitudinal axis, the second channel is configured to receive the second substance; and a third channel extending through the connection portion, the third channel defining a third channel longitudinal axis, the third channel is configured to receive a flow of air, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

In certain exemplary embodiments, the mixing component includes an inlet portion.

In certain exemplary embodiments, the exit portion of the manifold component is connectable to the inlet portion of the mixing component.

In certain exemplary embodiments, the inlet portion of the mixing component defines a diameter of approximately 0.657 inches.

In certain exemplary embodiments, the connection portion defines a diameter of approximately 0.75 inches.

In certain exemplary embodiments, the connection portion includes a nose portion that has a diameter smaller than the connection portion, wherein the nose portion defines a diameter of approximately 0.655 inches.

In certain exemplary embodiments, the mixing component is a static mixing tip.

In another exemplary embodiment of the present disclosure, an exit portion of a manifold configured for a first substance and a second substance to travel therethrough is provided. The exit portion includes: a connection portion defining a connection portion longitudinal axis; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the first channel within the connection portion is parallel to the connection portion longitudinal axis, wherein the second channel within the connection portion is parallel to the connection portion longitudinal axis, and wherein the third channel within the connection portion is parallel to the connection portion longitudinal axis.

In certain exemplary embodiments, the first channel is configured to receive the first substance.

In certain exemplary embodiments, the second channel is configured to receive the second substance.

In certain exemplary embodiments, the third channel is configured to receive a flow of air.

In certain exemplary embodiments, the first substance is a first part of a multiple component adhesive and the second substance is a second part of the multiple component adhesive.

In certain exemplary embodiments, the exit portion includes a fourth channel extending through the connection portion, the fourth channel defining a fourth channel longitudinal axis, wherein the fourth channel within the connection portion is parallel to the connection portion longitudinal axis.

In certain exemplary embodiments, the fourth channel is configured to receive the flow of air.

In certain exemplary embodiments, the connection portion defines a diameter of approximately 0.75 inches.

In certain exemplary embodiments, the connection portion includes a nose portion that has a diameter smaller than the connection portion, wherein the nose portion defines a diameter of approximately 0.655 inches.

In certain exemplary embodiments, the connection portion comprises a threaded connection portion.

In certain exemplary embodiments, the connection portion comprises a twist lock securing tab connection portion.

In certain exemplary embodiments, a distance between the first channel longitudinal axis and the second channel longitudinal axis at the exit portion is approximately 0.31 inches.

In another exemplary embodiment of the present disclosure, in combination: an exit portion of a manifold configured for a first substance and a second substance to travel therethrough, the exit portion comprising: a connection portion defining a connection portion longitudinal axis; a first channel extending through the connection portion, the first channel defining a first channel longitudinal axis; and a second channel extending through the connection portion, the second channel defining a second channel longitudinal axis; and an insert removably connectable to the second channel, the insert defining an insert channel, wherein a diameter of the insert channel is less than a diameter of the second channel, is provided.

In certain exemplary embodiments, with the insert connected to the second channel, a first distance between an outlet of the insert channel and a first channel outlet of the first channel is greater than a second distance between a second channel outlet of the second channel and the first channel outlet of the first channel.

In certain exemplary embodiments, with the insert connected to the second channel, an outlet of the insert channel is spaced a greater distance from the connection portion than a first channel outlet of the first channel.

In certain exemplary embodiments, with the insert connected to the second channel, an outlet of the insert channel is located closer to the connection portion longitudinal axis than a first channel outlet of the first channel and a second channel outlet of the second channel.

In certain exemplary embodiments, the first channel is configured to receive the first substance.

In certain exemplary embodiments, the second channel is configured to receive the second substance.

In certain exemplary embodiments, a first viscosity of the first substance is higher than a second viscosity of the second substance.

In certain exemplary embodiments, with the insert connected to the second channel, the insert channel is configured to restrict a flow of the second substance through the insert channel.

In certain exemplary embodiments, with the insert connected to the second channel, the insert channel is configured to increase pressure of a flow of the second substance through the insert channel.

In certain exemplary embodiments, with the insert connected to the second channel, the insert is configured to promote more efficient mixing of the second substance with the first substance.

In certain exemplary embodiments, with the insert connected to the second channel, the second channel and the insert together define a longer length than the first channel.

In certain exemplary embodiments, the insert includes a removal portion configured to remove the insert from the second channel.

In another exemplary embodiment of the present disclosure, in combination: an exit portion of a manifold configured for a first substance and a second substance to travel therethrough, the exit portion comprising: a connection portion defining a connection portion longitudinal axis; a first channel extending through the connection portion, the first channel defining a first channel longitudinal axis; and a second channel extending through the connection portion, the second channel defining a second channel longitudinal axis; a first insert removably connectable to the second channel, the first insert defining a first insert channel, wherein the first insert channel defines a first length and a first diameter, wherein the first diameter of the first insert channel is less than a diameter of the second channel; and a second insert removably connectable to the second channel, the second insert defining a second insert channel, wherein the second insert channel defines a second length and a second diameter, wherein the second diameter of the second insert channel is less than a diameter of the second channel, and wherein the second length and the second diameter of the second insert channel are different than the first length and the first diameter of the first insert channel, is provided.

In another exemplary embodiment of the present disclosure, an exit portion of a manifold configured for a first substance and a second substance to travel therethrough is provided. The exit portion includes: a connection portion defining a connection portion longitudinal axis, the connection portion including an external connection portion; a first channel extending through the connection portion, the first channel defining a first channel longitudinal axis, wherein the first channel defines a first channel internal connection portion; and a second channel extending through the connection portion, the second channel defining a second channel longitudinal axis, wherein the second channel defines a second channel internal connection portion.

In certain exemplary embodiments, the exit portion further includes a mixing tip removably connectable to the external connection portion.

In certain exemplary embodiments, the exit portion further includes an insert removably connectable to the first channel internal connection portion.

In certain exemplary embodiments, the insert defines an insert channel, wherein a diameter of the insert channel is less than a diameter of the first channel.

In certain exemplary embodiments, with the insert connected to the first channel, an outlet of the insert channel is spaced a greater distance from the connection portion than a second channel outlet of the second channel.

In certain exemplary embodiments, the first channel is configured to receive the first substance.

In certain exemplary embodiments, the second channel is configured to receive the second substance.

In certain exemplary embodiments, a first viscosity of the first substance is lower than a second viscosity of the second substance.

In certain exemplary embodiments, with the insert connected to the first channel, the insert channel is configured to increase pressure of a flow of the first substance through the insert channel.

In certain exemplary embodiments, with the insert connected to the first channel, the insert is configured to promote more efficient mixing of the first substance with the second substance.

In certain exemplary embodiments, the insert includes a removal portion configured to remove the insert from the first channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 24 is an exit side view of a manifold in accordance with an exemplary embodiment of the present disclosure.

FIG. 25 is an exit side view of a manifold in accordance with an exemplary embodiment of the present disclosure.

FIG. 26 is a cross-sectional view taken along line A-A of FIG. 25 in accordance with an exemplary embodiment of the present disclosure.

FIG. 27 is an enlarged, cross-sectional view of FIG. 26 in accordance with an exemplary embodiment of the present disclosure.

FIG. 71 is an inlet end elevation view of a manifold in accordance with an exemplary embodiment of the present disclosure.

FIG. 72 is a cross-sectional view taken along line A-A of FIG. 71 with a static mixing tip connected to a manifold with an insert connected to a channel of the manifold in accordance with an exemplary embodiment of the present disclosure.

FIG. 73 is an enlarged, cross-sectional view of FIG. 72 in accordance with an exemplary embodiment of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
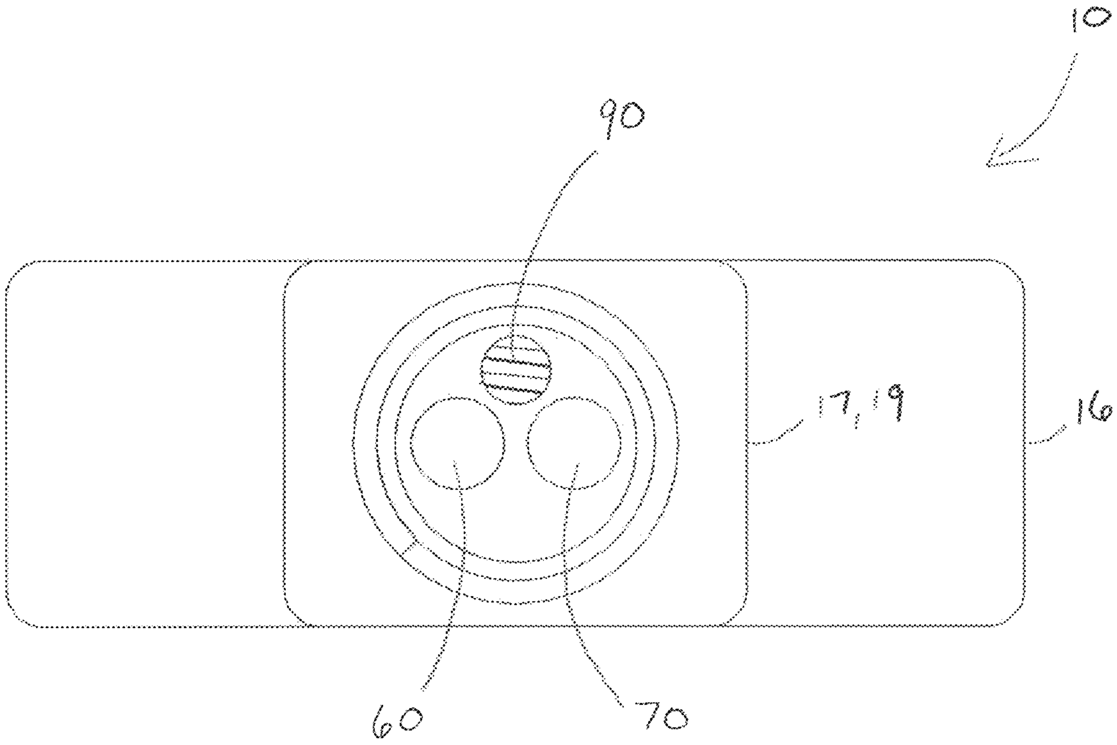
FIG. 1 is an exit side view of a manifold in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The quality and quantity of dual component fluid chemistry has continued to increase over the past 50 years. For these fluids to be useful the application devices have also been improving. A static mixing tip has been a key component to eliminate bucket and drill mixing. The standard dimensions of mixing tips receive the 2 materials in a very close, confined configuration. Less than 1.0" diameter is the standard. The 2 fluids must converge but stay separate until they are discharged from the separate fluid channels and into the tumult of the mixing tip. The challenge of discharging separate fluids from separate fluid containers into the confined space of a static mixing tip was resolved through the establishment of cartridges. These cartridges nested their individual exit ports in close proximity to each other to fit within the confines of the static mixing tip less than 1 ½" and usually ⅞" diameter connecting portion. These cartridges have worked very well for applications requiring less than about 1500 milliliters.

However, the popularity of the ever-evolving dual chemistry components has changed. Now there is a need to dispense from 5 gallon to 55 gallon containers rather than small cartridges. These larger containers are connected to separate hoses. The fluids then travel to the point of connection of the hoses to a manifold that must be configured to fit within the confines of static mixing tips. This transition is made more challenging by the valves and plumbing fittings at the end of the hose which increase the distance the hose to manifold ports must be.

This transition manifold, taking the fluids from far apart to less than 1½", also needs to be easily cleaned. A straight flow path aids in this portion of the manifold. Additional consideration must also be given to adding air to these fluids. The air serves to clean out the static mixing tips, but also provides a spattering effect to the newly formed fluid as it exits the static mixing tip. The spatter lands on a substrate in droplets that are bigger than aerated droplets created in prior art spray patterns.

The present invention incorporates the air channel, the first fluid channel, and the second fluid channel all within the confines of commercially available ⅞" static mixing tip diameter connection restraints.

Referring now to the drawings, wherein identical numerals indicate the same elements throughout the figures, FIGS. 1-15 illustrate a vee manifold or manifold 10 in accordance with an exemplary embodiment of the present disclosure. The vee manifold 10 offers a uniquely designed apparatus that provides for increased flow performance, at a reduced pressure, a flow path that is easily maintained as compared to prior art wye manifolds, and includes at least one air channel 90 configured to receive a flow of air. In this manner, the uniquely designed manifold 10 of the present disclosure is able to receive substances or fluids from far apart and then allow these substances or fluids to exit the manifold 10 within an exit portion only approximately 0.655 inches in diameter so the substances or fluids can be securely transferred to an inlet portion of a multiple component adhesive mixing tip 192 (FIGS. 37-41). The manifold 10 of the present disclosure is also configured to allow for the channels to be easily cleaned. The straight flow paths of the present disclosure allow for easy cleaning. Additionally, the manifold 10 of the present disclosure provides for an easy mechanism to allow for air to be added to these fluids or substances. The air serves to clean out the channels, but also provides a spattering effect to a newly formed fluid or substance as it exits the static mixing tip. The spatter lands on a substrate in droplets that are bigger than aerated droplets created in prior art spray patterns.

Referring to FIGS. 1-15, in an exemplary embodiment, the vee manifold or manifold 10 generally includes an inlet portion 11, inlets or apertures 12, a first or inlet connection portion 13, top or first side 14, block or body 16, an exit portion 17, a second or exit connection portion 19 defining a second or exit connection portion longitudinal axis 21, a bottom or second side 20, and outlets or apertures 22.

Figure 36:
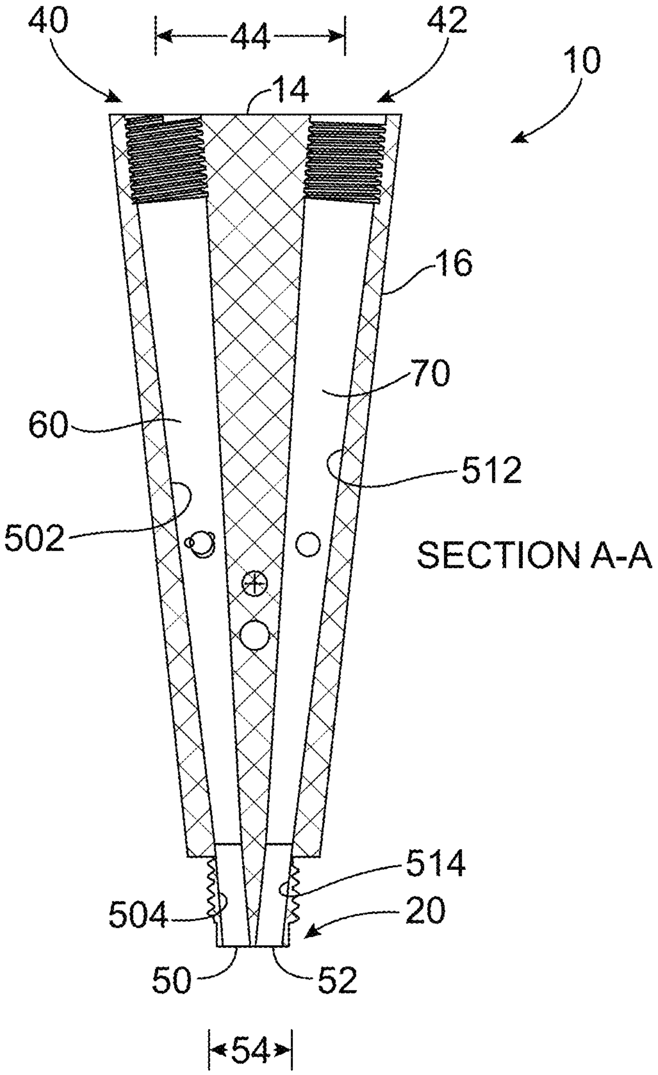
FIG. 36 is a cross-sectional view taken along line A-A of FIG. 35 in accordance with an exemplary embodiment of the present disclosure.
Figure 37:
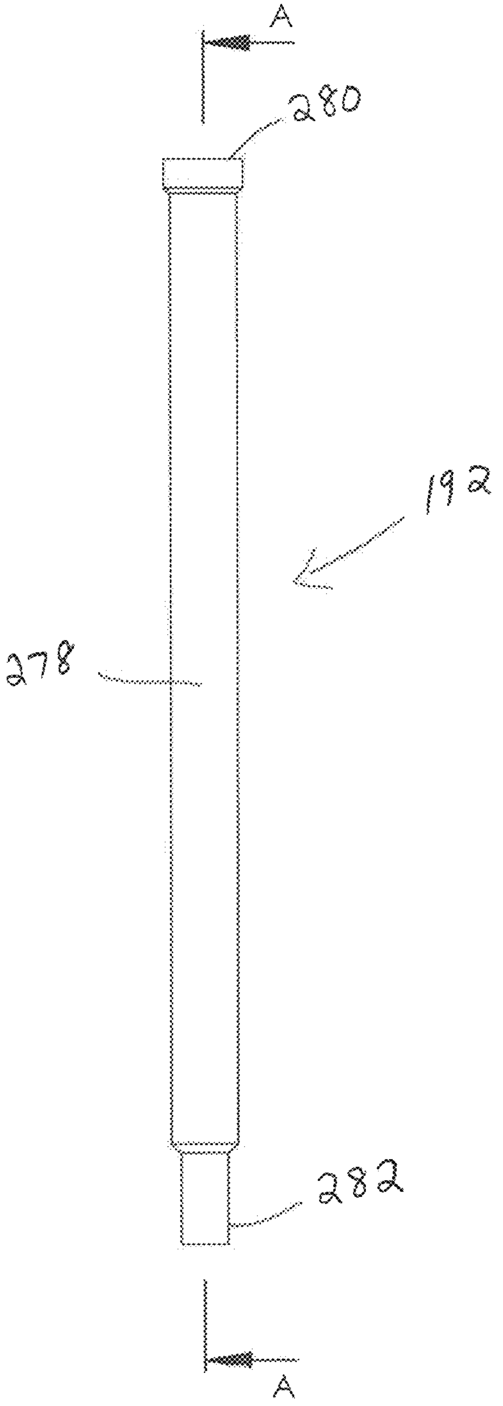
FIG. 37 is a side elevation view of a static mixing tip in accordance with an exemplary embodiment of the present disclosure.
Figure 38:
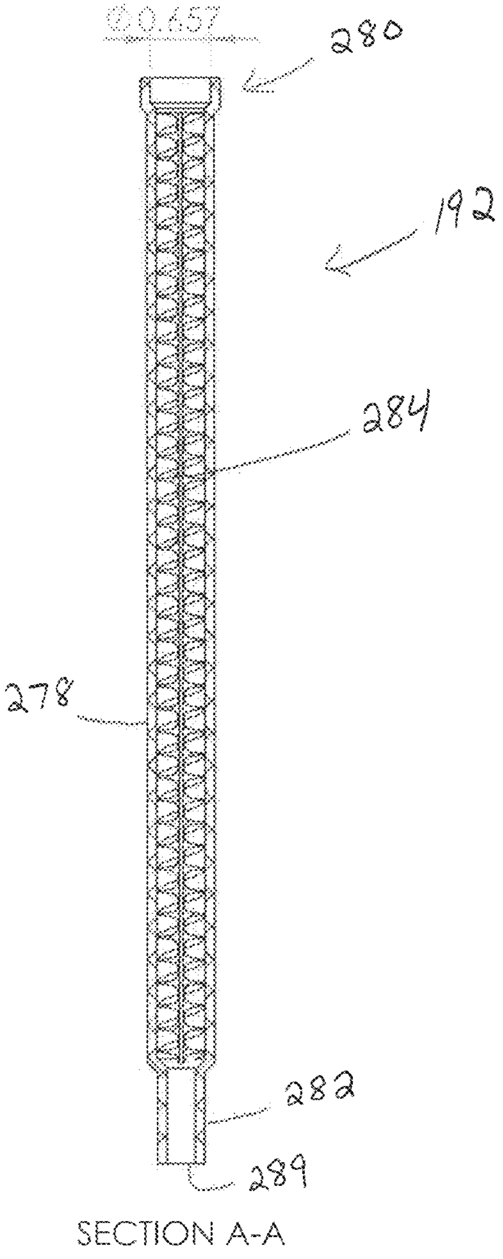
FIG. 38 is a cross-sectional view taken along line A-A of FIG. 37 in accordance with an exemplary embodiment of the present disclosure.

The manifold has a plurality of inlets or apertures 12 on a top or first side 14 of a block 16. For example, the first side 14 of the block 16 includes a first side first aperture 40 and a first side second aperture 42. Referring also to FIG. 36, the first side second aperture 42 is spaced a first distance 44 from the first side first aperture 40. In an exemplary embodiment, the first distance 44 is approximately 2 inches apart. In other exemplary embodiments, the first distance 44 is approximately 2 inches to approximately 4 inches apart. In other exemplary embodiments, with smaller or special pipe fittings, the first distance 44 may be approximately 1 inch to approximately 2 inches apart. In other exemplary embodiments, the first distance 44 may be approximately 3 inches to approximately 5 inches apart. In other exemplary embodiments, the first distance 44 may be approximately 5 inches to approximately 8 inches apart. In other exemplary embodiments, the first distance 44 may be approximately 7 inches to approximately 12 inches apart. Each of the inlets 12 may be independently configured as first or inlet connection means configured to connect to containers holding substances.

Figure 41:
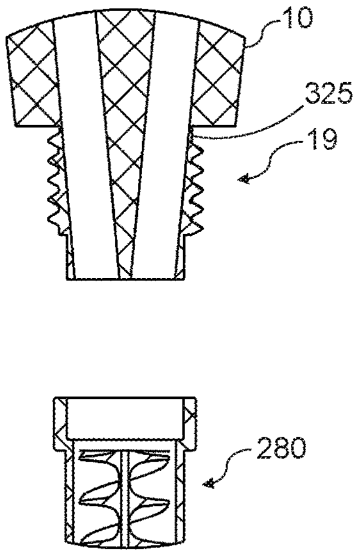
FIG. 41 is an enlarged, cross-sectional view of FIG. 40 in accordance with an exemplary embodiment of the present disclosure.
Figure 42:
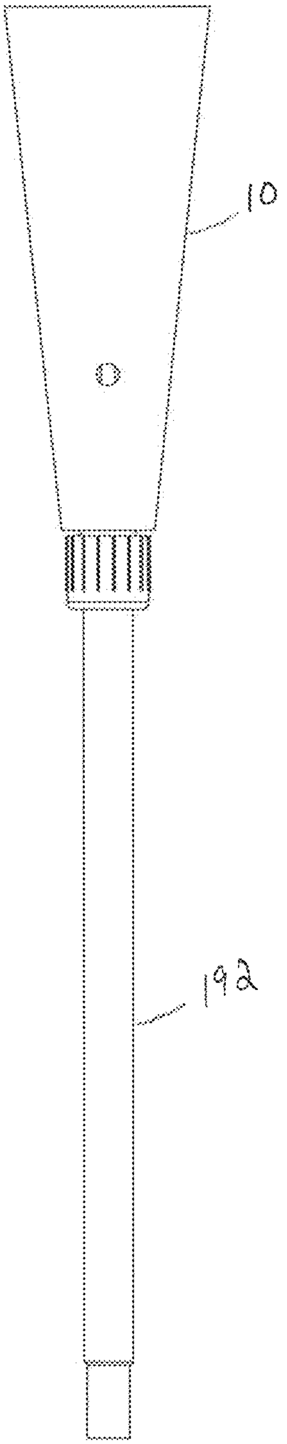
FIG. 42 is an assembled view of a manifold and a static mixing tip connected in accordance with an exemplary embodiment of the present disclosure.
Figure 43:
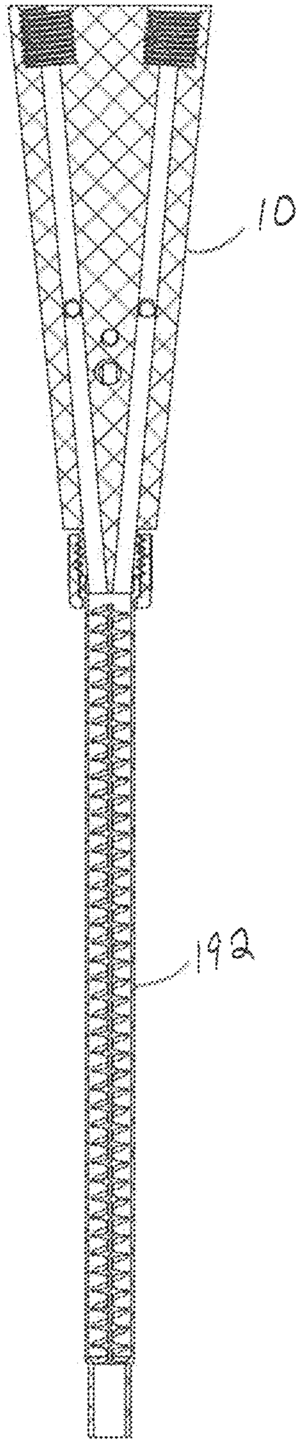
FIG. 43 is a cross-sectional view of FIG. 42 in accordance with an exemplary embodiment of the present disclosure.

It is also contemplated, in exemplary embodiments of the present disclosure, a maximum angle of the substance or chemical channels, e.g., channels 60, 70, is determined by the diameters of each of the channels, the distance between the channel apertures at the second side of the block, and the connection portion diameter. The greater the angle the closer the channel comes to an edge point or breach point 325 (FIG. 41). The length of the connection portion diameter impacts the location of the edge point or breach point 325. The longer the connection portion the lower the oblique angles of the substance or chemical channels, e.g., channels 60, 70. Consequentially, the lower the oblique angles the longer the dimension to adequate separation of the plumbing fittings or valves.

The block 16 of the vee manifold 10 has a bottom or second side 20 opposite the top side 14. The bottom side 20 has an outlet portion or outlet apertures 22. For example, the second side 20 of the block 16 includes a second side first aperture 50 and a second side second aperture 52. Referring also to FIG. 36, the second side second aperture 52 is spaced a second distance 54 from the second side first aperture 50. In an exemplary embodiment, the second distance 54 is approximately 0.31 inches apart. In other exemplary embodiments, the second distance 54 is approximately 0.10 inches to approximately 1.25 inches apart. A goal of the present disclosure is to bring the chemical substances close enough to each other to be impinged together and then this newly combined substance is pushed by the air within the confines of a static mixing tip which is connected by an interlocking attaching means. Therefore, the distances between the chemical or substance channel outlets at the second side 20 is necessarily very small.

Figure 52:
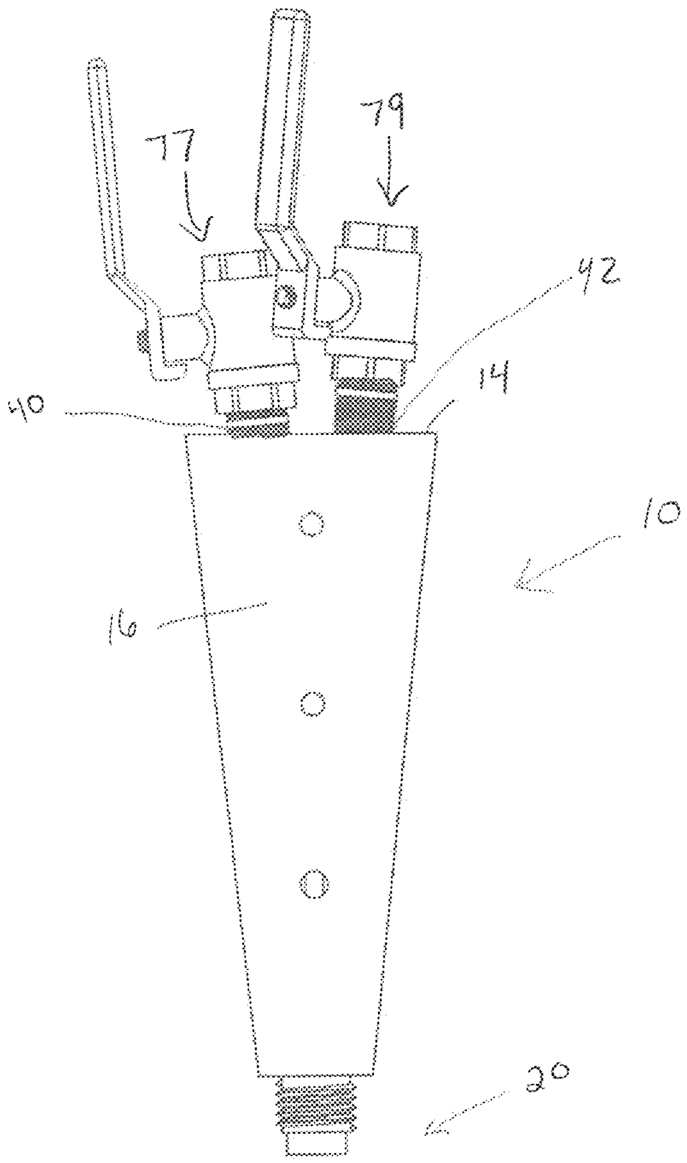
FIG. 52 is a perspective view of a manifold having ball valves that are too closely spaced together such that they are not able to function properly.
Figure 53:
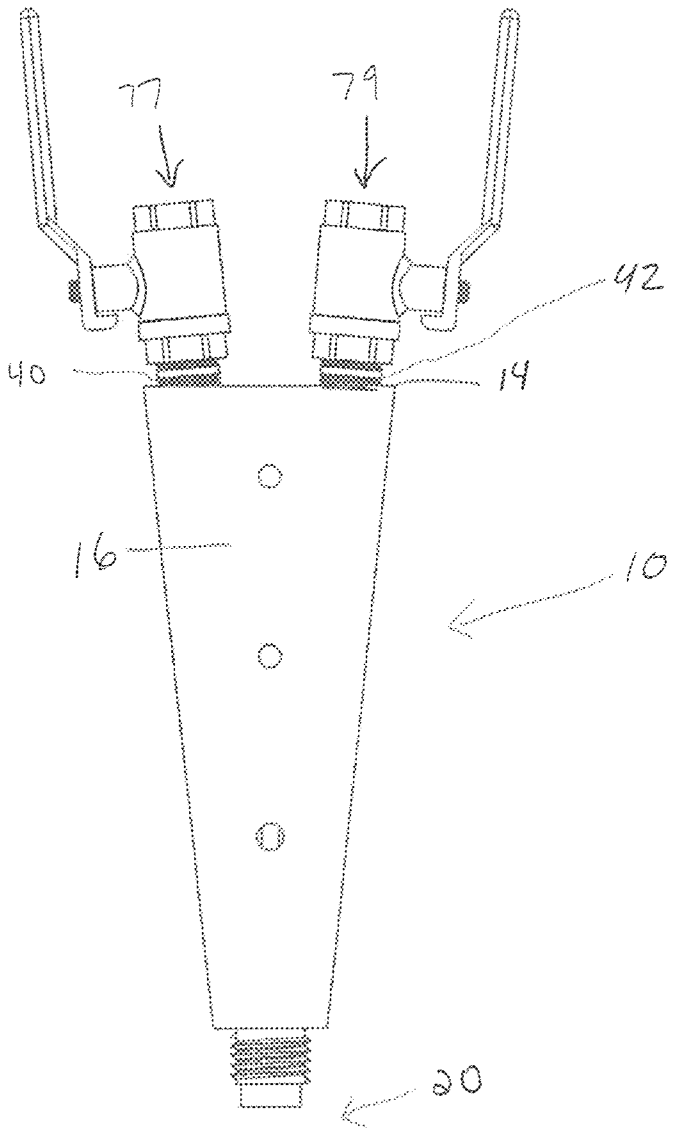
FIG. 53 is a perspective view of a manifold having ball valves properly spaced apart in accordance with an exemplary embodiment of the present disclosure.

In an exemplary embodiment, a plumbing fitting includes a closed thread pipe nipple connected to a ball valve. Ball valve handle stems are generally perpendicular to the ball valve flow. This arrangement causes a threaded connection to make several full turns around the axis of the chemical channel. When this stem travels in the direction of the second ball valve there must be enough room for the stem of the second ball valve to travel past the first ball valve. Referring to FIG. 52, in an embodiment where a distance between the inlet apertures 40, 42 is too close, then a first ball valve 77 and a second ball valve 79 are not able to function together. For example, the second ball valve 79 is physically prohibited from rotating past the first ball valve 77 and do not allow a sealable threaded connection. Referring to FIG. 53, in an exemplary embodiment of the present invention, the inlet ports and inlet apertures 40, 42 are positioned sufficiently apart from each other to allow for proper functioning of the first ball valve 77 and the second ball valve 79. As shown, the second ball valve 79 can be successfully rotated numerous times to create an effective sealed threaded connection.

Figure 48:
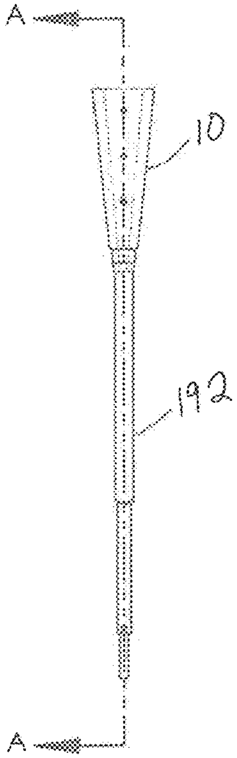
FIG. 48 is a first side elevation view of a manifold and a static mixing tip connected in accordance with an exemplary embodiment of the present disclosure.
Figure 49:
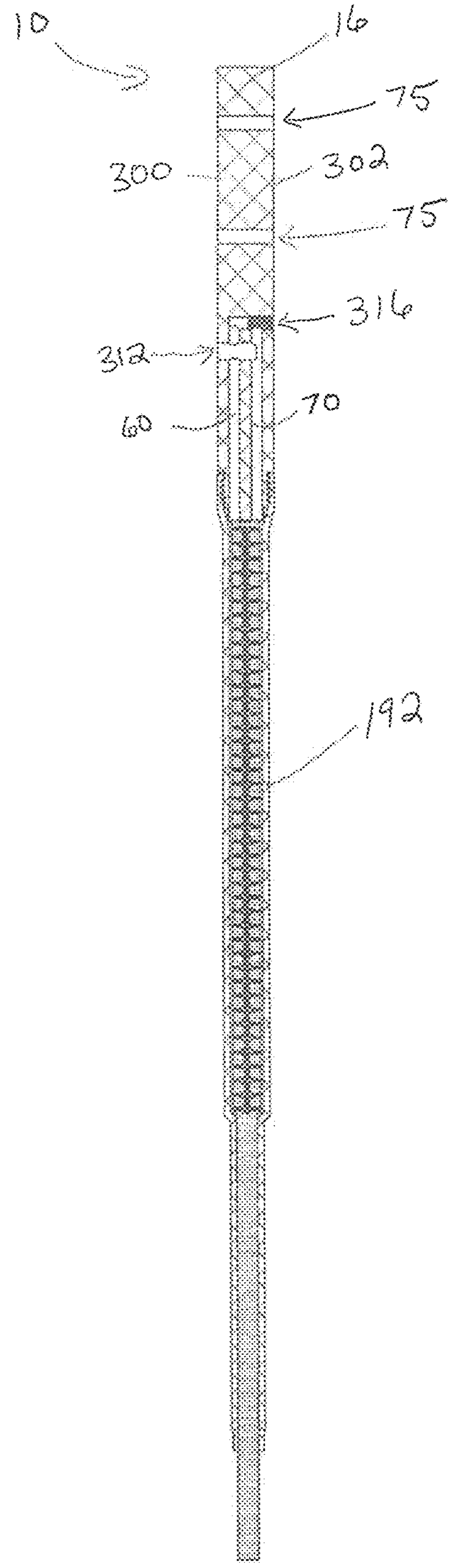
FIG. 49 is a cross-sectional view taken along line A-A of FIG. 48 in accordance with an exemplary embodiment of the present disclosure.

Importantly, referring to FIGS. 48 and 49, the separation of the two channels 60, 70 not only provides sufficient room for plumbing connections, but also allows a portion of the block 16 to define through holes or mounting holes 75 from first surface 300 to second surface 302. These through holes or mounting holes 75 allow for attachment of a handle, via bolts, in order that the operator may maneuver the block as desired.

In one embodiment, the block 16 of the vee manifold 10 between each of the plurality of inlets 12 and the outlet portion 22 defines straight, cylindrical channels 60, 70. For example, a first channel 60 defining a first channel longitudinal axis 62 (FIG. 10) extends from first side first aperture 40 to second side first aperture 50. In one embodiment, the first channel longitudinal axis 62 is linear. In other embodiments, the first channel 60 may define other geometrical shapes and configurations. Additionally, a second channel 70 defining a second channel longitudinal axis 72 (FIG. 10) extends from first side second aperture 42 to second side second aperture 52. In one embodiment, the second channel longitudinal axis 72 is linear. In other embodiments, the second channel 70 may define other geometrical shapes and configurations.

The first channel 60 is configured to receive a first chemical substance 80 (FIG. 44) to travel therethrough and the second channel 70 is configured to receive a second chemical substance 82 (FIG. 44) to travel therethrough. The first chemical substance 80 is a first part of a multiple component adhesive and the second chemical substance 82 is a second part of the multiple component adhesive, the first chemical substance 80 and the second chemical substance 82 are configured to cure upon contact and further cure upon further mixing to form a third homogeneous chemical substance 83. When the flow of the first and second chemical and pressurized air subsides, then the progressive advancement of increased chemical unification continues to occur without the aid of further mechanical stimulation. The material within the entire chamber of the static mixing tip changes state as the chemical reaction hardens into a newly formed substance. This newly formed substance often expands as it reacts. The expansive nature during the time of the reaction means the chemical reaction does not stop its'progressive reaction within the static tip. Rather, if no physical separation, such as a check valve, prevents the substances from advancing up into the upstream area of channels 60 and 70 this latent first or second substance are also vulnerable to the progressive chemical reaction and frequently becomes the hardened 3$^{rd}$ substance inside of the channels 60 and 70.

While some materials, like roofing insulation adhesives, combine 2 different chemicals, these chemicals have similar viscosities and are often combined at a ratio of 1:1. Other chemical combinations include dissimilar viscosities and differing ratios. Roof coatings are often formulated to mix at a ratio of 4 parts "A" component to 1 part "B" component. While the B component is usually of a low viscosity of about 3,000 centipoise it is the designed as the hardener. The A component is the usually the primary material with a volume of 4 parts and a viscosity that is much higher, approximately 150,000 centipoise. In order to accomplish adequate mixing of these differing volume and differing viscosity materials the present manifold is not only designed to bring the plumbing channels close together, but can also fabricated with to incorporate a design for successful mixing of various chemistries. Volumetric differences of a 4:1 ratio can be configured to have a 0.75" diameter hose for the larger volume and a 0.375" diameter hose to deliver the smaller volume B component chemical. The channels of the manifold can likewise adapted for this volumetric ratio difference for example a 0.50" channel for the higher volume A material and 0.25" channel for the B material. Achieving adequate mix for differing viscosities can be more challenging. The ratio of 150,000 cps to 3,000 is 50:1. This difference makes it difficult for the low viscosity material to penetrate into the high viscosity mass. The helix of the static mixing tip provides a combining and folding of the materials. The helix is often insufficient. High performance mixers help over come this difference, but even with that the dominate volume and thick viscosity can force the lighter B material to flow along the outer circumference of the mixer's housing.

Figure 9:
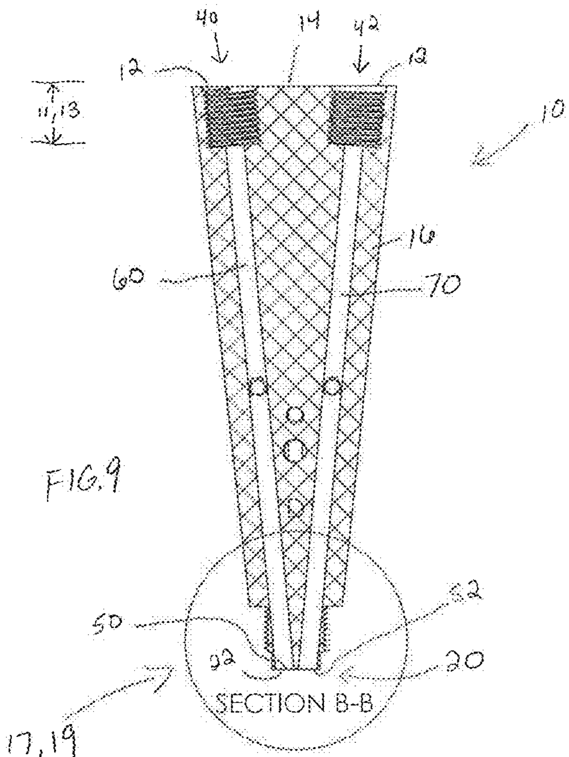
FIG. 9 is a cross-sectional view taken along line B-B of FIG. 11 in accordance with an exemplary embodiment of the present disclosure.
Figure 10:
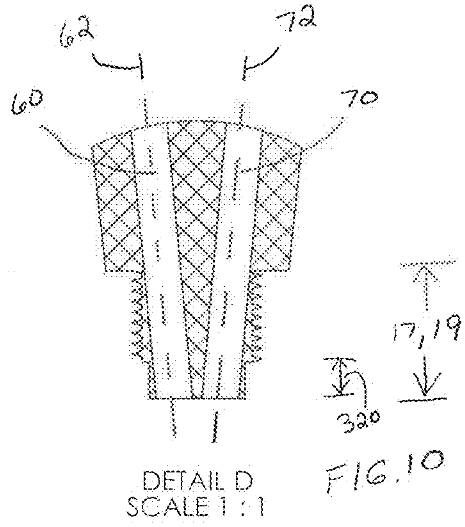
FIG. 10 is an enlarged, cross-sectional view of FIG. 9 in accordance with an exemplary embodiment of the present disclosure.
Figure 11:
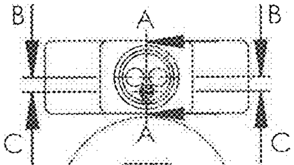
FIG. 11 is an exit side view of a manifold in accordance with an exemplary embodiment of the present disclosure.

In an exemplary embodiment, the first side 14 and the second side 20 of the block 16 are generally parallel to one another and the first channel longitudinal axis 62 and the second channel longitudinal axis 72 are not perpendicular to the first side 14 or the second side 20 of the block 16. In one embodiment, the first channel longitudinal axis 62 and the second channel longitudinal axis 72 are oblique to the first side 14 and the second side 20, i.e., the first channel longitudinal axis 62 and the second channel longitudinal axis 72 are neither parallel nor perpendicular to the first side 14 and the second side 20. Referring to FIG. 9, the first channel 60 within the connection portion 19 is oblique to the connection portion longitudinal axis 21 (FIG. 14) and the second channel 70 within the connection portion 19 is oblique to the connection portion longitudinal axis 21.

The channels 60, 70 of manifold 10 of the present disclosure also needs to be easily cleaned. The linear longitudinal axes 62, 72, i.e., straight flow paths, provides the means for the channels 60, 70 containing substances to be easily cleaned in a single step.

Figure 46:
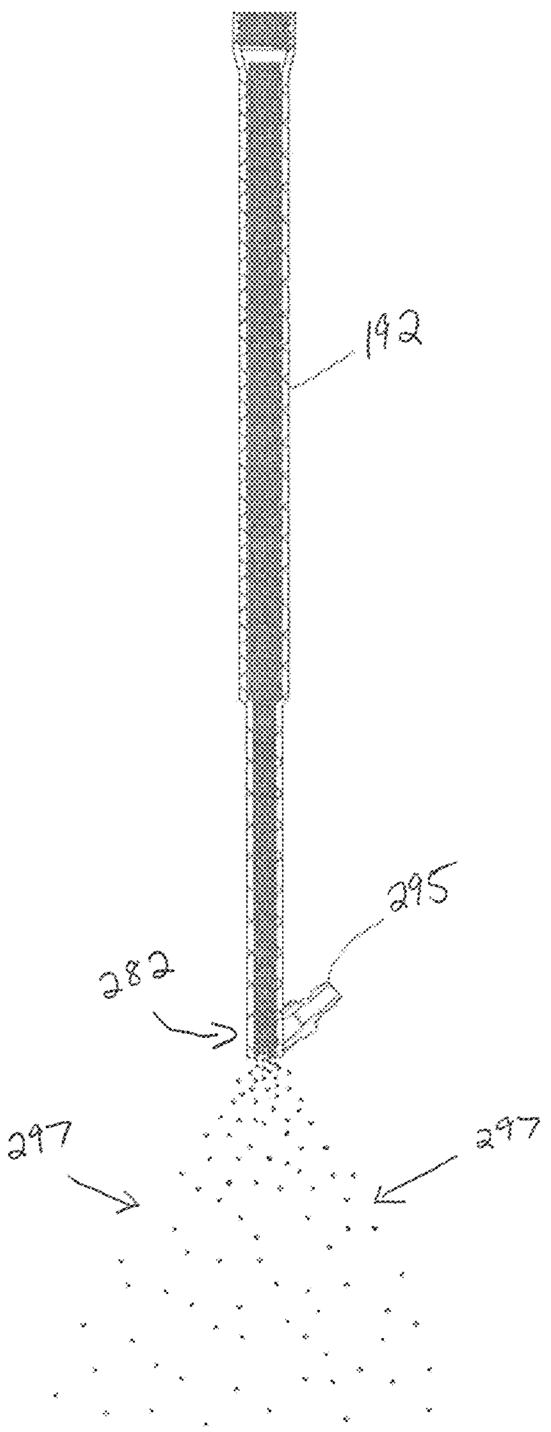
FIG. 46 is a cross-sectional view of a static mixing tip and air portion distributing small droplets.
Figure 47:
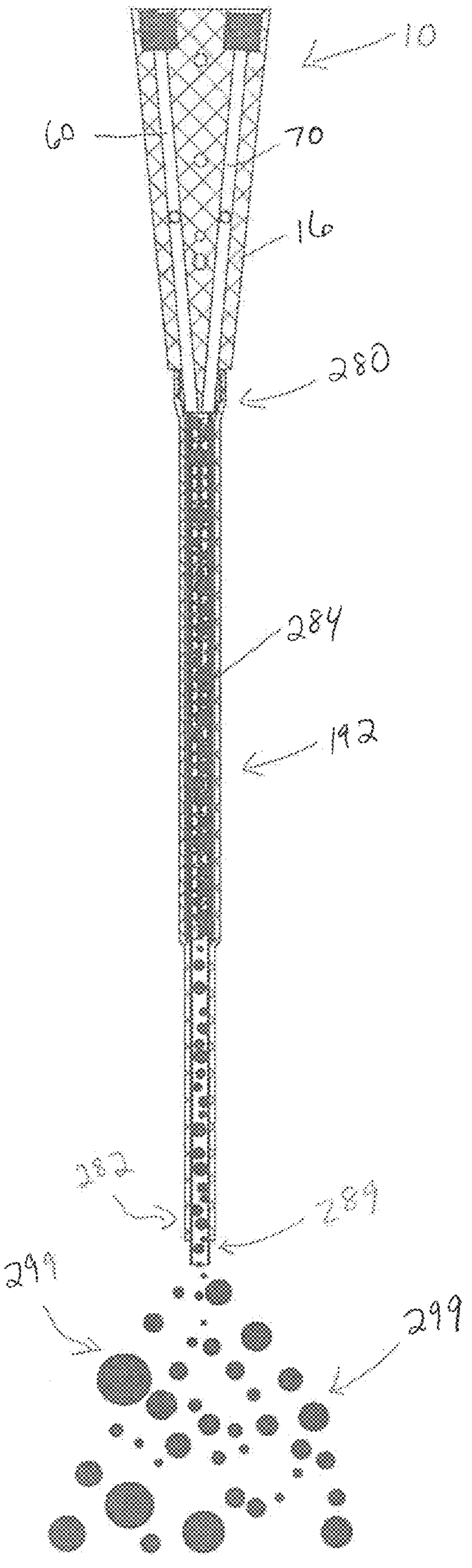
FIG. 47 is a cross-sectional view a manifold and a static mixing tip connected distributing large bloplets in accordance with an exemplary embodiment of the present disclosure.
Figure 50:
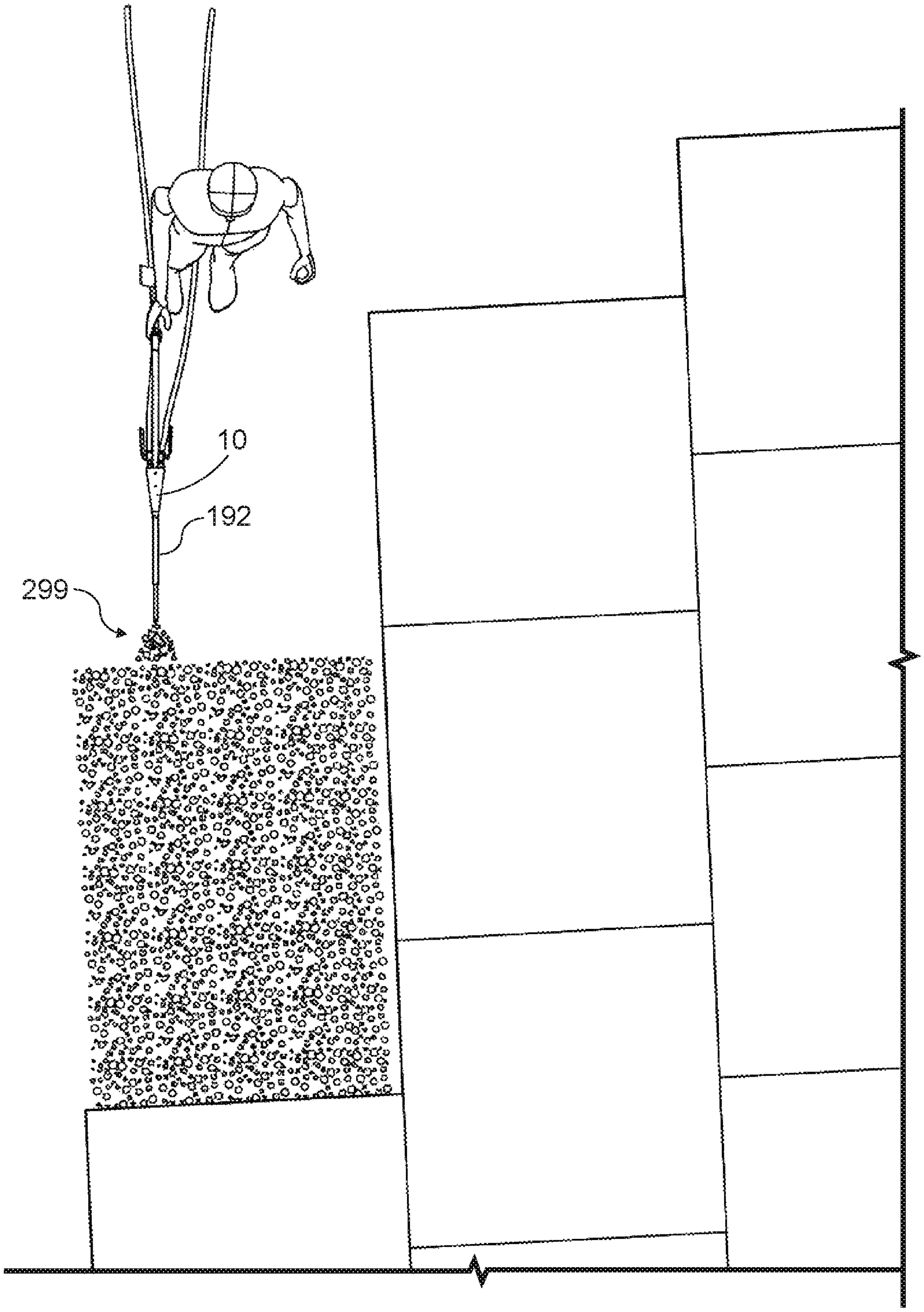
FIG. 50 is a plan view of a user of a manifold and a static mixing tip of the present disclosure distributing large bloplets on a substrate in accordance with an exemplary embodiment of the present disclosure.

Importantly, additional consideration must also be provided to be able to add air to a substance of the present disclosure. Referring also to FIGS. 47 and 50, the air provided to embodiments of the present disclosure serves to clean out the static mixing tip 192 and also provides a spattering effect, i.e., larger bloplets 299, to the newly formed substance as it exits the exit 289 of the static mixing tip 192. As air exits the air channel 90 at the second side 20 of the block 16, the air encounters the newly forming substance as it progresses through the mixing configurations within the static mixing tip 192. The pressurized air expands as it exits a small, approximately 0.21" diameter channel into the larger diameter of the static mixing tip 192. These tips are commonly 0.50" to 0.625" in diameter, but larger and smaller diameters are available. The expanding air displaces a portion of the volume of newly formed substance thereby reducing the volume of material in the static mixing tip 192 as the air and substance travel comingled through the tube. Upon reaching the outlet or exit aperture 289 of the exit portion 282 of the static mixing tip 192 of this mixing chamber the open atmosphere provides even greater opportunity for the air to expand. The bursting forth of the comingled air and substance together results in the expanding air propelling the bloplets 299 of the substance through the atmosphere. Referring to FIGS. 46 and 47, the spatter lands on a substrate in bloplets 299 that are bigger than small droplets 297 that are created in an embodiment with an air inlet portion 295 located at the exit portion 282 of the static mixing tip 192.

Figure 14:
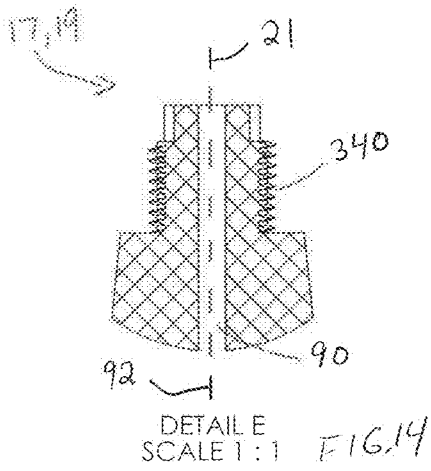
FIG. 14 is an enlarged, cross-sectional view of FIG. 13 in accordance with an exemplary embodiment of the present disclosure.
Figure 15:
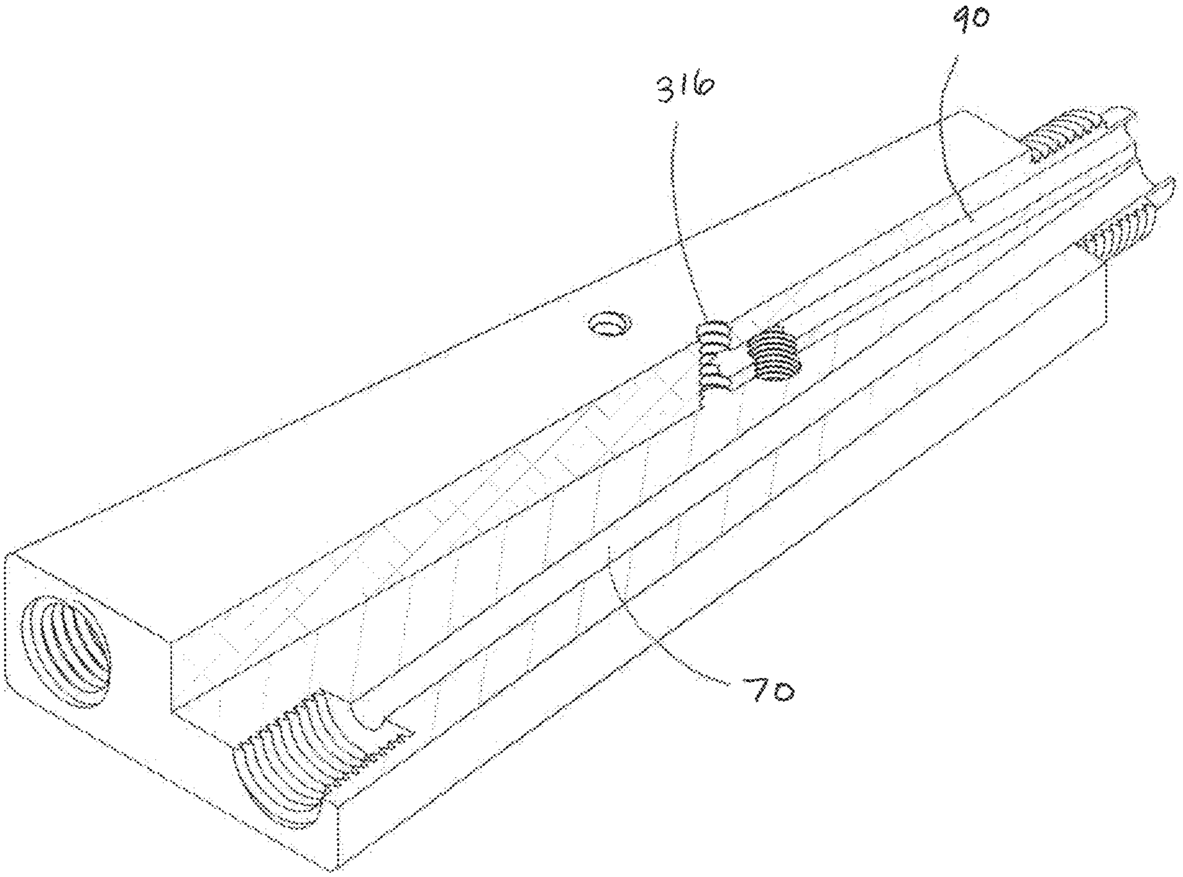
FIG. 15 is a first cross-sectional view of a manifold in accordance with an exemplary embodiment of the present disclosure.
Figure 16:
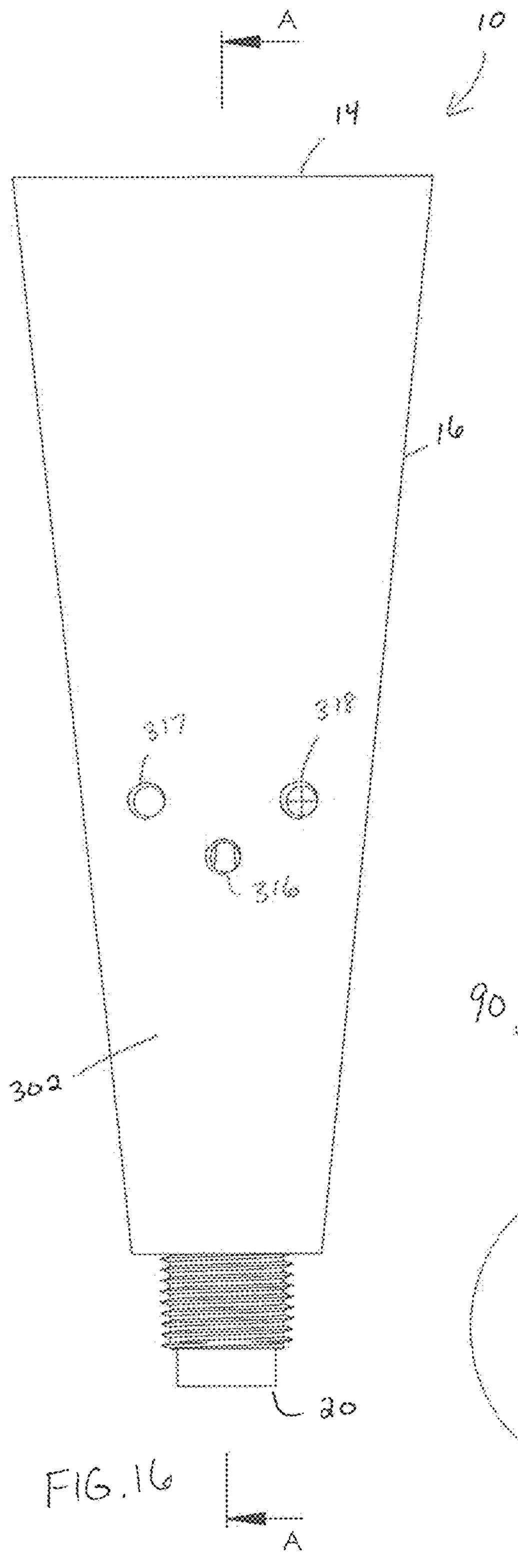
FIG. 16 is a first side elevation view of a manifold in accordance with an exemplary embodiment of the present disclosure.
Figure 17:
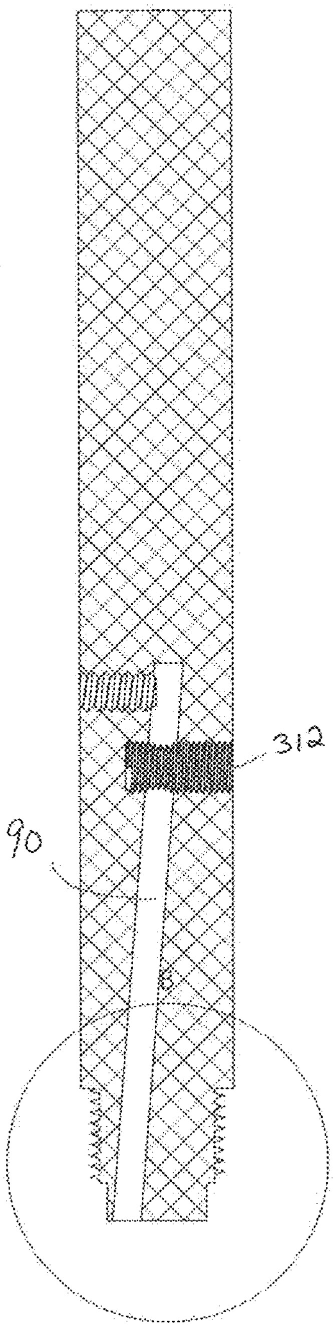
FIG. 17 is a cross-sectional view taken along line A-A of FIG. 16 in accordance with an exemplary embodiment of the present disclosure.
Figure 18:
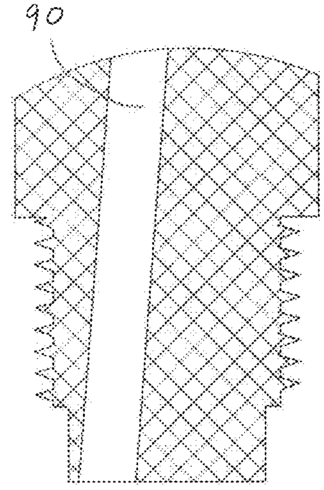
FIG. 18 is an enlarged, cross-sectional view of FIG. 17 in accordance with an exemplary embodiment of the present disclosure.
Figure 19:
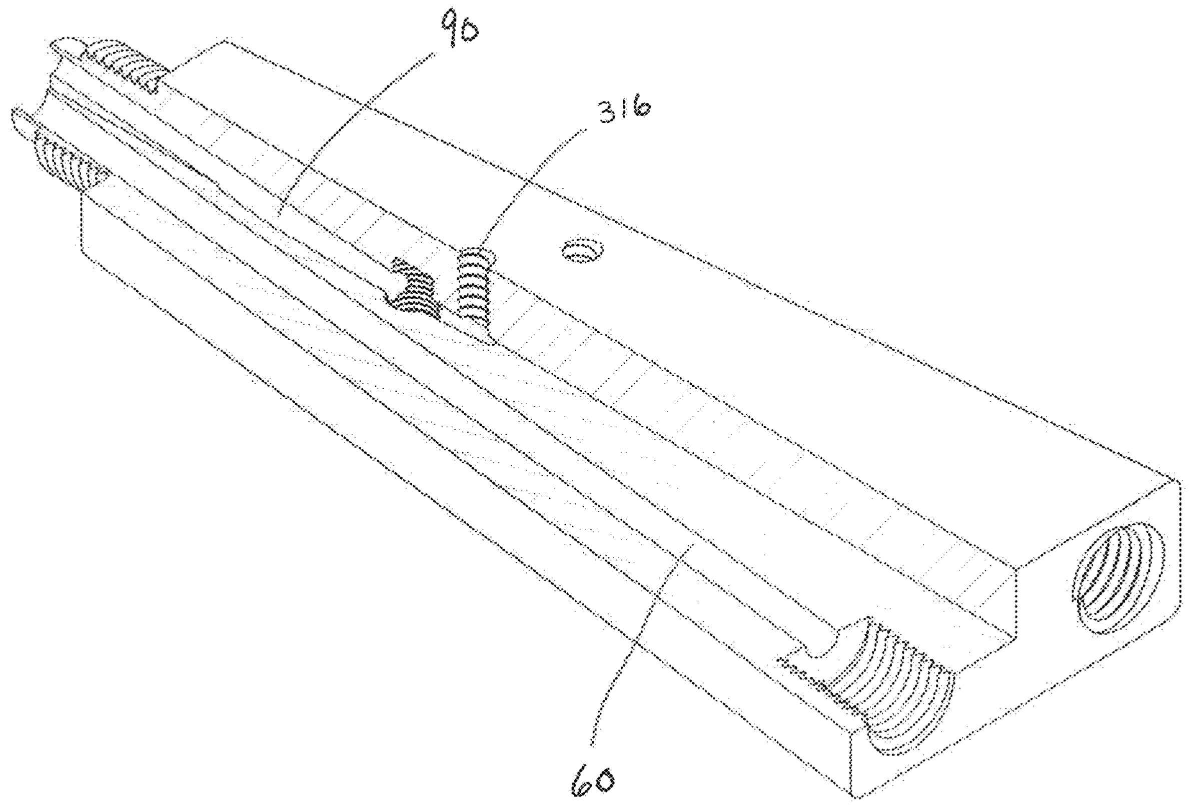
FIG. 19 is a second cross-sectional view of a manifold in accordance with an exemplary embodiment of the present disclosure.
Figure 20:
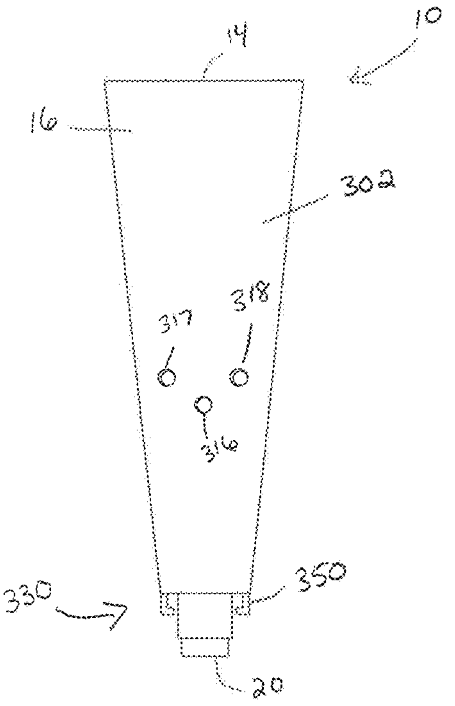
FIG. 20 is a first side elevation view of a manifold in accordance with an exemplary embodiment of the present disclosure.
Figure 21:
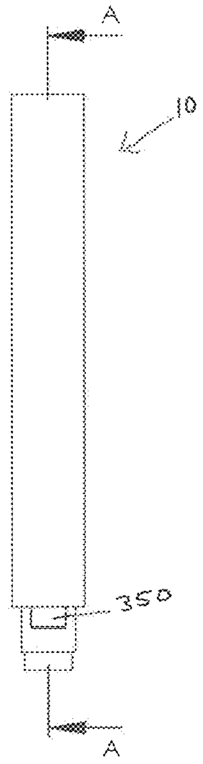
FIG. 21 is a side elevation view of a manifold in accordance with an exemplary embodiment of the present disclosure.

Referring to FIGS. 1, 12, 13, and 14, the manifold 10 includes a third channel 90 extending through the exit connection portion 19 and the third channel 90 defines a third channel longitudinal axis 92 (FIG. 14). The third channel 90 is configured to receive a flow of air 84 and is configured to produce the spatter effect, described above, to the newly formed substances as they exit the exit portion 282 of the static mixing tip 192.

The compressed air for spattering the substance is pressurized by an air compressor. The amount of air, cubic feet per minute (cfm) and the air pressure, pounds per square inch (psi), required will depend greatly on the viscosity of the third substance. While a large stationary compressor is nice for this application it is more realistic to utilize a mobile compressor. In one embodiment the application requires only 5 to 20 psi. In another embodiment the application requires 20 to 40 psi for the application. In another embodiment the application requires 60 to 80 psi. In another embodiment the application requires 80 to 120 psi. When spattering a heavier viscosity third material a compressor will optimally perform if it can produce 4 to 5 cfm. As the compressed air is delivered to the manifold through hoses, fittings, and valves it enters the manifold at the air inlet port 312.

Referring to FIGS. 9-15, in a first exemplary embodiment, the third channel 90 within the exit connection portion 19 is oblique to the first channel longitudinal axis 62 of the first channel 60 and the second channel longitudinal axis 72 of the second channel 70. Furthermore, the third channel longitudinal axis 92 of the third channel 90 is parallel to the connection portion longitudinal axis 21. The parallel orientation of the air channel eliminates reduced air speed from the deflection that occurs with an angular approach. The air exits the air channel aperture and directs all its force and momentum along the connection portion axis. The comingled air and third substance are not changing direction, but rather proceed inline from the air channel through the mixing tip chamber. When fluid flow stops then air flow can continue as needed. This pressurized air flow provides a valuable benefit by purging the mixing tip. Only a few seconds of pressurized air traveling through the static housing purges the third substance out of the tip. This purge allows the tip to be used through out a day. With out this purge, 10 to 20 tips would be needed during a single day of application. Both cost of labor to change out the tips and the cost of the tips themselves can be eliminated. Additionally, by purging the tip and removing the newly formed substance, the fluid channels 60 and 70 are no longer vulnerable to the progressive backing up of the chemical reaction. This backing up has been a significant problem when a mixing tip has been left on for even a few minutes. The air purge is a great benefit in this regard as well. The time spent cleaning out the fluid channels is even more costly as a whole production crew can be stopped waiting for these channels to be cleared. An air purged tip provides significant benefit.

Referring to FIGS. 16-19, in a second exemplary embodiment, the third channel longitudinal axis 92 of the third channel 90 is oblique to the connection portion longitudinal axis 21. In one embodiment the maximum reduction of size and weight require the air channel 90 to be oblique. This allows the manifold to be thinner and lighter while maintaining integrity for threaded connections of ports.

Cleaning the air channel 90 is simple as the open aperture of the channel is easily accessible by a standard drill bit. The air channel is also easily filled with grease and grease is quick removed by the introduction of pressurized air.

Figure 22:
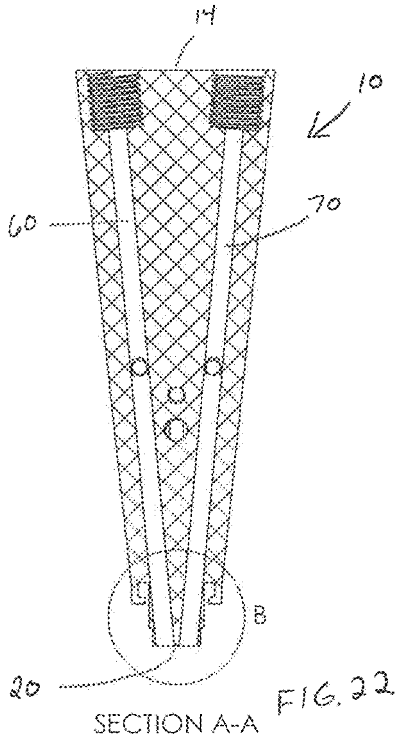
FIG. 22 is a cross-sectional view taken along line A-A of FIG. 21 in accordance with an exemplary embodiment of the present disclosure.
Figure 23:
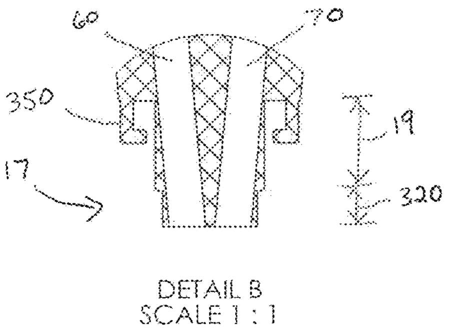
FIG. 23 is an enlarged, cross-sectional view of FIG. 22 in accordance with an exemplary embodiment of the present disclosure.
Figure 28:
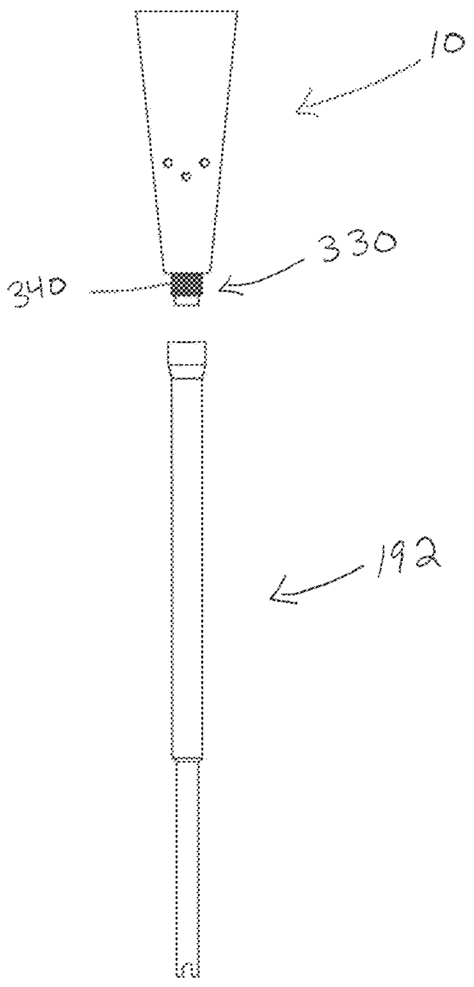
FIG. 28 is an exploded view of a manifold and a static mixing tip in accordance with an exemplary embodiment of the present disclosure.
Figure 29:
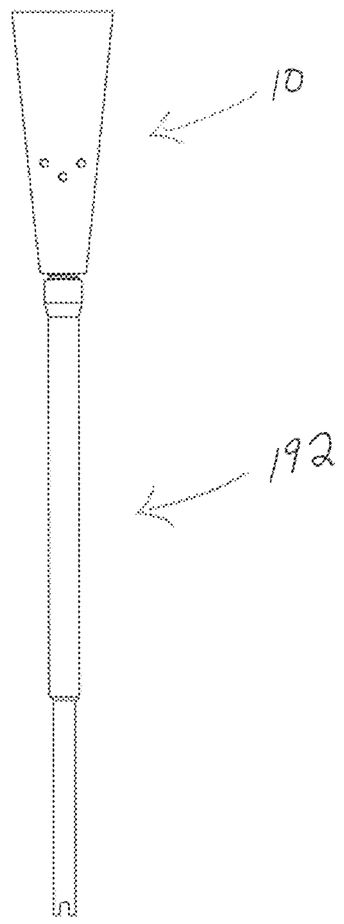
FIG. 29 is an assembled view of a manifold and a static mixing tip connected in accordance with an exemplary embodiment of the present disclosure.
Figure 30:
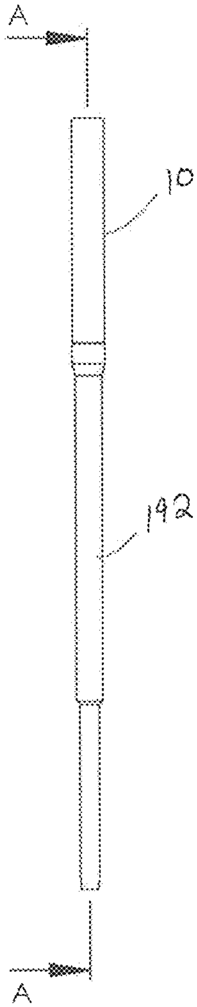
FIG. 30 is a side elevation view of a manifold and a static mixing tip in accordance with an exemplary embodiment of the present disclosure.
Figure 31:
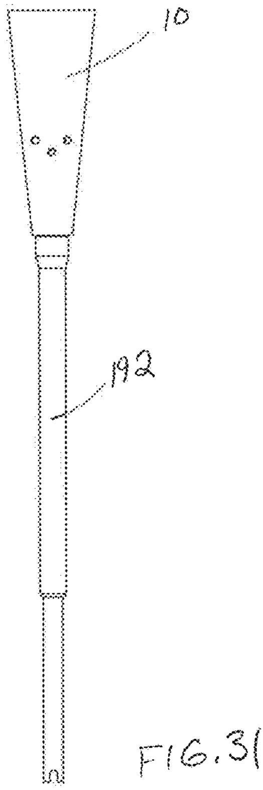
FIG. 31 is a first side elevation view of a manifold and a static mixing tip in accordance with an exemplary embodiment of the present disclosure.
Figure 32:
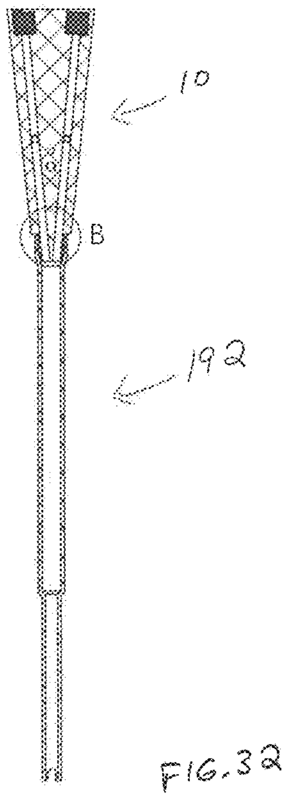
FIG. 32 is a cross-sectional view taken along line A-A of FIG. 30 in accordance with an exemplary embodiment of the present disclosure.

Referring to FIGS. 2-8 and 12, the manifold further includes a first surface 300, a second surface 302, a first portion 304, a second portion 306, a third portion 308, a fourth portion 310, an air inlet port 312, a grease port 316, a nose portion 320 (FIGS. 22 and 23) at the exit portion 17, and a connection mechanism 330 configured to interlock the manifold 10 to a multiple component adhesive mixing tip 192 (FIGS. 28-33).

Figures 2, 3, 4, 5, 6, 7, 8:
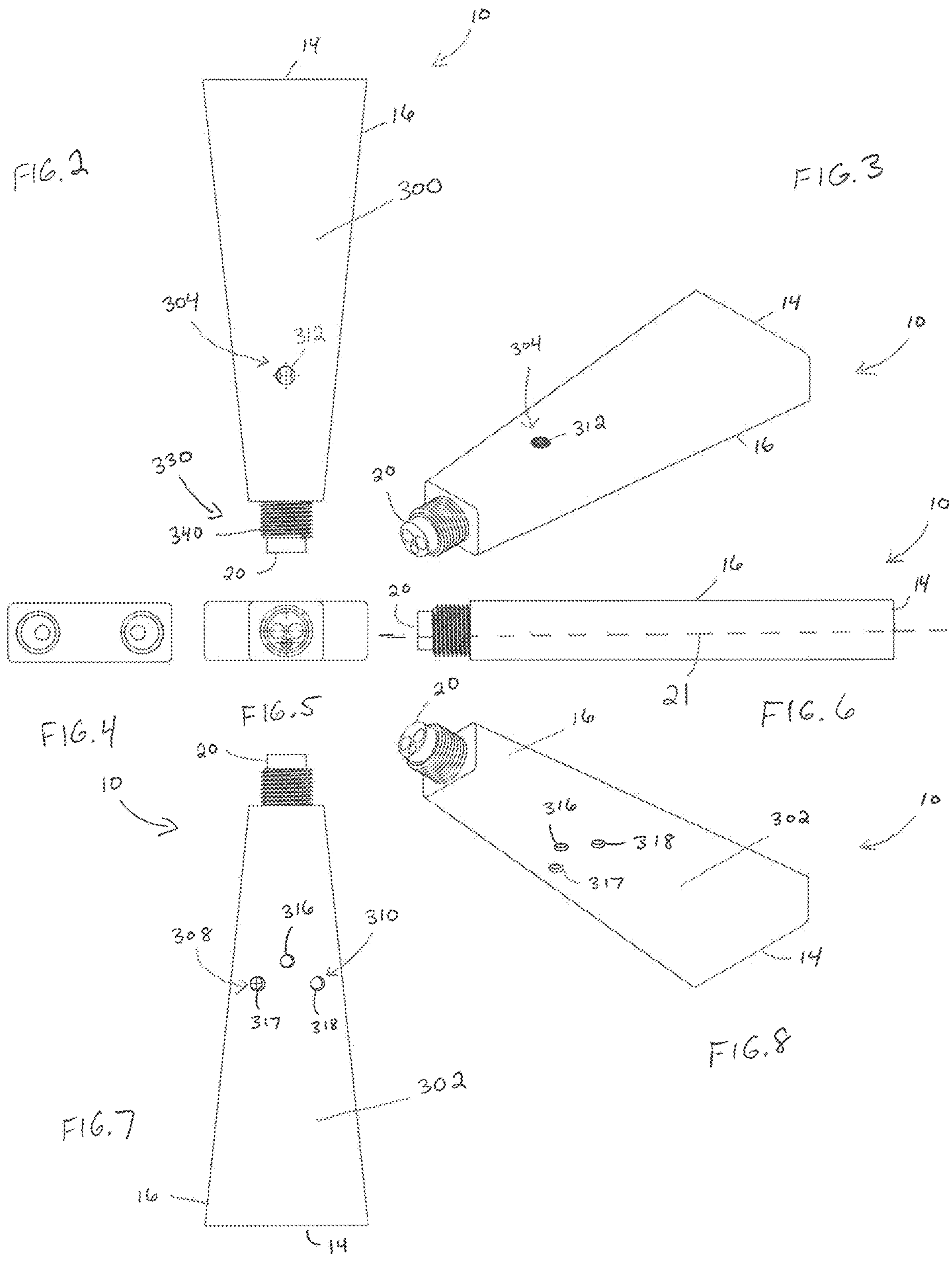
FIG. 2 is a first side elevation view of a manifold in accordance with an exemplary embodiment of the present disclosure.
FIG. 3 is a first perspective view of a manifold in accordance with an exemplary embodiment of the present disclosure.
FIG. 4 is an inlet side view of a manifold in accordance with an exemplary embodiment of the present disclosure.
FIG. 5 is an exit side view of a manifold in accordance with an exemplary embodiment of the present disclosure.
FIG. 6 is a side elevation view of a manifold in accordance with an exemplary embodiment of the present disclosure.
FIG. 7 is a second side elevation view of a manifold in accordance with an exemplary embodiment of the present disclosure.
FIG. 8 is a second perspective view of a manifold in accordance with an exemplary embodiment of the present disclosure.
Figure 12:
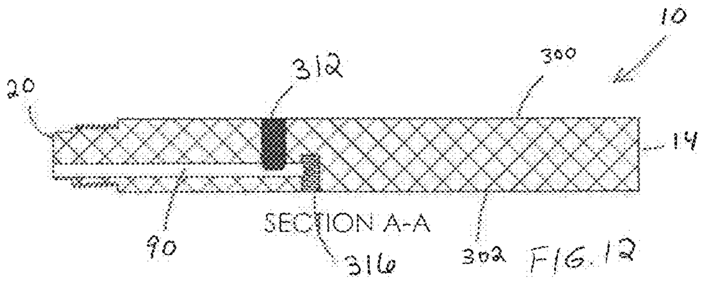
FIG. 12 is a cross-sectional view taken along line A-A of FIG. 11 in accordance with an exemplary embodiment of the present disclosure.
Figure 13:
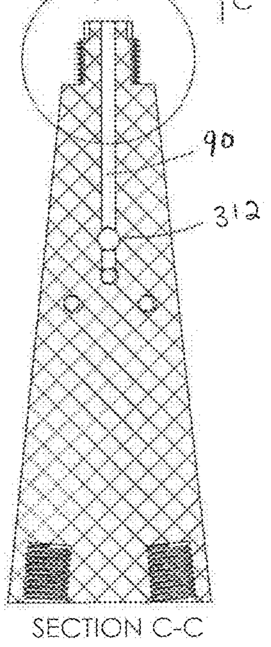
FIG. 13 is a cross-sectional view taken along line C-C of FIG. 11 in accordance with an exemplary embodiment of the present disclosure.

Referring to FIGS. 2 and 3, in an exemplary embodiment of the present disclosure, the first surface 300 of the manifold, at a first portion 304, defines the air inlet port 312. Referring also to FIG. 12, the air inlet port 312 is in fluid communication with the third channel 90.

Figure 51:
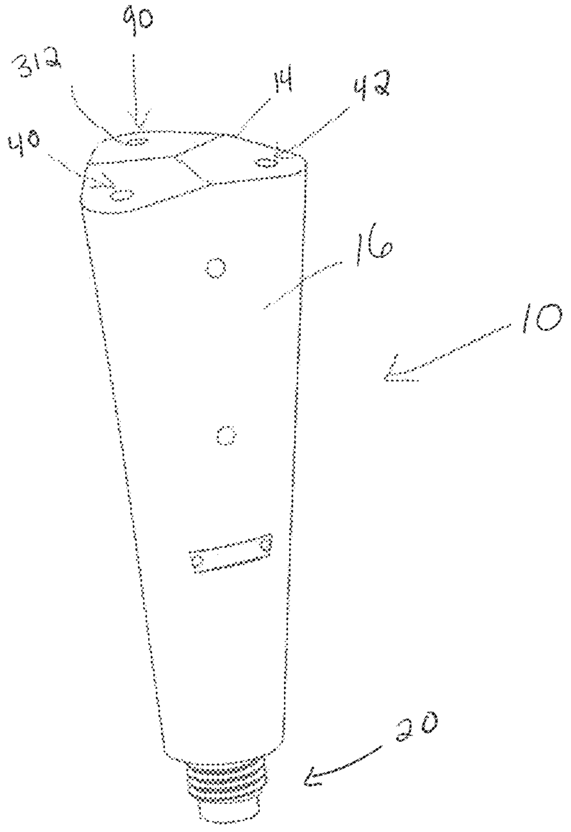
FIG. 51 is a perspective view of a manifold in accordance with an exemplary embodiment of the present disclosure.

Referring to FIG. 51, in other exemplary embodiments, it is envisioned that other locations and/or configurations of the air channel 90 within the block 16 of the manifold 10 are possible in accordance with the features and benefits of the air channel 90 of the present disclosure. For example, referring to FIG. 51, in another embodiment of the present disclosure, the air inlet port 312 and the air channel 90 are located at the top side 14 of the block 16 of the manifold.

Figure 54:
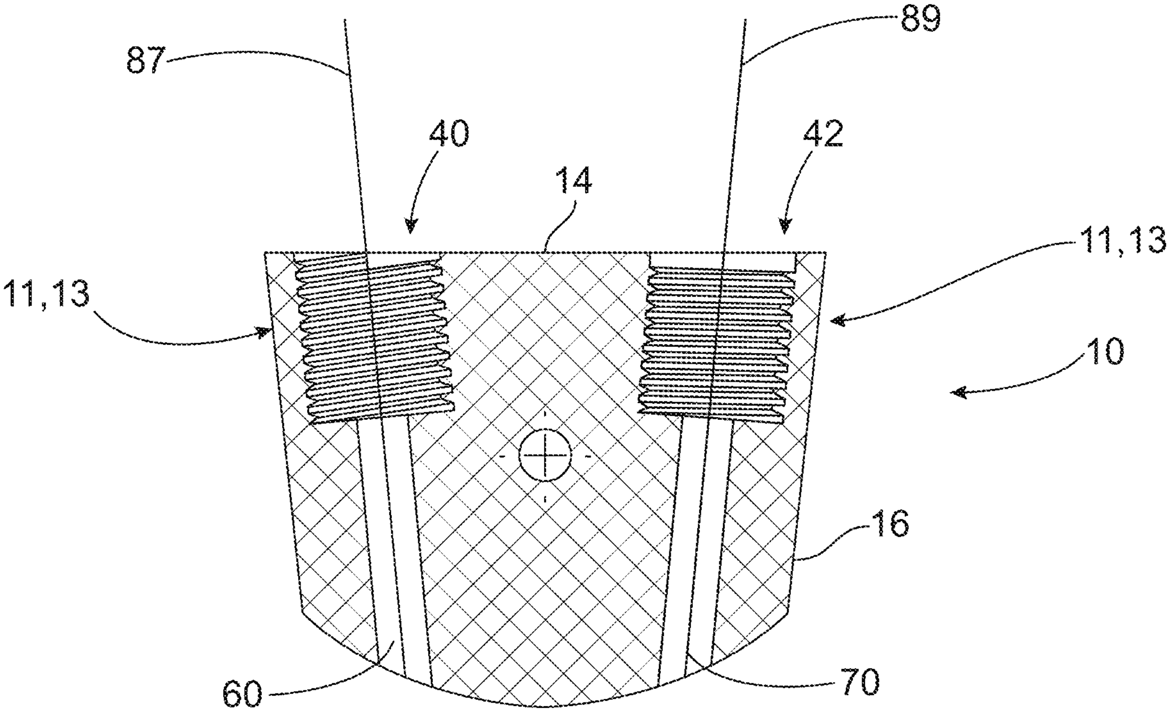
FIG. 54 is a cross-sectional view an inlet portion of a manifold in accordance with an exemplary embodiment of the present disclosure.

Referring to FIG. 54, in an exemplary embodiment of the present disclosure, a first inlet longitudinal axis 87 defined by the first side first aperture 40 and a second inlet longitudinal axis 89 defined by the first side second aperture 42 at the inlet connection portion 13 of the inlet portion 11 of the manifold 10 are shown.

Referring to FIGS. 24-27, in another exemplary embodiment of the present disclosure, the manifold 10 further includes a fourth channel 96 extending through the exit connection portion 19 and the fourth channel 96 defines a fourth channel longitudinal axis 98 (FIG. 27). The fourth channel 96 is configured to receive the flow of air 84 from the air inlet port 312 and is configured to produce the spatter effect, described above, to the newly formed substances as they exit an exit portion of the manifold 10 or the static mixing tip 192. In an exemplary embodiment, the fourth channel 96 within the exit connection portion 19 is oblique to the first channel 60 and the second channel 70. In other exemplary embodiments, it is envisioned that a second air inlet port could be used in communication with the fourth channel 96 to provide a flow of air to the fourth channel 96.

Having a second air channel provides a greater volume of open volumetric area for compressed air to expand. The expanded air, being located at second air outlet provides a second point of push on the newly formed third chemical that is created as the first and second chemical exit their respective channels. This additional supply of air from a second location increases the mixing turbulence and thereby quality of the mix.

Referring to FIG. 26, in an exemplary embodiment of the present disclosure, the second surface 302 of the manifold 10, at a second portion 306, defines the air inlet port 312. Referring to FIG. 26, the air inlet port 312 is in fluid communication with both the third channel 90 and the fourth channel 96.

Referring to FIG. 7, in an exemplary embodiment of the present disclosure, the second surface 302 of the manifold 10, at a third portion 308, defines a third port or grease port 316. Although FIG. 7 illustrates three grease ports 316, it is contemplated that the second surface 302 of the manifold 10 may define any number of grease ports 316 for a particular desired application. In one exemplary embodiment, the third portion 308 of the block 16 defines a third port or first grease port 317, wherein the first channel 60 is in fluid communication with the third port 317 and the fourth portion 310 of the block 16 defines a fourth port or second grease port 318, wherein the second channel 70 is in fluid communication with the fourth port 318.

The grease used in this application is generally a clay based grease so as to not react with the chemical components. The grease is also of sufficient viscosity to fill the channels. The filling of the channels displaces the fluids in the fluid channels and the air in the air channels. Once the channels are filled the grease seals the channels. The mixed third fluid often has a progressive foaming action. If the grease is not present and the continuous downstream flow of the 2 chemicals or air has stopped, then the third chemical will creep upstream into these channels where they finalize the chemical reaction and turn from a fluid state to a solid state inside the channels. The solid state of this third chemical requires mechanical cleanout or forceful pressure to move the hardened third chemical from the channel. The presence of grease in each of these channels prevents this chemical backflow and thereby the hardening. If the air channel is filled with grease and no flow of air pressure is provided, then the fluid chemicals can be dispensed with out entering the air channel and the grease will continue to protect the air channel.

Referring to FIG. 9, the vee manifold 10 defines an inlet portion 11 having a first inlet connection portion 13 defining a first inlet connection portion longitudinal axis 15. The vee manifold 10 also defines an exit portion 17 having a second exit connection portion 19 defining a second exit connection portion longitudinal axis 21 (FIG. 14).

The inlets 12 of the first inlet connection portion 13 are first connection means configured to attach to hoses (e.g., hoses 191 shown in FIG. 44), tubing, piping, nipples, valves, or other apparatus, by any fluid connection means known in the industry. Connection means include, but are not limited to, tapered walls for a friction fit, threads, quick connects, compression fittings, flare fittings, flange fittings, mechanical fittings, Luer locks, welding, soldering, and/or brazing. Each of the inlets may utilize the same or different connection means. In an exemplary embodiment, the connection means for inlets 12 are threads as shown at exit connection portion 340. In an exemplary embodiment, the manifold 10 has two inlets 12. In other exemplary embodiments, the vee manifold 10 has three, four, five or more inlets 12. If one or more inlets 12 are not being utilized, they may be capped by any capping means, such as a plug.

The block 16 of manifold 10 may be made of any suitable material for the fluids/substances. The materials for construction of the block 16 may comprise, but not limited to, carbon steel, low temperature service carbon steel, stainless steel, non-ferrous metal alloys such as Inconel, Incoloy, and Cupro-nickel, non-metallic materials such as acrylonitrile butadiene styrene (ABS) polymer, glass fiber reinforced epoxy (GRE), polyvinyl chloride (PVC), chlorinated polyvinyl chloride (CPVC), ultra-high-molecular-weight polypropylene (UHMW), aluminum, high density polyethylene (HDPE), tempered glass, perfluorinated polymers such as Teflon, chrome-molybdenum steel, aluminum, bronze, brass and copper. However, any other material may be used that is compatible with the materials to be used in the system. In an exemplary embodiment, the block 16 is made of a polymer. In another exemplary embodiment, the block 16 is made of aluminum. In some embodiments, means for heating vee manifold 10 are provided. The heating means include any means known in the industry for heating parts, including, but not limited to, electrical resistance or a fluid jacket.

Referring to FIGS. 28-33, in exemplary embodiments, the connection mechanism 330 of the present disclosure is configured to interlock the manifold 10 to a multiple component adhesive mixing tip 192 (FIGS. 28-33). Importantly, the connection mechanism 330 of the present disclosure provides an interlock between the manifold 10 and the mixing tip 192 such that the interlock prevents axial movement between the exit portion 17 of the manifold 10 and the multiple component adhesive mixing tip 192.

Figure 33:
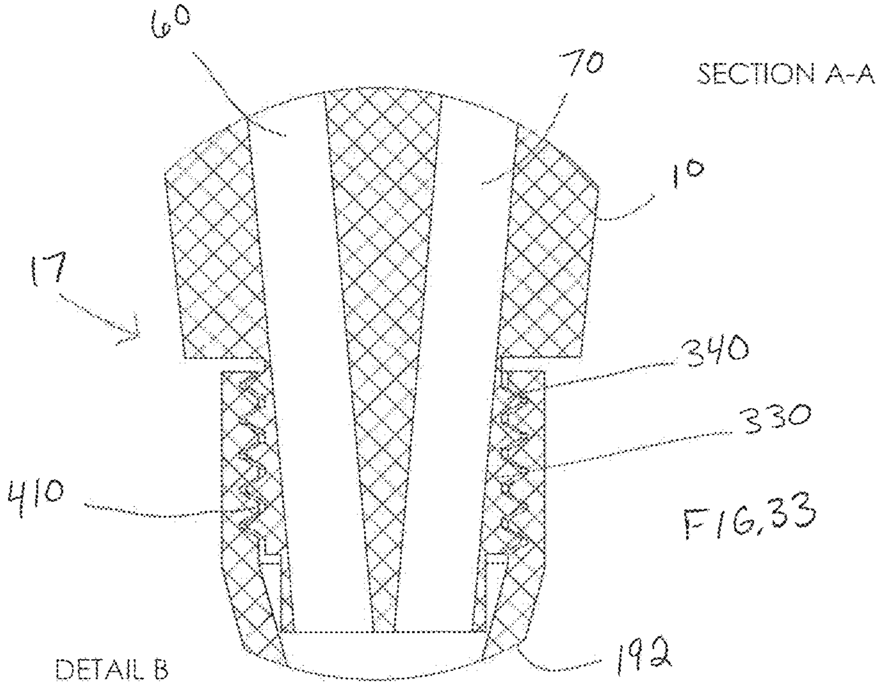
FIG. 33 is an enlarged, cross-sectional view of a portion of FIG. 32 in accordance with an exemplary embodiment of the present disclosure.

Referring to FIG. 33, in an exemplary embodiment, the connection mechanism 330 of the present disclosure includes an external threaded connection portion 340 that is configured to interlock to an internal threaded connection portion 410 of the multiple component adhesive mixing tip 192 such that the interlock prevents axial movement between the exit portion 17 of the manifold 10 and the multiple component adhesive mixing tip 192.

Figure 34:
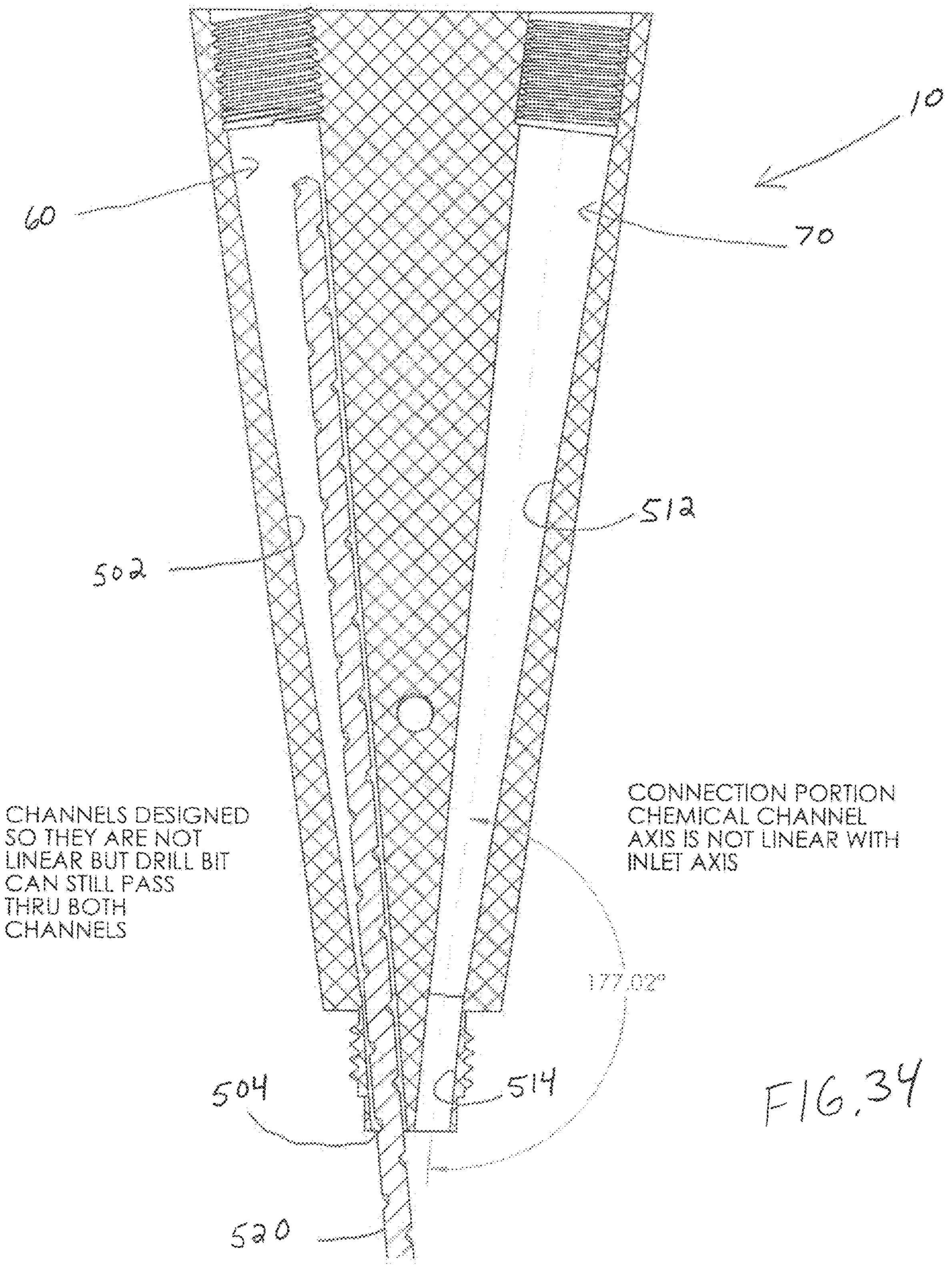
FIG. 34 is a cross-sectional view of a manifold with a drill bit inserted into a channel of the manifold in accordance with an exemplary embodiment of the present disclosure.
Figure 35:
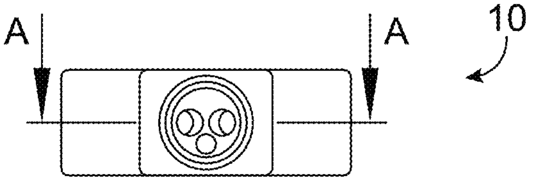
FIG. 35 is an exit side view of a manifold in accordance with an exemplary embodiment of the present disclosure.

Referring to FIG. 34, in an exemplary embodiment of the present disclosure, the first channel 60 is formed from more than one first channel portions that each have a different longitudinal axis. For example, the first channel 60 is formed from a first channel first portion 502 and a first channel second portion 504 as shown in FIG. 34. Each first channel portion 502, 504 defines its own longitudinal axis.

Furthermore, in an exemplary embodiment of the present disclosure, the second channel 70 is formed from more than one second channel portions that each have a different longitudinal axis. For example, the second channel 70 is formed from a second channel first portion 512 and a second channel second portion 514 as shown in FIG. 34. Each second channel portion 512, 514 defines its own longitudinal axis. In an exemplary embodiment, the second channel first portion 512 and the second channel second portion 514 define an angle of approximately 177.02 degrees therebetween. In other exemplary embodiments, the angles between the second channel portions may define other angles and do not equal 180 degrees. Furthermore, it is envisioned that the first channel 60 or the second channel 70 may include any number of channel portions. As shown in FIG. 34, in such exemplary embodiments, a drill bit 520 is able to be used to clean out all the channel portions in a single use.

Referring to FIG. 20-23, in another exemplary embodiment, the connection mechanism 330 of the present disclosure includes a twist lock connection mechanism 350 that is configured to interlock to a complementary twist lock connection portion of the multiple component adhesive mixing tip 192 such that the interlock prevents axial movement between the exit portion 17 of the manifold 10 and the multiple component adhesive mixing tip 192.

Referring to FIGS. 37-40, an exemplary multiple component adhesive mixing tip 192 is illustrated. The multiple component adhesive mixing tip 192 includes a housing 278 having a inlet portion 280 and an exit portion 282 and a mixing component 284 inside of the housing 278. The exit portion 282 defines an exit aperture 289. The exit aperture 289 may vary depending on the desired application method. A small aperture of about 0.10" to 0.20" will produce a smaller stream of the third substance. When pressurized air is introduced the stream becomes broken into small droplet. When a larger opening of 0.25" to 0.50" is utilized and pressurized air is introduced at the inlet of the static mixer the larger stream will produce larger bloplets. When air is introduced at or near the exit portion of the static tip the air does not comingle with the third substance but rather aerates small droplets or spray.

The multiple component adhesive mixing tip 192 connection mechanism 330 and inlet portion 280 has standard dimensions that only allows for a very small, confined area to receive a manifold 10 of the present disclosure and the first and second substances 80, 82 traveling through the channels 60, 70 of the manifold 10 to the mixing component 284 inside of the housing 278 of the multiple component adhesive mixing tip 192. As discussed above, until the present invention, there has not been an efficient way of doing this. Referring to FIG. 41, the small dimensions of the multiple component adhesive mixing tip 192 are shown. The inlet portion 280 of the multiple component adhesive mixing tip 192 defines a diameter of only approximately 0.657 inches. The inventor of the present disclosure has uniquely designed the connection portion 19 of the manifold 10 to define a diameter of approximately 0.75 inches and the nose portion 320 of the connection portion 19 of the manifold 10 to have a diameter smaller than the connection portion 19. For example, in an exemplary embodiment, the nose portion 320 defines a diameter of approximately 0.655 inches.

Figure 39:
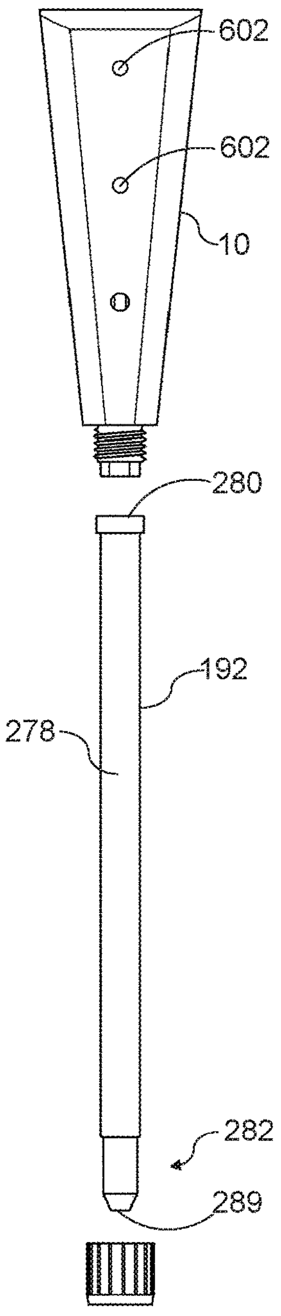
FIG. 39 is an exploded view of a manifold and a static mixing tip in accordance with an exemplary embodiment of the present disclosure.
Figure 40:
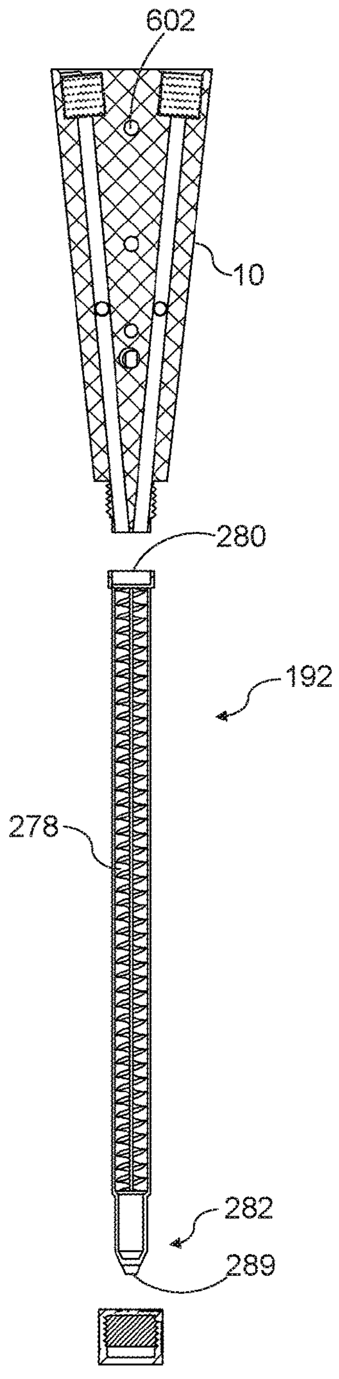
FIG. 40 is a cross-sectional view of FIG. 39 in accordance with an exemplary embodiment of the present disclosure.

Referring to FIG. 39, in another exemplary embodiment, the manifold 10 also defines mounting holes 602.

An intent of the present disclosure is to resolve the conflict of 4 parameters. (1.) A chemical channel that is accessible from the outlet port of the manifold and straight enough for an appropriately sized drill bit to clean out hardened chemicals between the upstream inlet and the outlet. (2.) The inlet of the channels must be a distance apart that is sufficient to allow connection of plumbing fittings and/or valves to allow chemicals to flow into the channels. (3.) The channels may be angled apart from each other to accommodate plumbing attachments but must not be such a wide angle that the channel breaks through the outer wall of the outlet connection portion. The size of the connection portion being determined by the distribution device such as a static mixing tip. (4.) The length of the manifold must be reasonably sized to be usable in mobile and construction applications.

In one embodiment a very common static mixing tip utilizes 7/8-9 threads. This outer diameter will allow two ¼" channels to pass within the confinement of the threaded boss. In order to attach ⅜" ball valves to the inlets of the channels, the channels must be approximately 2" apart. A 2° angle between the axis of the connection portion and the axis of the first channel combined with a 2° angle of the axis of the second chemical channel sets a 4° angle between the two channels. The ⅜" ball valves would have sufficient room to be attached to the respective channels when the manifold is 26"long.

In another embodiment the common static mixing tip with 7/8-9 threads encompasses two ¼" channels within the confinement of the threaded boss and two ⅜" ball valves are set approximately 2" apart. A 4° angle between the axis of the connection portion and the axis of the first channel combined with a 4° angle of the axis of the second chemical channel creates an 8° angle between the two channels. The ⅜" ball valves would have sufficient room to be attached to the respective channels when the manifold is 13"long.

Attempting to build another embodiment utilizing the common static 7/8-9 thread mixing tip and two ¼" channels within the confinement of the threaded boss with a 6° angle between the axis of the connection portion and the axis of the first channel combined with a 6° angle of the axis of the second chemical channel creating an 12° angle between the two channels would result in failure. The two ¼" channels separated by 12° would result in a breach of the outer walls. The chemicals would run out of the channels. The combination of 7/8-9 threads, two ¼" channels separated by 12° will not work.

In another embodiment the common static mixing tip with 7/8-9 threads encompasses two ¼" channels within the confinement of the threaded boss and two ⅜" ball valves are set approximately 2" apart. A 5° angle between the axis of the connection portion and the axis of the first channel combined with a 5° angle of the axis of the second chemical channel creates an 10° angle between the two channels. The ⅜" ball valves would have sufficient room to be attached to the respective channels when the manifold is 8"long.

While various configurations can be made, the chemical channels must be accessible from the outlet port and straight enough for a drill bit, with the inlet of the channels separated a distance sufficient for plumbing, angled apart without breaking through the outer wall of the outlet connection portion at point 325.

As the popularity of 2 component materials has increased so also has the requirement for higher volume and higher viscosity multicomponent materials. The present invention criteria still apply to larger diameter channels. As an example, a connection portion with ¾" NPT threads have an outer diameter of 1.050" and would accommodate the passage of two 0.375" chemical channels. While this increase in the connection portion will allow 0.375" diameter chemical channels to pass through the connection portion, the need remains for the chemical fluid channels to be sufficiently separated at the upstream inlet portion of a manifold block to allow for the physical movement and mechanical attachment of plumbing fittings between the inlet portions. The need also continues for the channels to provide allowance of a drill bit to be inserted up into the channels for cleaning. In order to accomplish these two requirements, separation of inlets and allowance for clearing with a drill bit, the fluid dispensing channels must be oblique to the connection portion axis without breaking through the outer connection portion. The length of the manifold to facilitate this embodiment would be approximately 7.5". The arrangement of these 2 chemical channels inside the 1.050"diameter also allows room for the air channel(s).

An external tapered threaded portion for 2" pipe threads would restrict the maximum diameters of two equal channels set to a 5° oblique angle to be 0.75" each. This combination of channel sizes would set the plumbing fittings far enough apart to facilitate attachment mechanical plumbing attachment of the fittings with a manifold length of 9.0".

In another embodiment, the same 2" pipe thread outer diameter thread would also allow one channel to be 1.0" diameter while the other chemical channel would be 0.50". The area of these 2 different channels provides a material flow volume to be 4:1. This is a common fluid mix ratio as the higher viscosity greater volume material flows through the 1" channel, it can flow better in the 1.00" diameter channel. The lower volume lower viscosity material would flow through the 0.50" diameter channel. Both channels could be oblique through the connection portion without breaching the restriction of the 2.3163 (or 2.0" NPT) threads. With an oblique angle of 5° for each channel the manifold would only need to be about 10" long to be separated enough to mount the plumbing fittings while maintaining the drill clearing passageway. The arrangement of these 2 chemical channels inside the 2" pipe thread outer diameter also allows room for the air channel(s).

Another important novel design feature of the manifold 10 of the present disclosure is the unique design of the angles of the channels 60, 70 from the connection portion longitudinal axis 21. For example, referring to FIG. 9, in an exemplary embodiment, the first channel 60 is angled 5° from the connection portion longitudinal axis 21 in a first direction and the second channel 70 is angled 5° from the connection portion longitudinal axis 21 in a second direction opposite the first direction. Referring to FIG. 41, the unique design of the manifold 10 of the present disclosure provides a tolerance of approximately 0.02 inch clearance from the edge 325 of the manifold 10 to the channels 60, 70. Importantly, this prevents the fluids or substances traveling through the channels 60, 70 from spilling out of the side of the manifold 10.

The air channel(s) are strategically located to fit within the confines of the connection portion of the manifold. The air channel(s), like the fluid channels must be placed within the confines of the nose portion 20 of the manifold without breaking through the connection portion at point 325. The close proximity of the fluid channels at the channel outlet necessitates that the air channel(s) be in very close proximity to both the fluid channels and the connection portion. In one embodiment the manifold 10 defines mounting holes 602. These holes 602 are through holes from surface 300 to surface 302. The holes are also located at the center of the block between the inlets. In this embodiment these mounting holes prevent the air channels from extending through to the first side 14.

In another embodiment the mounting holes are relocated to allow the air input port to be defined by the first side 14.

In exemplary embodiments, the exit connection portion 19 includes second connection means configured to attach the manifold 10 to a static mixing tip 192. It is also contemplated that the exit connection portion 19 includes second connection means configured to attach the manifold 10 to other substance devices such as outlet hoses, spray nozzles (e.g., spray nozzle 194 shown in FIG. 44), or other tubing, piping, nipples, valves, or other apparatus by any fluid connection means known in the industry. The connection means include, but are not limited to, tapered walls for a friction fit, threads, twist lock, quick connects, compression fittings, flare fittings, flange fittings, mechanical fittings, Luer locks, welding, soldering, and/or brazing. In exemplary embodiments, the connection means for exit connection portion 19 are threads 340 for connecting static mixing tips as described in more detail above.

In exemplary embodiments, The straight, cylindrical channels 60, 70 in the block 16 are generally straight, have a generally circular cross-section, of a generally constant diameter. However, it is contemplated that other configurations are possible. The cylindrical channels 60, 70 have an inlet opening 12 and an outlet opening 22. In an exemplary embodiment, the inlet openings 12 may be female threaded portions configured to interlock securely to 5 gallon to 55 gallon, and larger, substance containers. As seen in FIG. 36, it is understood that channels may be tapered, oblong, or rectangular and be bigger than the outlet, thus allowing the drill bit to pass through cured materials without being close to the channel walls. The cured, but uncleared material would be left in place. The drill would still provide a through channel for fluid chemicals to be dispensed. It is further understood in one embodiment the first inlet connection portion axis 15 and the second inlet connection portion axis ## are parallel to the exit portion connection axis. In this embodiment the oblique fluid channels allow the clearing of the fluid channels with a drill bit up to the point of angle change. In another embodiment the diameter of the inlet connection portion is large enough that even though the inlet connection portion is parallel to the outlet connection portion axis the, the drill bit pathway can be cleared through the inlet connection portion. In another embodiment the inlet connection portion axis 15 are oblique to the outlet connection portion axis but not the same angle or axis as the fluid channel. Even though the inlet connection portion 11 is not the same axis as the fluid channel axis the, the drill bit pathway can be cleared through the inlet connection portion.

In other exemplary embodiments, the inlet openings 12 may be male threaded portions. The cylindrical channels 60, 70 in the block 16 may have the same diameter, or vary individually in diameter as needed by the application governed by the material characteristics of the fluids or substances. In exemplary embodiments, the outlet openings 22 of each of the cylindrical channels 60, 70 are distinct, the orifices are separate and do not communicate with each other. In other exemplary embodiments, the outlet openings 22 of the cylindrical channels 60, 70 may merge into a single outlet opening.

Figure 44:
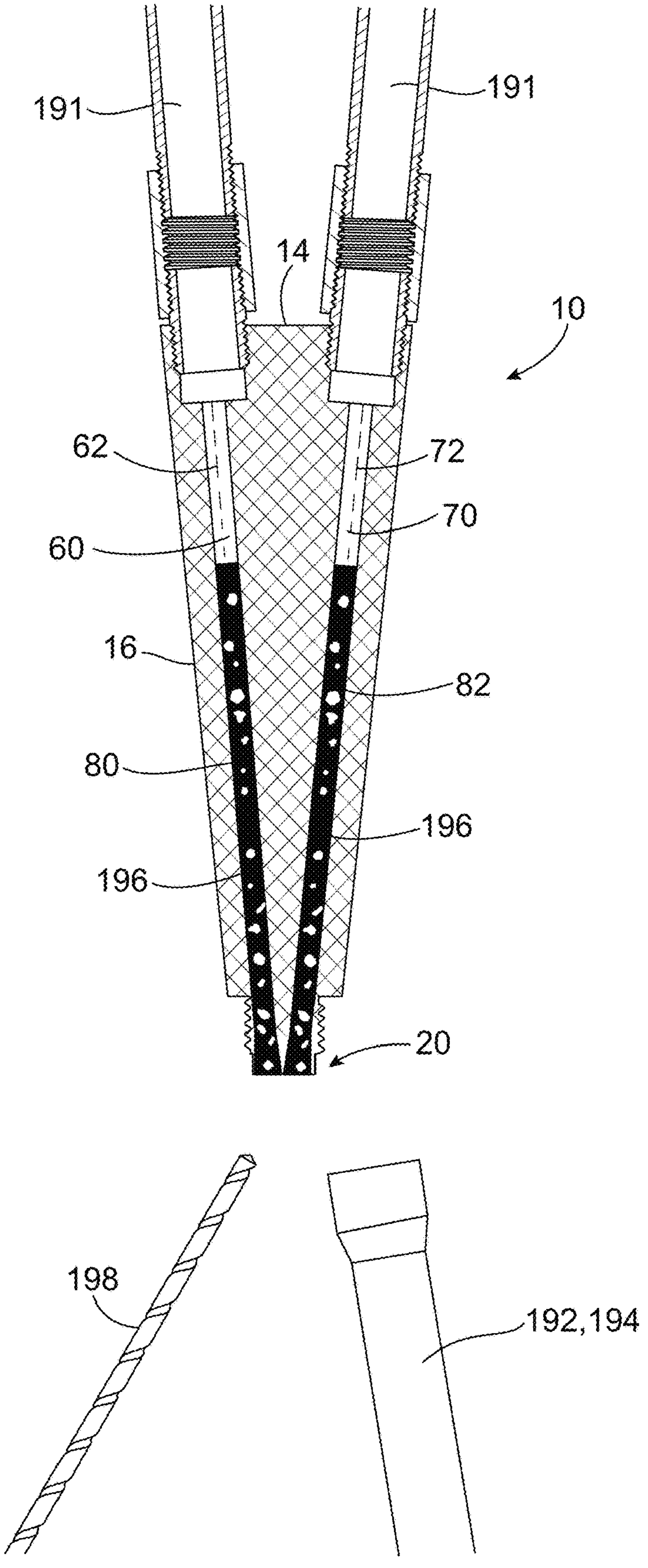
FIG. 44 is a cross-sectional view of a manifold, a drill bit, and a static mixing tip in accordance with an exemplary embodiment of the present disclosure.

Referring to FIG. 44, in an exemplary use, a plurality of fluids or substances enter the manifold 10 through inlets 12 and the materials pass through the channels 60, 70 of the manifold 10. For example, a first substance 80 is movable through first channel 60 and a second substance 82 is movable through the second channel 70. In some embodiments, first substance 80 and second substance 82 are different substances. When fluid or substance flow is stopped, a chemical reaction or physical change of the fluid or substance materials may cause hardening to form a solid mass as in the prior art wye manifolds. The solid mass may form in the cylindrical channels 60, 70 to form a cylindrical shaped clog. The cylindrical shaped clog may typically be extruded by increasing pressure through the inlets 12 restoring normal flow. As an alternative to increasing pressure, a straight drill bit may be introduced into the cylindrical channels 60, 70 for the length of the block 16 to remove the cylindrical shaped clog.

The air inlet port 312 receives pressurized air. The air then travels into channels 90 and 96, then exits the air channel(s) and enters the new third chemical flow. The expanding pressure of the air stream changes the flow of the full stream of chemical fluid into a thinner and faster moving maelstrom. Then, as maelstrom exits the exit aperture 289 of the exit portion 282 of the static mix tip 192, the force of the air propels the liquid out of the static tip in a broken-up series of bloplets which are scattered into the air landing in a random pattern on the substrate. This splattering bloplets of adhesive or coating is a desirable final application. The application of bloplets has the advantage of a larger amount of adhesive than the small droplets of a spray application. The height of each of these bloplets is higher. This height is significant because construction substrates and insulation boards are not flat. There are bumps, stones, debris, and curvature of the components of each construction assembly involved at each substrate. These irregularities cause a gap to exist between the components. When a board is set down over the lower droplets the height is insufficient to engage the surface of the board. When the greater height bloplets are used the insulation board engages the adhesive. Additionally, the droplets of spray are easily airborne around a construction site. Cars and buildings can be damaged by the dual component adhesive. The people working downwind of the airborne spray can easily inhale the low rise foam chemical into their lungs. Bloplets are bigger and heavier. They are not as susceptible to a breeze, would not travel very far if the did and are not small enough to inhale.

When comparing bloplets to beads, the bead spacing is critical, yet bead spacing is totally dependent on the operator. Beads are frequently specified to be spaced 12" on center. The beads are placed using a swinging motion which is very erratic. Roofs have blown off in high winds and when the cause is researched the bead spacing is exposed and the contractor is at fault. With splatter and bloplets application the spacing of the bloplets is rarely more than 2" and often closer. This close adhesive configuration reduces the chances of applicator error. The bloplet application method also uses less adhesive while providing more consistent coverage than the beads.

Another feature of the manifold 10 is that each cylindrical channel 60, 70 is generally straight, and preferably at an angle relative to the other channel from the inlet openings 12 to the outlet openings 22. This straight pathway is simple and effective. If the flowable liquids or substances used in the manifold 10 harden through chemical or physical changes, the solids formed have the straight sides of the straight cylindrical channels 60, 70 act as a mold to form a hardened clog with a shape that is cylindrical. The cylindrical shaped clog can often be extruded by increasing the pressure on the upstream liquid. Once the clog is extruded normal flow is restored. The hardened mass can often be extruded out through the outlet openings 22 without resorting to other mechanical means.

If increased pressure will not extrude the hardened material out the outlet openings 22 then the clogs can be removed by mechanical means. As the flow path through the cylindrical channels 60, 70 is straight, mechanical means such as a standard straight drill bit can be inserted into the outlet opening 22 and run all the way up through the clogged material in the cylindrical channels 60, 70 to restore the functionality of the vee manifold 10. Ordinarily, the supply hoses do not need to be disconnected and an expensive mess is avoided.

For example, referring to FIG. 44, a clog 196 formed within a vee manifold 10 of the present disclosure can be easily cleaned. To clean a clog 196, a user only needs to remove static mixing tip 192 from second side 20 of vee manifold 10. With static mixing tip 192 removed, a tool such as drill bit 198 can be inserted into first channel 60 and/or second channel 70 to quickly and easily clean the channels 60 and 70. Because first channel longitudinal axis 62 and second channel longitudinal axis 72 are linear as shown in FIG. 44, the drill bit 198 only needs to enter each channel 60 and 70 a single time to completely and efficiently clear out any clogs 196. Once the channels 60 and 70 are cleaned, static mixing tip 192 is secured to second side 20 of vee manifold 10.

Figure 45:
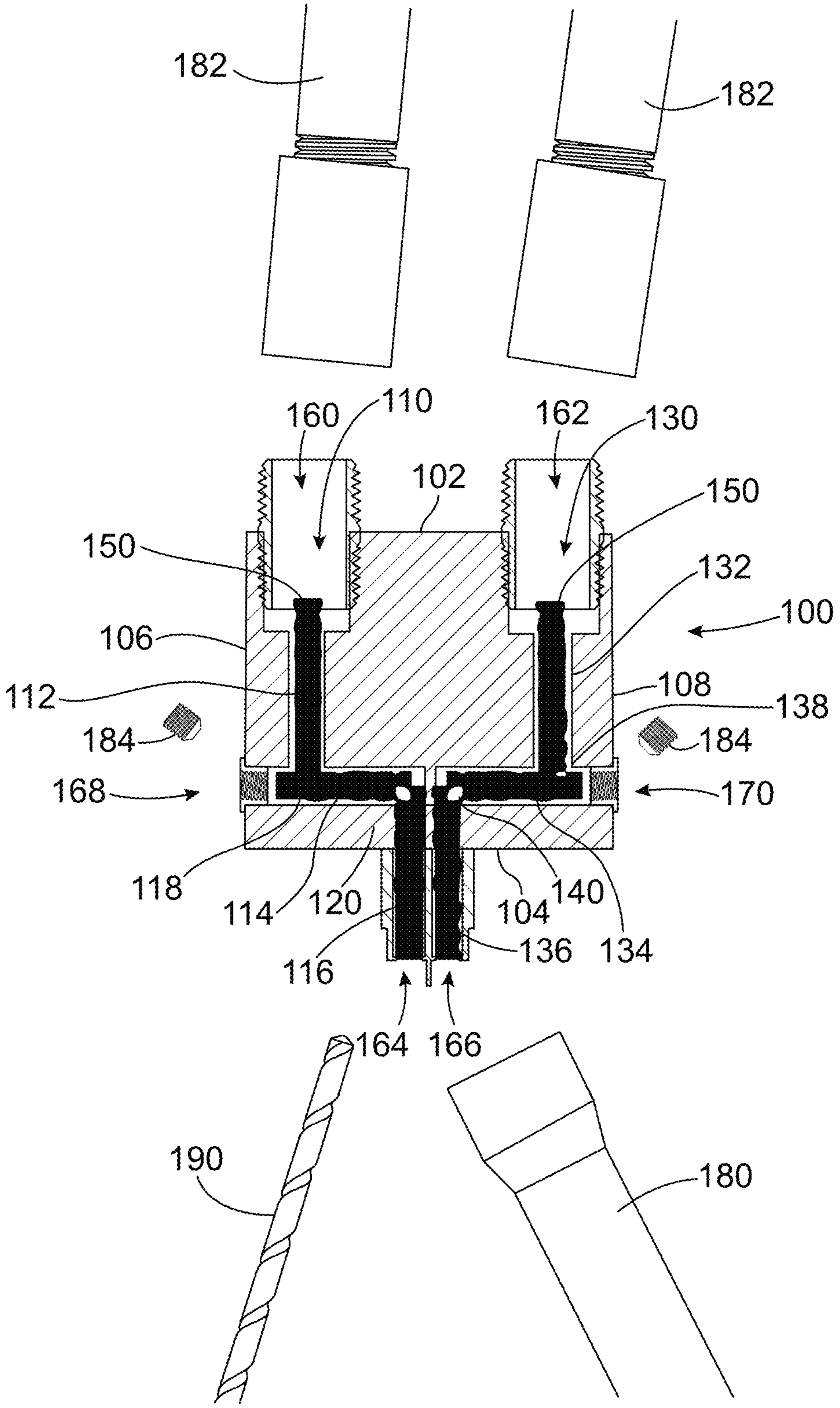
FIG. 45 PRIOR ART
FIG. 45 is a cross-sectional view of a prior art manifold.

Disadvantageously, referring to FIG. 45, a clog 150 formed within a prior art manifold 100 is difficult to clean. Prior art manifold 100 includes first side 102 defining first input 160 and second input 162, second side 104 defining third input 164 and fourth input 166, third side 106 defining fifth input 168, and fourth side 108 defining sixth input 170. A first channel 110 includes a first channel portion 112, a second channel portion 114 located perpendicular to first channel portion 112, and a third channel portion 116 located perpendicular to second channel portion 114. First and second channel portions 112 and 114 are connected by a first elbow or first ninety-degree turn 118 and second and third channel portions 114 and 116 are connected by a second elbow or second-ninety degree turn 120 as shown in FIG. 45. A second channel 130 includes a first channel portion 132, a second channel portion 134 located perpendicular to first channel portion 132, and a third channel portion 136 located perpendicular to second channel portion 134. First and second channel portions 132 and 134 are connected by a first elbow or first ninety-degree turn 138 and second and third channel portions 134 and 136 are connected by a second elbow or second-ninety degree turn 140 as shown in FIG. 45. As discussed previously, to clean a clog 150 from a prior art manifold 100, a user needs to remove a downstream plumbing component 180, liquid supply lines 182, and side set screws 184 as shown in FIG. 45. Next, a user must plug liquid supply lines 182 to prevent undesired drainage. Only after all these components are removed may a tool such as drill bit 190 be inserted. However, to clean first channel 110, a user must insert the drill bit 190 into first input 160 to clear out the clog 150 in first channel portion 112. Next, the user must insert the drill bit 190 into third input 164 to clear out the clog 150 in third channel portion 116. Next, the user must insert the drill bit 190 into fifth input 168 to clear out the clog 150 in second channel portion 114. To clean second channel 130, a user must insert the drill bit 190 into second input 162 to clear out the clog 150 in first channel portion 132. Next, the user must insert the drill bit 190 into fourth input 166 to clear out the clog 150 in third channel portion 136. Next, the user must insert the drill bit 190 into sixth input 170 to clear out the clog 150 in second channel portion 134. After all six of these inputs are cleaned, then a user must reinstall side set screws 184, remove the plugs in liquid supply lines 182, reconnect the liquid supply lines 182, and reconnect downstream plumbing component 180. The process to clean a prior art manifold 100 is very time consuming and complicated.

FIG. 45 also highlights the need to have the supply line fittings 182 separated, but the straight parallel channels 164 and 166, if extended up stream to first side 102, would not allow room for plumbing fittings.

Where mixing occurs downstream of the vee manifold 10, an efficient method of preventing overnight hardening in the vee manifold 10 is to insert grease in the grease ports.

Comparative Example: A white lap adhesive is commonly used in the roofing industry to seal membranes. The white lap adhesive involves the mixing of a first material comprising of polyurethane polymer and an isocyanate, and a second material comprising a polyol and polypropylene glycol. Common industry practice utilizes wye manifolds, as shown in U.S. patent application publication 2012/0012054 A1 FIG. 5, for this application. Chemical reaction within wye manifolds can create a solid clog requiring one hour of down time to restore the wye manifolds to production. A preferred embodiment of the vee manifold 10 of the present disclosure made of UHMW, having two inlets 12, two cylindrical channels 60, 70, individual outlet openings 22 and a mixing tip, was used with a white lap adhesive and similar clogs cleared in about 15 seconds upon applying upstream pressure from the fluids.

FIGS. 55-75 illustrate an exemplary embodiment of an insert 720 that is removably connectable to a channel, e.g., either a first channel 706 or a second channel 708, of an exit portion 702 of a manifold 700 in accordance with the present disclosure.

Referring to FIGS. 55-62, a first insert 720 of the present disclosure generally includes a first insert body 722 that extends between a first end 724 and a second end 726. The first insert body 722 includes a first insert external threaded portion 728 that is removably connectable to a channel internal connection portion 710 (FIG. 63) of the channel, e.g., either the first channel 706 or the second channel 708. The first insert body 722 defines a first insert channel 730, wherein the first insert channel 730 defines a first insert diameter D1 that is less than a channel diameter D5 (FIG.

63) of the channel, e.g., either the first channel 706 or the second channel 708. Further, the first insert body 722 defines a first insert length L1.

Figure 56:
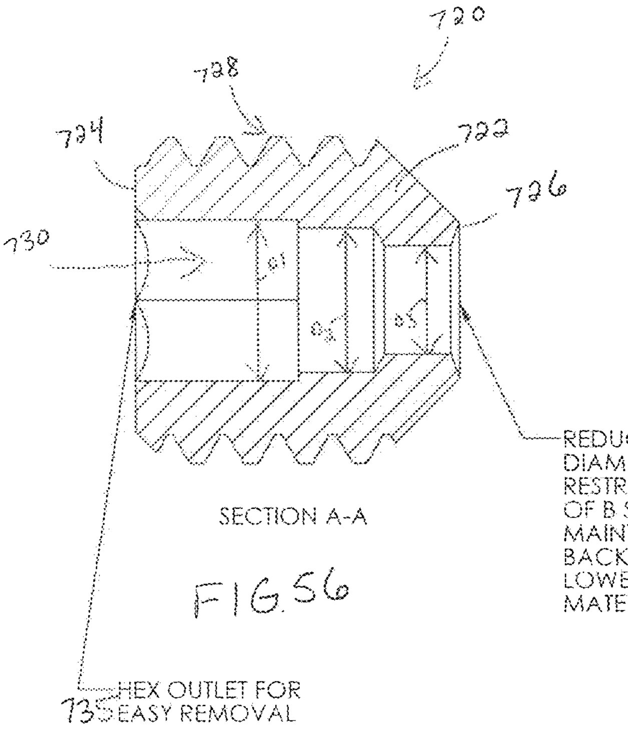
FIG. 56 is a cross-sectional view taken along line A-A of FIG. 55 in accordance with an exemplary embodiment of the present disclosure.
Figure 57:
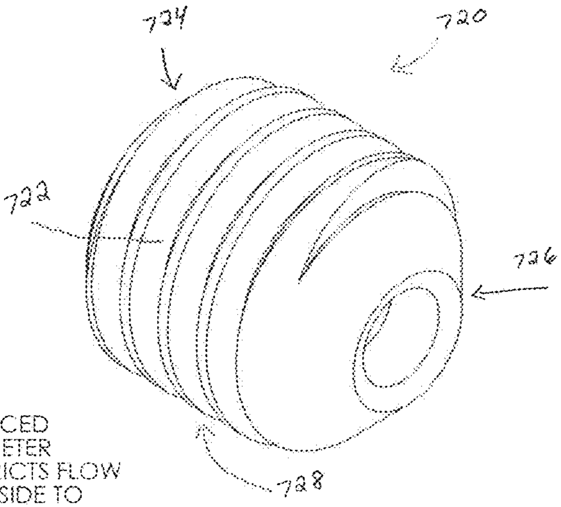
FIG. 57 is a perspective view of an insert for a manifold in accordance with an exemplary embodiment of the present disclosure.
Figure 55:
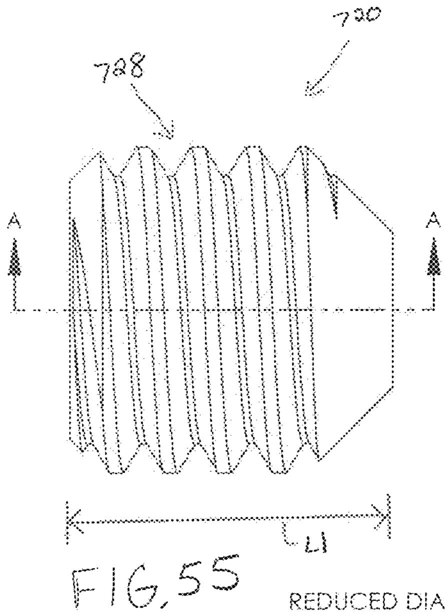
FIG. 55 is a side view of an insert for a manifold in accordance with an exemplary embodiment of the present disclosure.
Figure 58:
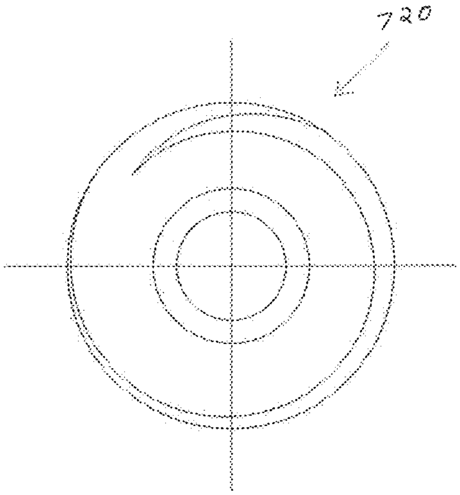
FIG. 58 is a side elevation view of an insert for a manifold in accordance with an exemplary embodiment of the present disclosure.

Referring to FIG. 56, in an exemplary embodiment, the first insert 720 defines a first insert channel 730 defining a plurality of different diameters, e.g., a first insert first diameter D1, a first insert second diameter D2, and a first insert third diameter D3. In this manner, a flow rate of a substance through the first insert channel 730 of the first insert 720 can be controlled as desired for a particular application. It is envisioned that the first insert channel 730 may define any number of different diameters for a variety of different substance flow rate configurations.

Referring to FIGS. 63-73, in exemplary embodiments, the first insert 720 is removably connectable to a channel, e.g., either the first channel 706 or the second channel 708. For the sake of brevity, the first insert 720 being connected to the first channel 706 will now be described. In an exemplary embodiment, the first insert 720 is connected to the first channel 706 via connection between the first insert external threaded portion 728 of the first insert 720 engaging with a first channel internal connection portion 710 of the first channel 706. Again, the first channel 706 or the second channel 708 or both may include such a channel internal connection portion 710 that can engage the first insert external threaded portion 728 of the first insert 720.

With the first insert 720 connected to the first channel internal connection portion 710 of the first channel 706, a flow rate of the first substance 712 that travels through the first channel 706 can be controlled as described below.

Referring to FIGS. 65-73, a first substance 712 travels through the first channel 706 and a second substance 714 travels through the second channel 708. In some applications, the first substance 712 and the second substance 714 have different viscosities. For example, the second substance 714 has a higher viscosity than the first substance 712 and there may be a higher volume of the second substance 714 than the first substance 712. In such situations, it may be difficult to mix the first substance 712 and the second substance 714 in a static mixing tip 790 due to the higher viscous second substance 714. To solve this problem, by connecting the first insert 720 to the first channel 706 as described herein, the flow rate of the first substance 712 through the first channel 706 is increased by traveling through the smaller diameter of the first insert channel 730, i.e., the first insert diameter D1. This increase in pressure and flow rate of the first substance 712 enhances penetration of the first substance 712 to the second substance 714 in the static mixing tip 790 thereby more efficiently mixing the first substance 712 and the second substance 714 together.

In an exemplary embodiment, the first insert channel 730 is configured to restrict or increase a flow of a substance 712, 714 through the channel 706, 708. In an exemplary embodiment, the first insert channel 730 is configured to increase or decrease a pressure of a flow of a substance 712, 714 through the channel 706, 708.

In an exemplary embodiment, the first insert channel 730 is configured to promote more efficient mixing of the substances 712, 714. In an exemplary embodiment, referring to FIG. 66, with the first insert 720 connected to the first channel 706, the first channel 706 and the first insert 720 together define a longer length than the second channel 708.

Figure 67:
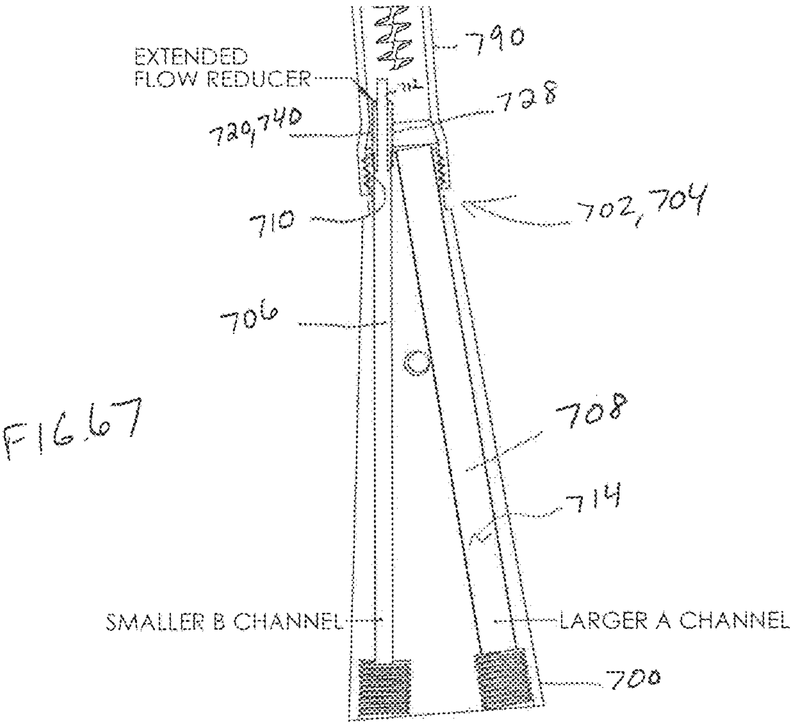
FIG. 67 is a cross-sectional view a manifold and a static mixing tip with an insert connected to a channel of the manifold in accordance with an exemplary embodiment of the present disclosure.
Figure 68:
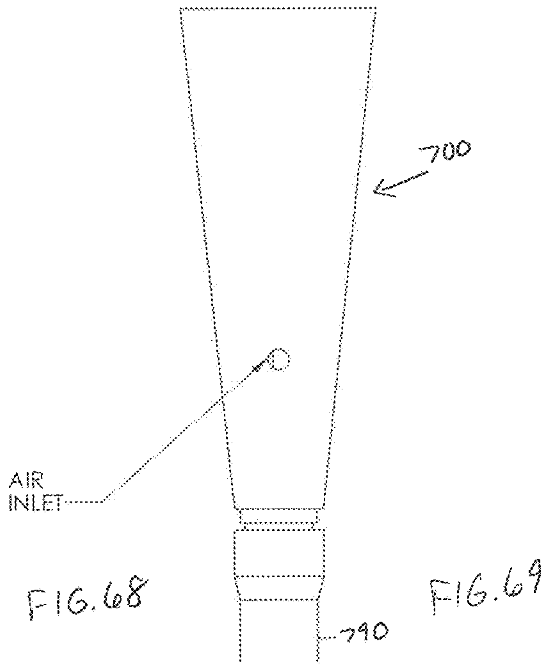
FIG. 68 is a first side elevation view of a manifold and a static mixing tip connected in accordance with an exemplary embodiment of the present disclosure.
Figure 69:
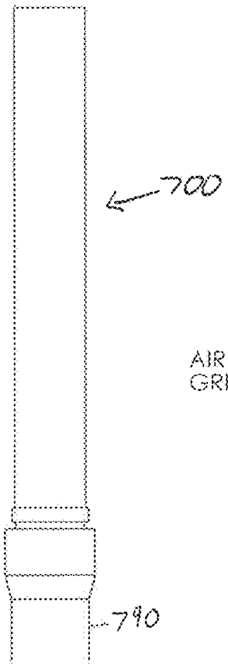
FIG. 69 is a side elevation view of a manifold and a static mixing tip in accordance with an exemplary embodiment of the present disclosure.
Figure 70:
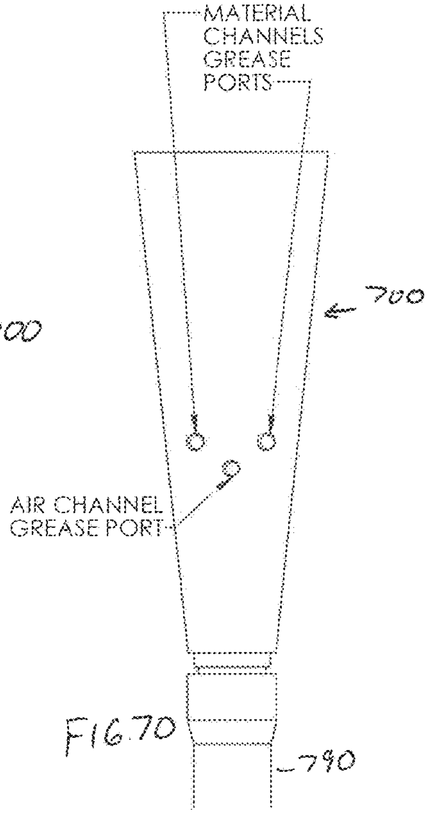
FIG. 70 is a second side elevation view of a manifold and a static mixing tip in accordance with an exemplary embodiment of the present disclosure.
Figure 74:
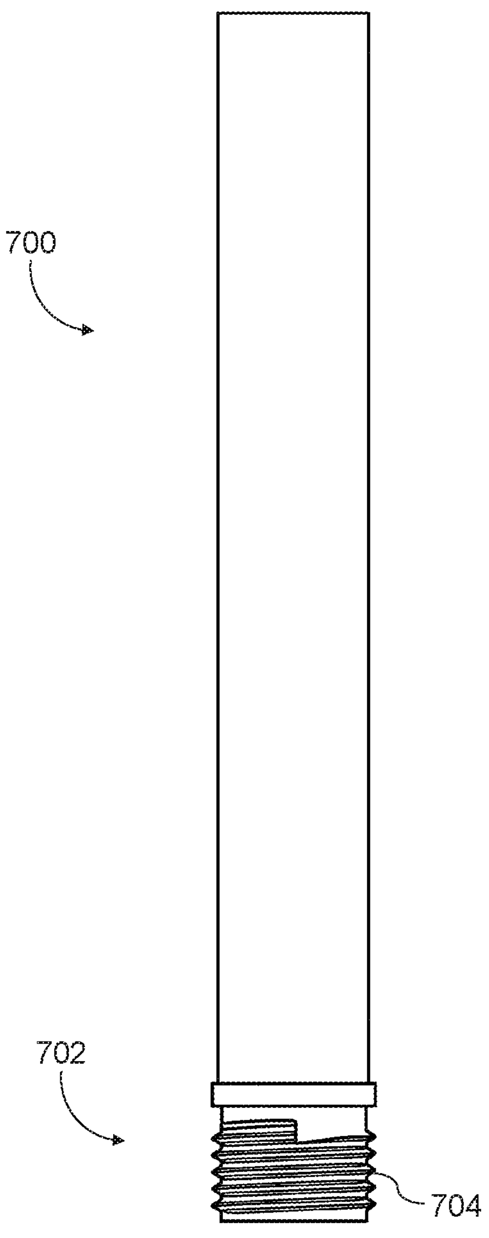
FIG. 74 is a side elevation view of a manifold in accordance with an exemplary embodiment of the present disclosure.

Another advantage of the first insert 720 is that the first insert 720 having the first insert length L1 improves the location of the exit at second end 726 of the first insert 720 by being deeper and more centrally located into the static mixing tip 790, as best shown in FIGS. 67 and 72. This improved location of the exit that the first substance 712 flows out of the second end 726 of the first insert 720 promotes better mixing of the first substance 712 and the second substance 714 together. For example, referring to FIGS. 66, 67, and 72, in an exemplary embodiment, with the first insert 720 connected to the first channel 706, a distance that an outlet, e.g., the second end 726 of the first insert 720, of the first insert channel 730 is spaced away from an exit 709 (FIG. 75) of the second channel 708 is greater than a distance an exit 707 (FIG. 75) of the first channel 706 is spaced from the exit 709 of the second channel 708. In other words, with the first insert 720 connected to the first channel 706, an outlet, e.g., the second end 726 of the first insert 720, of the first insert channel 730 is spaced a greater distance from the connection portion 704 of the manifold 700 than an exit 709 of the second channel 708. In exemplary embodiments, with the first insert 720 connected to the first channel 706, an outlet, e.g., the second end 726 of the first insert 720, of the first insert channel 730 is located closer to a connection portion longitudinal axis 705 (FIGS. 66 and 75) than an exit 707, 709 of the channels 706, 708.

In other exemplary embodiments, a multiple of different sized inserts can be removably connected to a channel, e.g., either a first channel 706 or a second channel 708, of an exit portion 702 of a manifold 700 in accordance with the present disclosure. In this manner, different sized inserts can be used with the channels 706, 708 of the manifold 700 to control the flow rate of the first substance 712 and the second substance 714 through the channels 706, 708 as desired for a variety of different substance dispensing applications.

For example, referring to FIGS. 59-62, in another exemplary embodiment, a second insert 740 is provided. It is contemplated that any number of inserts of the present disclosure having any number of sizes, lengths, and/or geometries can be used in combination with the channels 60, 70 of the manifold 10 of the present disclosure.

The second insert 740 of the present disclosure generally includes a second insert body 742 that extends between a first end 744 and a second end 746. The second insert body 742 includes a second insert external threaded portion 748 that is removably connectable to a channel internal connection portion 710 (FIG. 63) of the channel, e.g., either the first channel 706 or the second channel 708. The second insert body 742 defines a second insert channel 750, wherein the second insert channel 750 defines a second insert diameter D4 that is less than a channel diameter D3 (FIG. 63) of the channel, e.g., either the first channel 706 or the second channel 708. Further, the second insert body 742 defines a second insert length L2.

Figure 60:
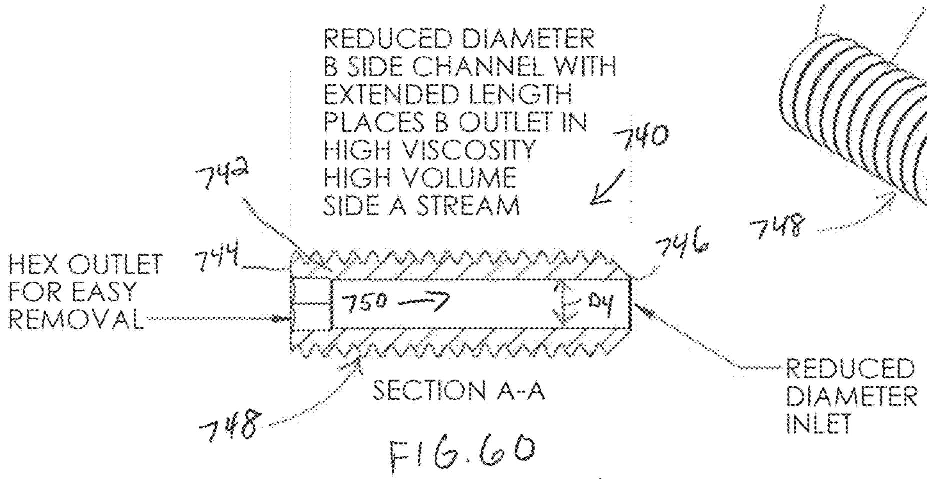
FIG. 60 is a cross-sectional view taken along line A-A of FIG. 59 in accordance with an exemplary embodiment of the present disclosure.
Figure 61:
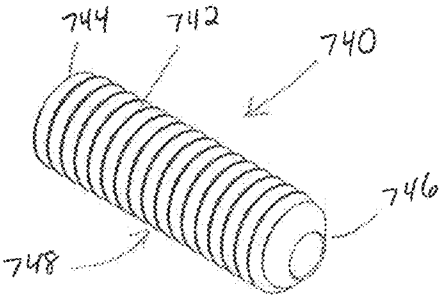
FIG. 61 is a perspective view of an insert for a manifold in accordance with an exemplary embodiment of the present disclosure.
Figure 59:
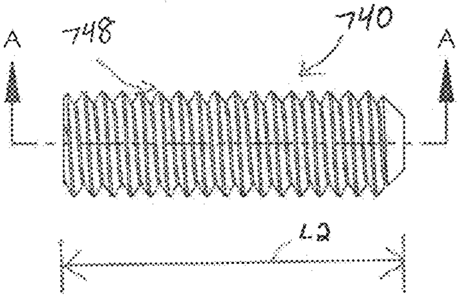
FIG. 59 is a side view of an insert for a manifold in accordance with an exemplary embodiment of the present disclosure.
Figure 62:
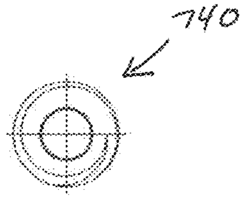
FIG. 62 is a side elevation view of an insert for a manifold in accordance with an exemplary embodiment of the present disclosure.
Figure 63:
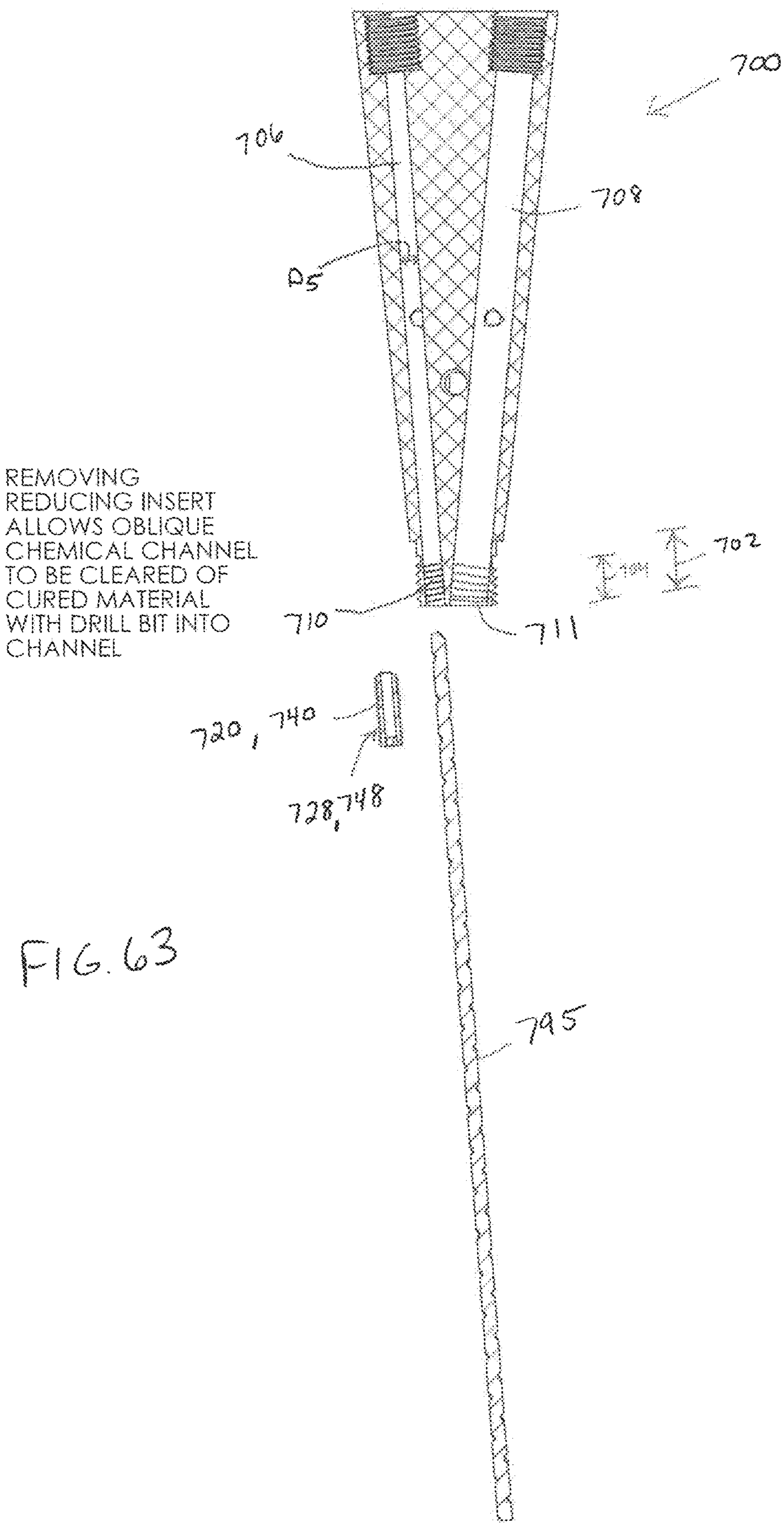
FIG. 63 is a cross-sectional view of a manifold, a drill bit, and an insert in accordance with an exemplary embodiment of the present disclosure.
Figure 64:
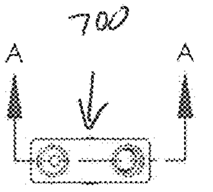
FIG. 64 is a first side elevation view of a manifold in accordance with an exemplary embodiment of the present disclosure.
Figure 65:
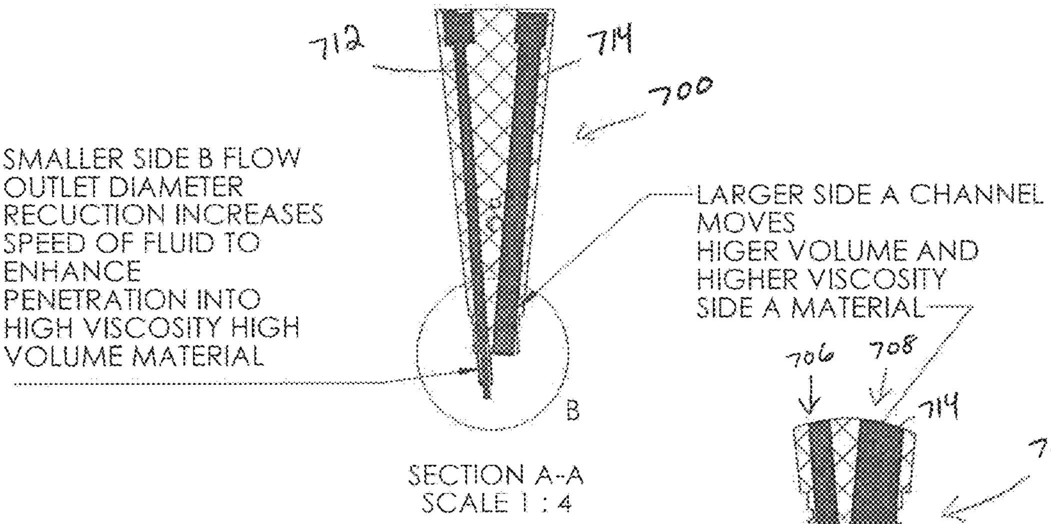
FIG. 65 is a cross-sectional view taken along line A-A of FIG. 64 with an insert connected to a channel of a manifold in accordance with an exemplary embodiment of the present disclosure.
Figure 66:
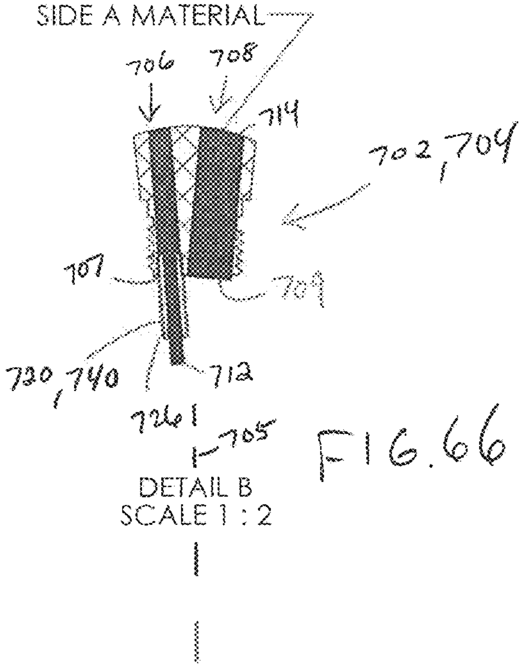
FIG. 66 is an enlarged, cross-sectional view of FIG. 65 in accordance with an exemplary embodiment of the present disclosure.

Referring to FIG. 60, in an exemplary embodiment, the second insert 720 defines a second insert channel 730 defining a second insert diameter D4 that is different than the first insert diameter D1 of the first insert 720 (FIG. 56). Furthermore, the second insert length L2 of the second insert 740 is different than the first insert length L1 of the first insert 720. In this manner, the first insert 720 and the second insert 740 are able to control the flow rates of the first substance 712 and the second substance 714 through the channels 706, 708 differently and can be used for a variety of different substance dispensing applications as needed.

It is also contemplated that the second insert channel 750 may define a plurality of different diameters, as described in detail above with respect to the first insert channel 730 (FIG. 56). In this manner, a flow rate of a substance through the second insert channel 750 of the second insert 740 can be controlled as desired for a particular application. It is envisioned that the second insert channel 750 may define any number of different diameters for a variety of different substance flow rate configurations.

Advantageously, the inserts 720, 740 are easily connected to the channels 706, 708 and easily removed from the channels 706, 708 as needed. With the inserts 720, 740 removed from the channels 706, 708, a drill bit 795 (FIG. 63) can be used to clean the channels 706, 708. In an exemplary embodiment, the first insert 720 includes a removal portion 735 (FIG. 56) configured to allow for removal of the first insert 720 from the channel 706, 708.

Figure 75:
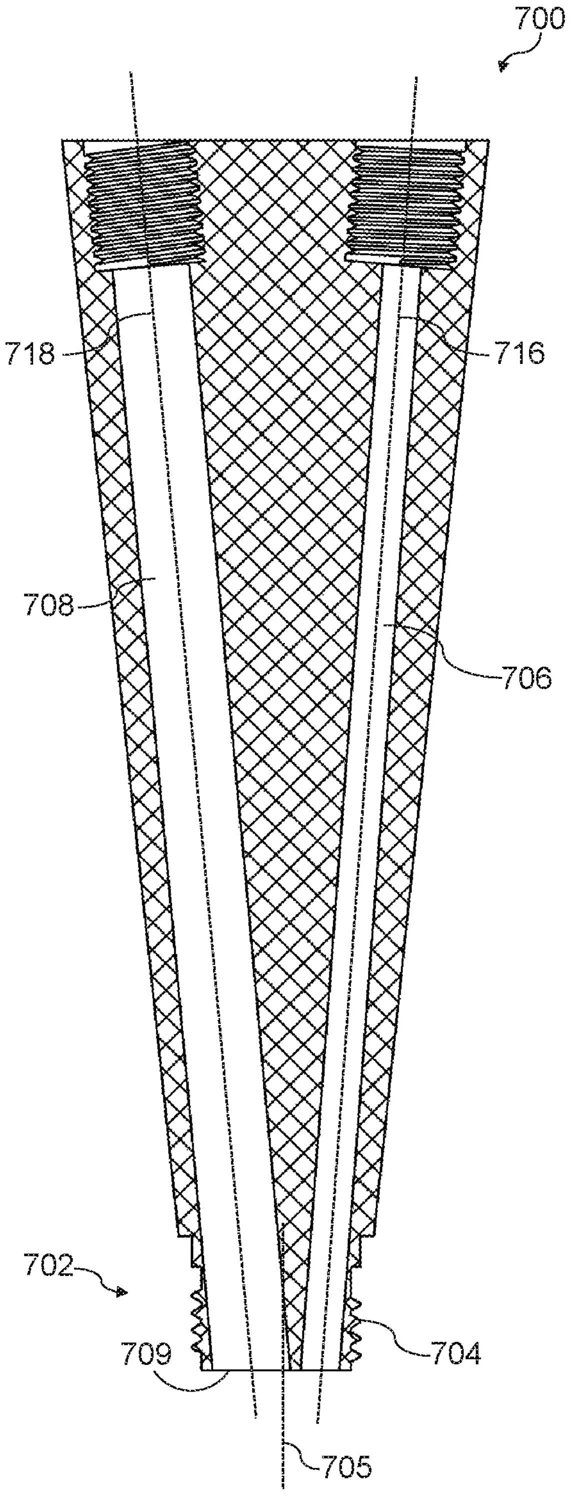
FIG. 75 is a cross-sectional view taken along line A-A of FIG. 74 in accordance with an exemplary embodiment of the present disclosure.
Figure 77:
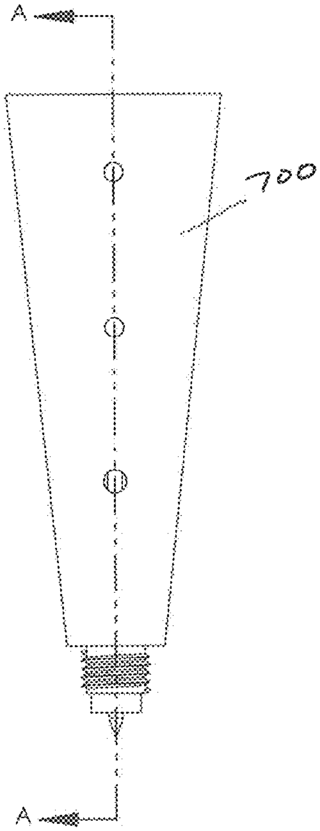
FIG. 77 is a first side elevation view of a manifold with a valve assembly connected to a channel of the manifold in accordance with an exemplary embodiment of the present disclosure.
Figure 78:
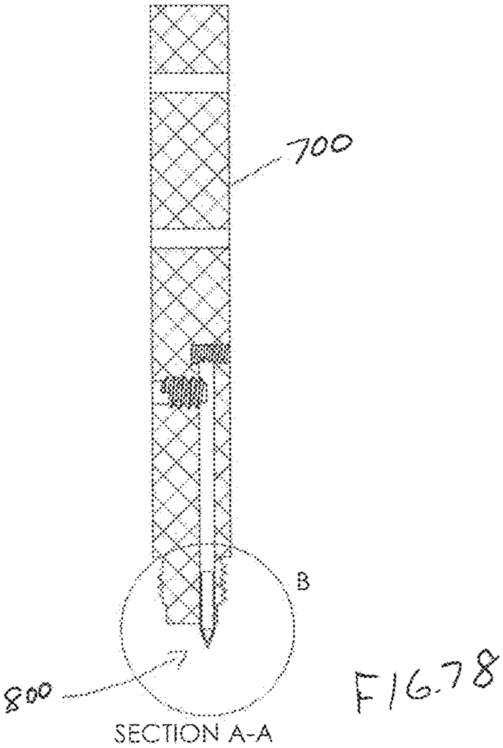
FIG. 78 is a cross-sectional view taken along line A-A of FIG. 77 with a valve assembly connected to a channel of a manifold in accordance with an exemplary embodiment of the present disclosure.
Figure 76:
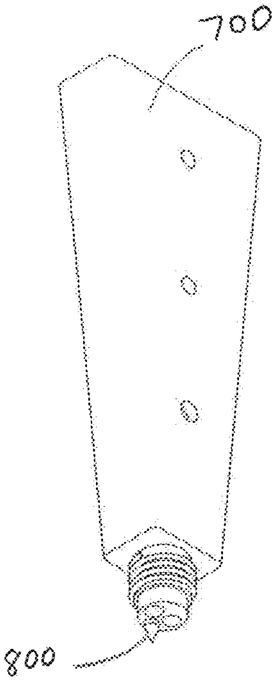
FIG. 76 is a perspective view of a manifold with a valve assembly connected to a channel of the manifold in accordance with an exemplary embodiment of the present disclosure.
Figure 79:
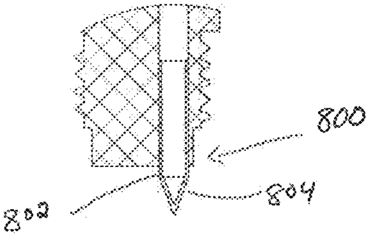
FIG. 79 is an enlarged, cross-sectional view of FIG. 78 in accordance with an exemplary embodiment of the present disclosure.

Referring to FIG. 75, in an exemplary embodiment, the first channel 706 defines a first channel longitudinal axis 716 and the second channel 708 defines a second channel longitudinal axis 718. In other exemplary embodiments, as discussed herein, the channels 706, 708 may include different sections each defining a different longitudinal axis.

For the reasons described herein, the inserts 720, 740 of the present disclosure provide many significant advantages to a manifold 700 of the present disclosure. Importantly, the first channel 706 including a first channel internal connection portion 710 (FIG. 63) and the second channel 708 including a second channel internal connection portion 711 (FIG. 63) enables this technology. The channel internal connection portions 710, 711 allow for the removably connection between the channels 706, 708 and the inserts 720, 740.

FIGS. 75-79 illustrate an exemplary embodiment of a valve assembly 800 that can be used with a channel 706, 708 of a manifold 700 in accordance with the present disclosure. The valve assembly 800 is used to form a barrier over the exits 707, 709 of the channels 706, 708 to prevent any debris, contaminants, or clogs from entering the channels 706, 708. In an exemplary embodiment, the valve assembly 800 can be removably connectable to a channel 706, 708 of the manifold 700.

In an exemplary embodiment, the valve assembly 800 generally includes a first valve portion 802 and a second valve portion 804 that are configured to transition between a closed position and an open position. In use, the valve assembly 800 can be connected to a channel 706, 708 of the manifold 700 when desired. Advantageously, with the valve assembly connected to a channel 706, 708 of the manifold 700, the channel 706, 708 is protected. Furthermore, if a flow of air is forced through the channels 706, 708, the pressure of the air causes the first valve portion 802 and the second valve portion 804 to open to allow the flow of air out the exit 707, 709 of the channels 706, 708. When the flow of air is stopped, the first valve portion 802 and the second valve portion 804 seal back together. In exemplary embodiments, the first valve portion 802 and the second valve portion 804 are formed of materials that seal together and prevent debris from entering the channels 706, 708 with the valve assembly 800 in the closed position.

Referring to FIGS. 80-99, in other exemplary embodiments of the present disclosure, the channels and portions of a manifold 10 of the present disclosure is envisioned to have other configurations in accordance with the features and benefits of the manifold 10 described herein.

Figure 80:
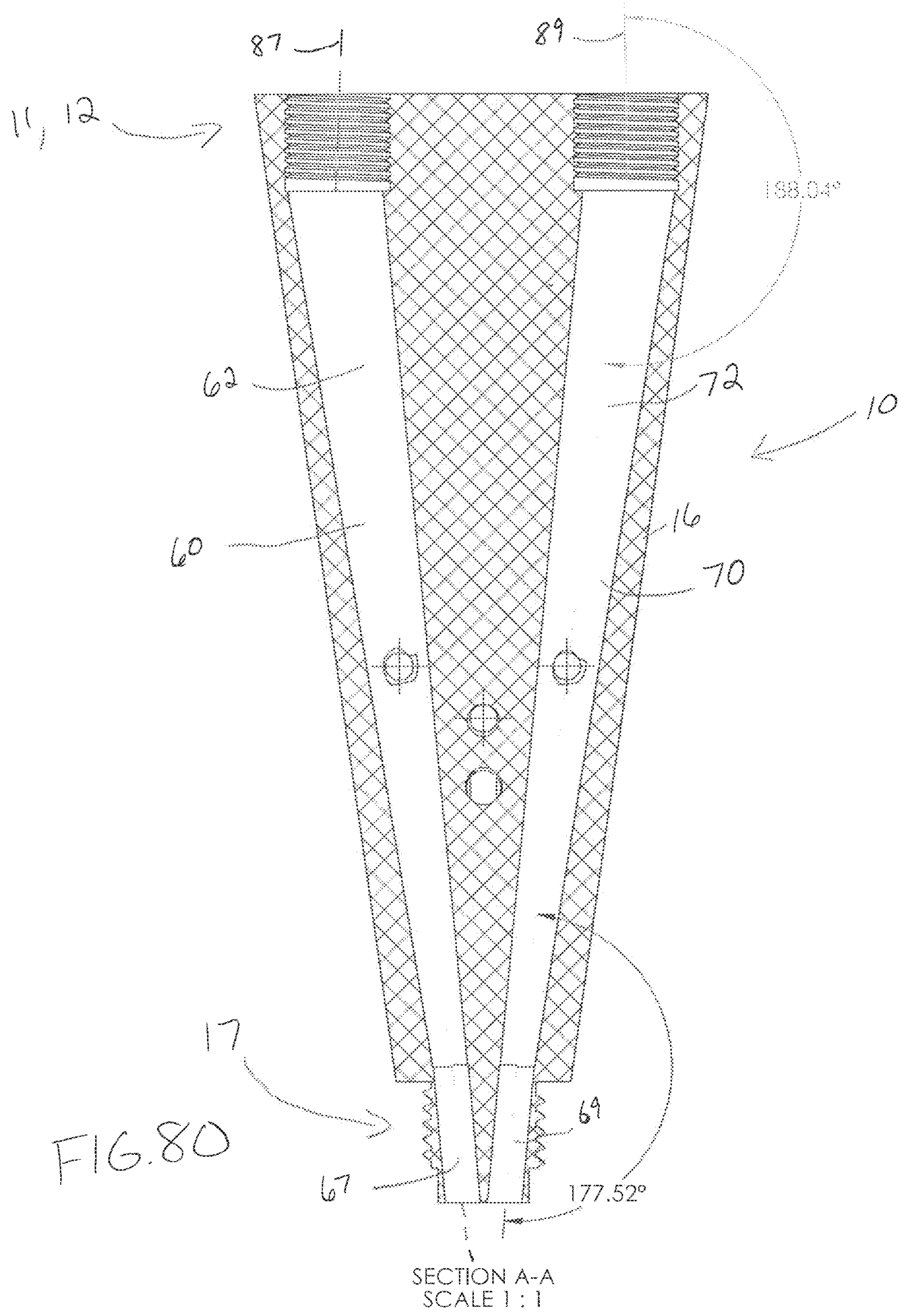
FIG. 80 is a cross-sectional view a manifold in accordance with an exemplary embodiment of the present disclosure.
Figure 81:
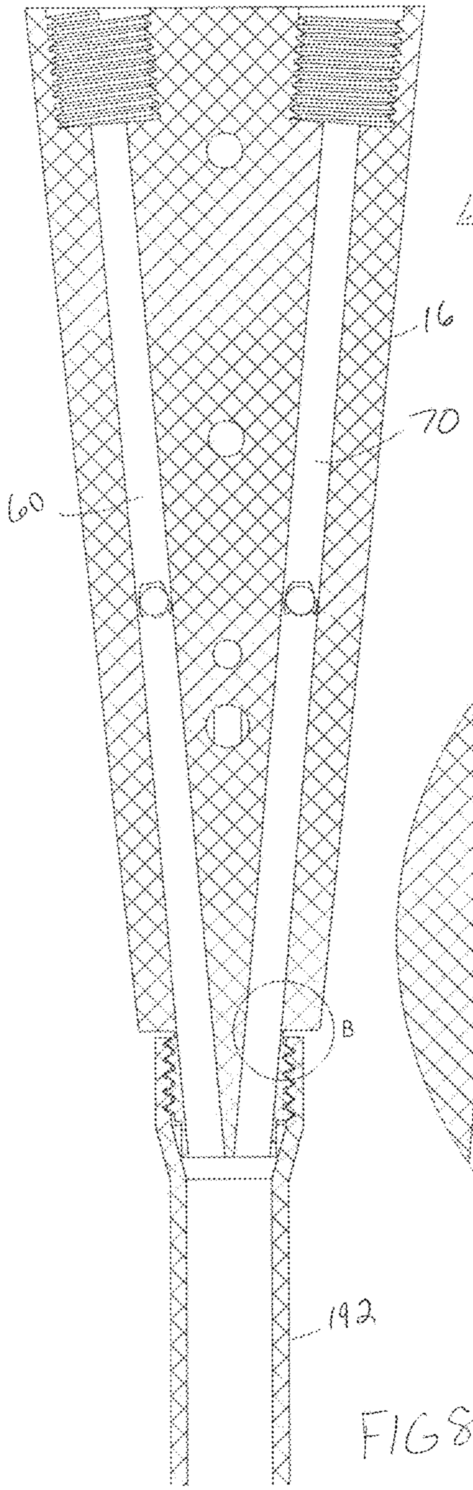
FIG. 81 is a cross-sectional view a manifold and a static mixing tip in accordance with an exemplary embodiment of the present disclosure.
Figure 82:
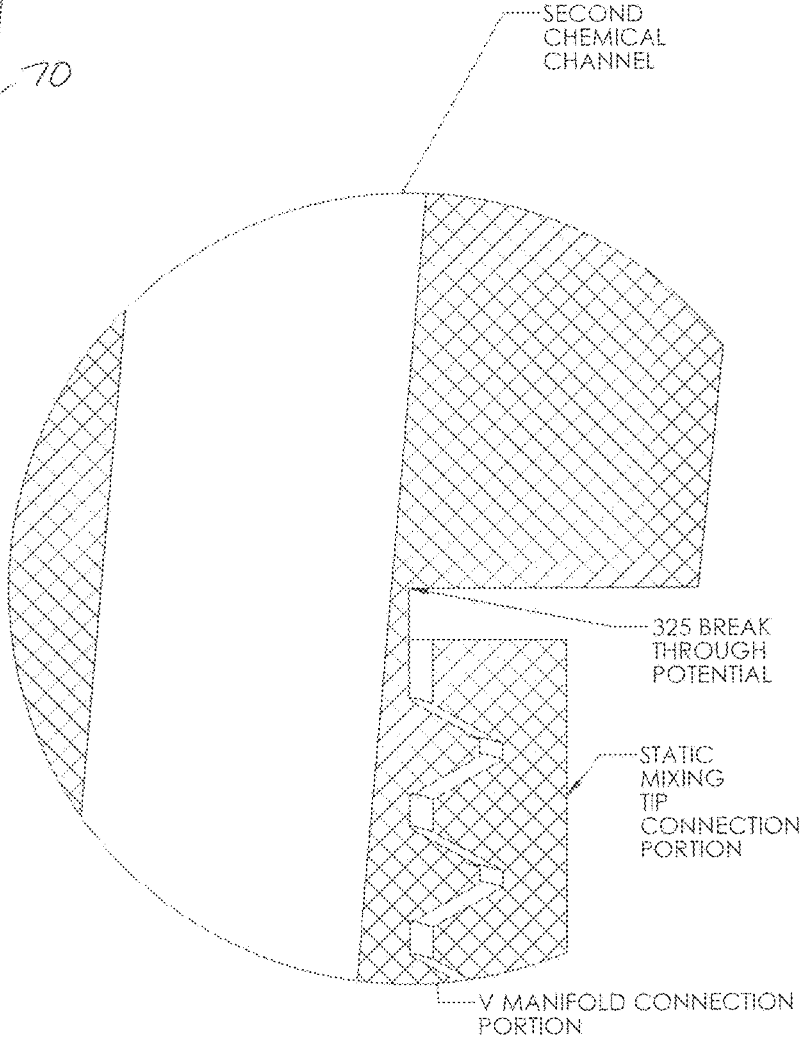
FIG. 82 is an enlarged, cross-sectional view of a portion of FIG. 81 in accordance with an exemplary embodiment of the present disclosure.
Figure 83:
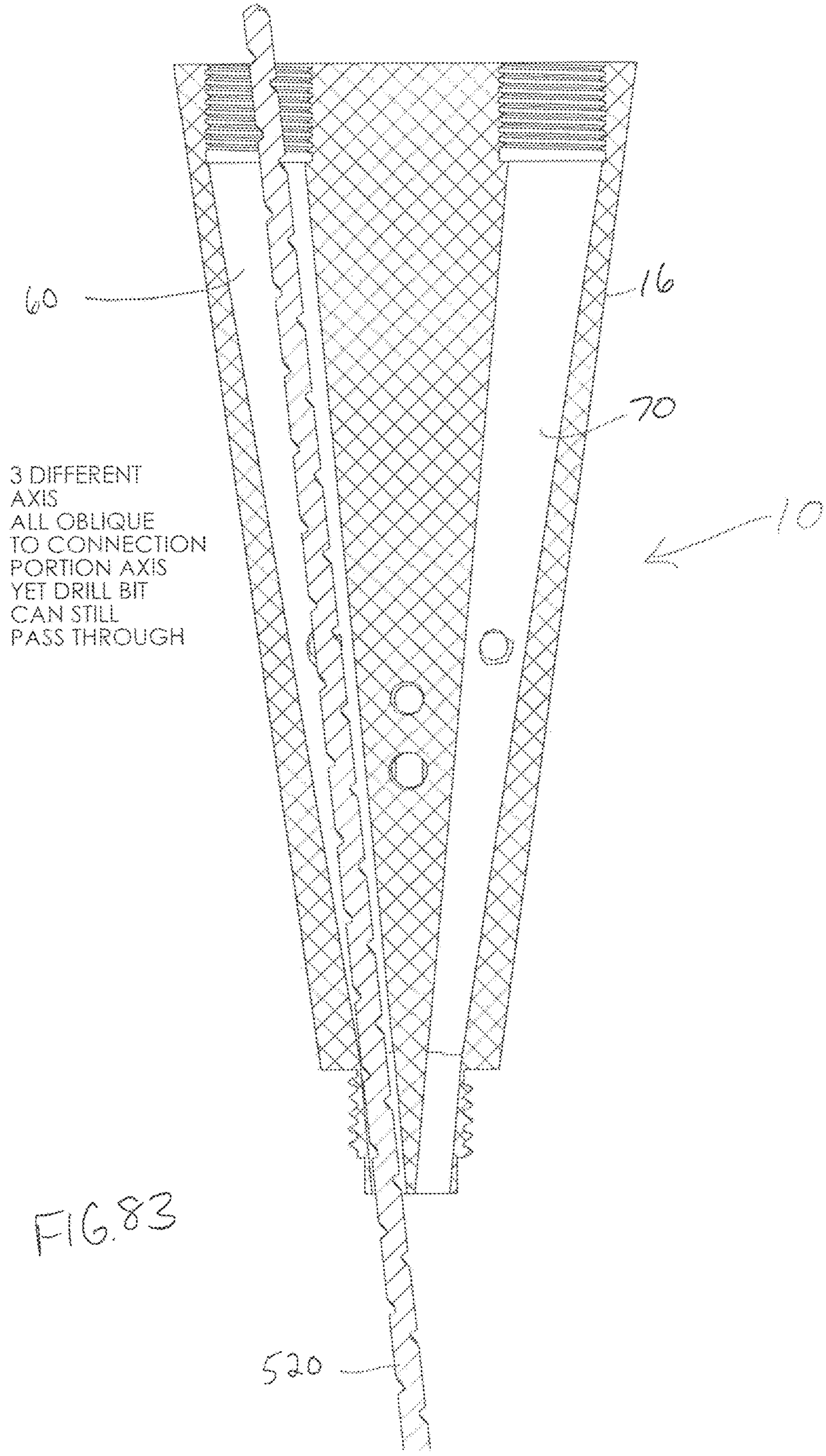
FIG. 83 is a cross-sectional view of a manifold with a drill bit inserted into a channel of the manifold in accordance with an exemplary embodiment of the present disclosure.
Figure 86:
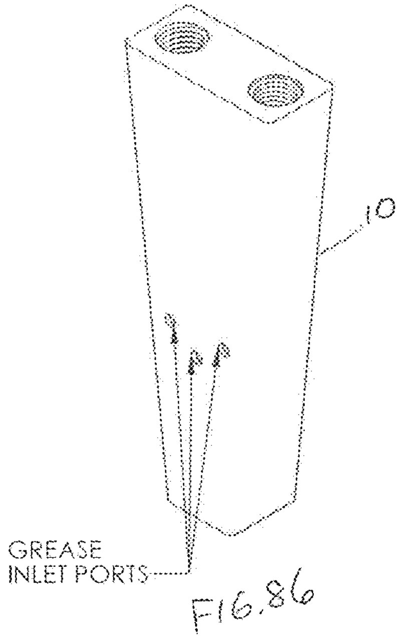
FIG. 86 is a first perspective view of a manifold in accordance with an exemplary embodiment of the present disclosure.
Figure 87:
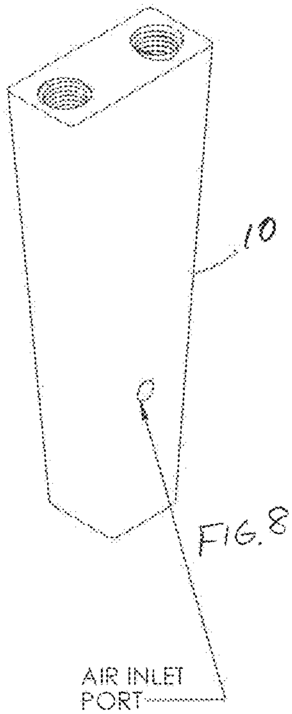
FIG. 87 is a second perspective view of a manifold in accordance with an exemplary embodiment of the present disclosure.
Figure 84:
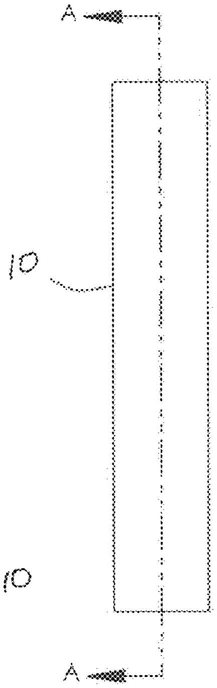
FIG. 84 is a side elevation view of a manifold in accordance with an exemplary embodiment of the present disclosure.
Figure 85:
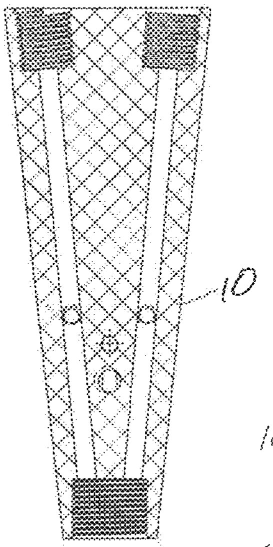
FIG. 85 is a cross-sectional view taken along line A-A of FIG. 84 in accordance with an exemplary embodiment of the present disclosure.
Figure 88:
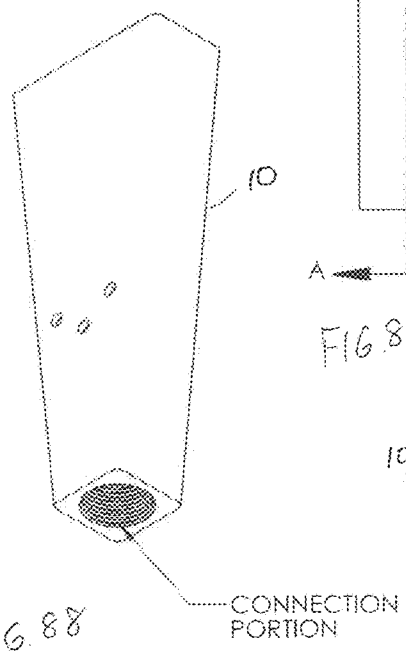
FIG. 88 is a third perspective view of a manifold in accordance with an exemplary embodiment of the present disclosure.
Figure 90:
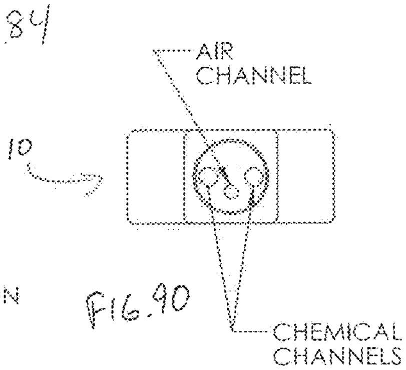
FIG. 90 is an exit side view of a manifold in accordance with an exemplary embodiment of the present disclosure.
Figure 89:
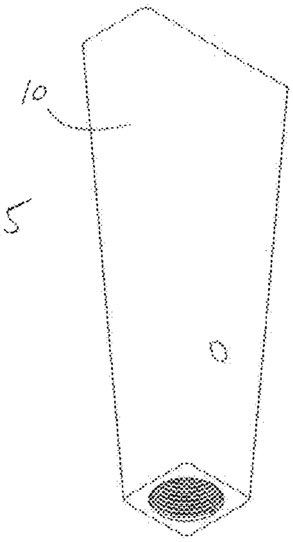
FIG. 89 is a fourth perspective view of a manifold in accordance with an exemplary embodiment of the present disclosure.
Figure 93:
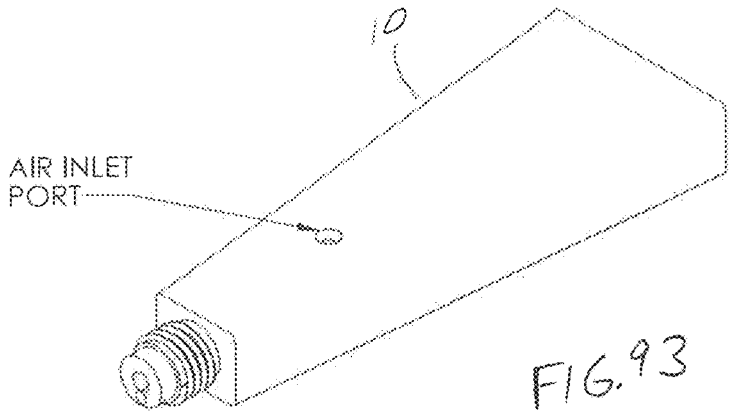
FIG. 93 is a first perspective view of a manifold in accordance with an exemplary embodiment of the present disclosure.
Figure 91:
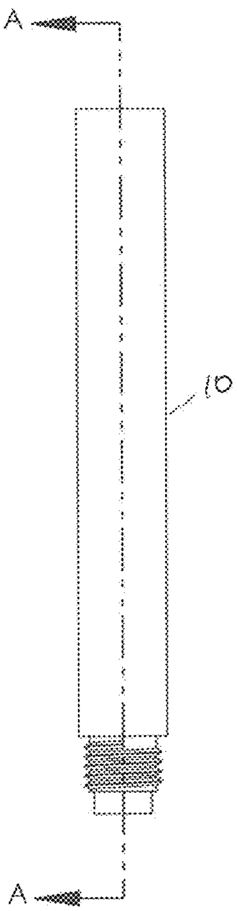
FIG. 91 is a side elevation view of a manifold in accordance with an exemplary embodiment of the present disclosure.
Figure 92:
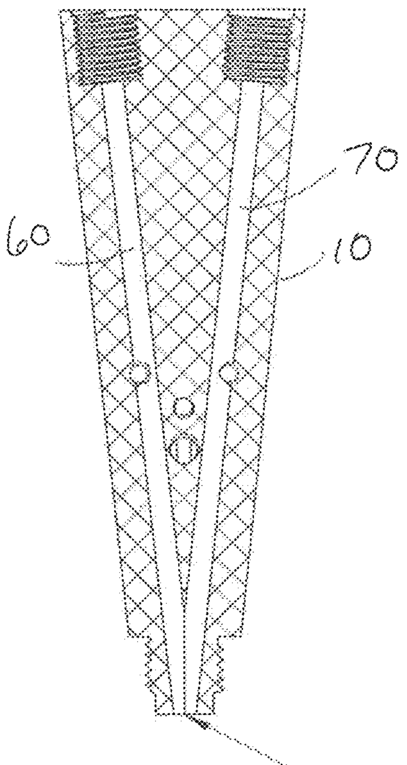
FIG. 92 is a cross-sectional view taken along line A-A of FIG. 91 in accordance with an exemplary embodiment of the present disclosure.
Figure 94:
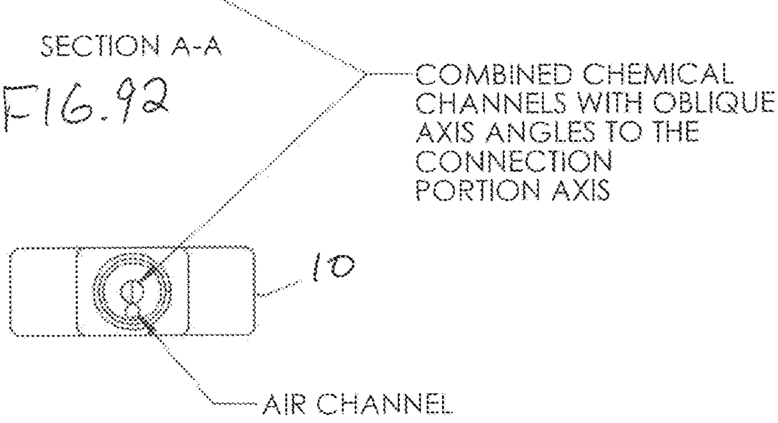
FIG. 94 is an exit side view of a manifold in accordance with an exemplary embodiment of the present disclosure.
Figure 95:
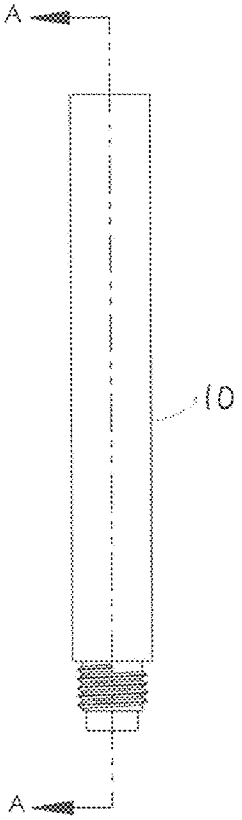
FIG. 95 is a side elevation view of a manifold in accordance with an exemplary embodiment of the present disclosure.
Figure 96:
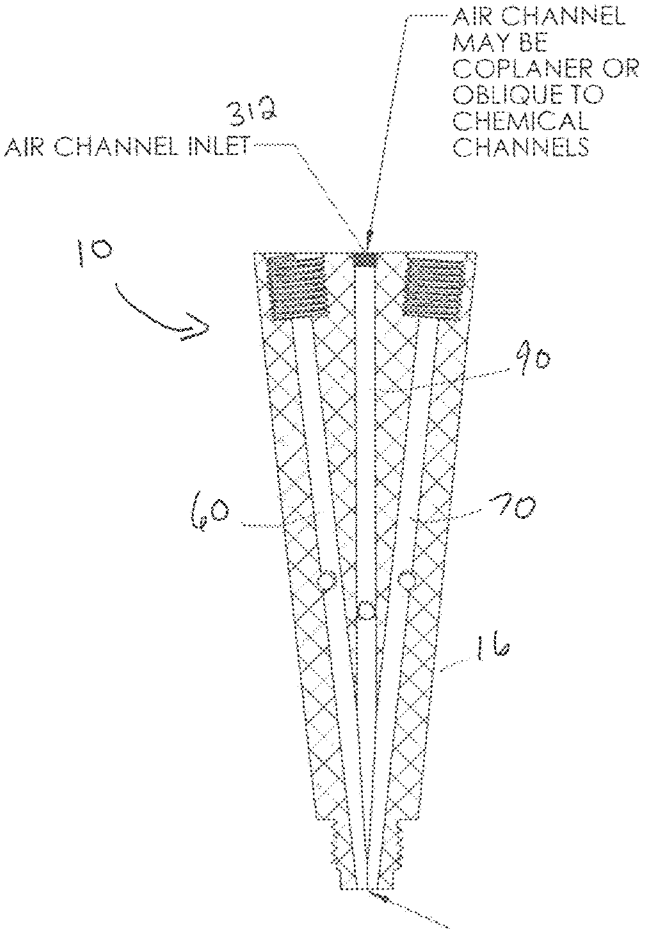
FIG. 96 is a cross-sectional view taken along line A-A of FIG. 95 in accordance with an exemplary embodiment of the present disclosure.
Figure 97:
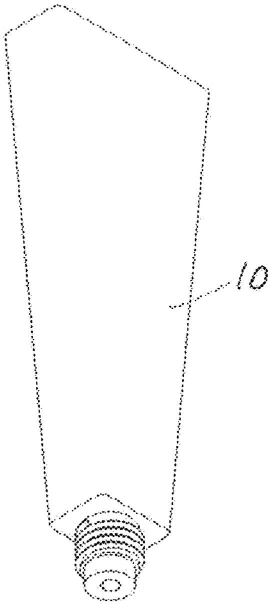
FIG. 97 is a first perspective view of a manifold in accordance with an exemplary embodiment of the present disclosure.
Figure 98:
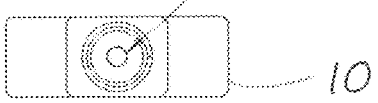
FIG. 98 is an exit side view of a manifold in accordance with an exemplary embodiment of the present disclosure.
Figure 99:
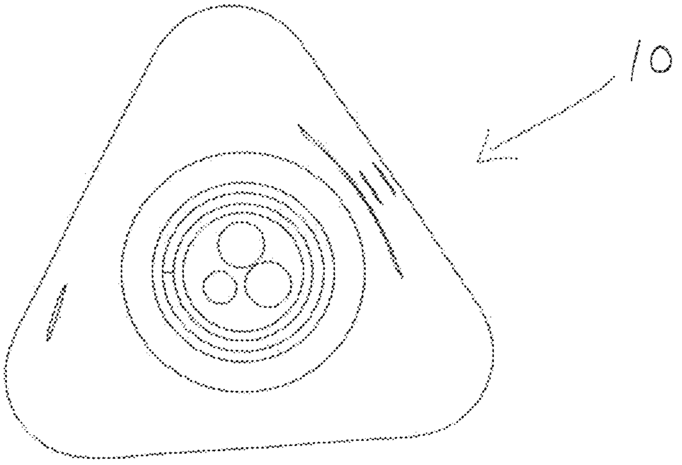
FIG. 99 is an exit side view of a manifold in accordance with an exemplary embodiment of the present disclosure.

Referring to FIG. 80, in an exemplary embodiment of the present disclosure, (A) the longitudinal axes 87, 89 at the inlet portion 11, (B) the longitudinal axes 62, 72 of the channels 60, 70, and (C) the longitudinal axes 67, 69 at the exit portion 17 are not collinear. Referring to FIG. 83, in such an embodiment, a drill bit 520 is able to be used to clean out all the channel portions in a single use.

Further aspects of the invention are provided by the subject matter of the following clauses:

1. An exit portion of a manifold configured for a first substance and a second substance to travel therethrough, the exit portion comprising: a connection portion defining a connection portion longitudinal axis; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.
2. The exit portion of any preceding clause, wherein the first channel is configured to receive the first substance.
3. The exit portion of any preceding clause, wherein the second channel is configured to receive the second substance.
4. The exit portion of any preceding clause, wherein the third channel is configured to receive a flow of air.
5. The exit portion of any preceding clause, wherein the first substance is a first part of a multiple component adhesive and the second substance is a second part of the multiple component adhesive.
6. The exit portion of any preceding clause, wherein the third channel is parallel to the connection portion longitudinal axis.
7. The exit portion of any preceding clause, wherein the third channel is oblique to the connection portion longitudinal axis.
8. The exit portion of any preceding clause, further comprising a fourth channel extending through the connection portion, the fourth channel defining a fourth channel longitudinal axis, wherein the fourth channel within the connection portion is oblique to the first channel and the second channel.
9. The exit portion of any preceding clause, wherein the fourth channel is configured to receive the flow of air.
10. The exit portion of any preceding clause, wherein the connection portion defines a diameter of approximately 0.75 inches.
11. The exit portion of any preceding clause, wherein the connection portion includes a nose portion that has a diameter smaller than the connection portion, wherein the nose portion defines a diameter of approximately 0.655 inches.
12. The exit portion of any preceding clause, wherein the connection portion comprises a threaded connection portion.
13. The exit portion of any preceding clause, wherein the connection portion comprises a twist lock securing tab connection portion.
14. The exit portion of any preceding clause, wherein a distance between the first channel longitudinal axis and the second channel longitudinal axis at the exit portion is approximately 0.31 inches.
15. A manifold for a first substance and a second substance to travel therethrough, the manifold comprising: a block having an inlet portion and an exit portion, the exit portion comprising a connection portion defining a connection portion longitudinal axis, wherein a first portion of the block defines an air inlet port; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the third channel is in fluid communication with the air inlet port, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

16. The manifold of any preceding clause, wherein the first channel is configured to receive the first substance.

17. The manifold of any preceding clause, wherein the second channel is configured to receive the second substance.

18. The manifold of any preceding clause, wherein the third channel is configured to receive a flow of air.

19. The manifold of any preceding clause, wherein the first substance is a first part of a multiple component adhesive and the second substance is a second part of the multiple component adhesive.

20. The manifold of any preceding clause, wherein the third channel is parallel to the connection portion longitudinal axis.

21. The manifold of any preceding clause, wherein the third channel is oblique to the connection portion longitudinal axis.

22. The manifold of any preceding clause, further comprising a fourth channel extending through the connection portion, the fourth channel defining a fourth channel longitudinal axis, wherein the fourth channel within the connection portion is oblique to the first channel and the second channel.

23. The manifold of any preceding clause, wherein the fourth channel is configured to receive the flow of air.

24. The manifold of any preceding clause, wherein the fourth channel is in fluid communication with the air inlet port.

25. The manifold of any preceding clause, wherein a third portion of the block defines a grease port, wherein the first channel is in fluid communication with the grease port.

26. The manifold of any preceding clause, wherein the second channel is in fluid communication with the grease port.

27. A multiple component adhesive mixing system comprising: a mixing component configured to mix a first substance and a second substance; and a manifold component connectable to the mixing component, the manifold component having an exit portion comprising: a connection portion defining a connection portion longitudinal axis; a first channel extending through the connection portion, the first channel defining a first channel longitudinal axis, the first channel is configured to receive the first substance; a second channel extending through the connection portion, the second channel defining a second channel longitudinal axis, the second channel is configured to receive the second substance; and a third channel extending through the connection portion, the third channel defining a third channel longitudinal axis, the third channel is configured to receive a first flow of air, wherein the first channel within the connection portion is oblique to the connection portion longitudinal axis, wherein the second channel within the connection portion is oblique to the connection portion longitudinal axis, and wherein the third channel within the connection portion is oblique to the first channel and the second channel.

28. The multiple component adhesive mixing system of any preceding clause, wherein the mixing component includes an inlet portion.

29. The multiple component adhesive mixing system of any preceding clause, wherein the exit portion of the manifold component is connectable to the inlet portion of the mixing component.

30. The multiple component adhesive mixing system of any preceding clause, wherein the inlet portion of the mixing component defines a diameter of approximately 0.657 inches.

31. The multiple component adhesive mixing system of any preceding clause, wherein the connection portion defines a diameter of approximately 0.75 inches.

32. The multiple component adhesive mixing system of any preceding clause, wherein the connection portion includes a nose portion that has a diameter smaller than the connection portion, wherein the nose portion defines a diameter of approximately 0.655 inches.

33. The multiple component adhesive mixing system of any preceding clause, wherein the mixing component is a static mixing tip.

34. An exit portion of a manifold configured for a first substance and a second substance to travel therethrough, the exit portion comprising: a connection portion defining a connection portion longitudinal axis; a first channel extending through the connection portion, the first channel defining a first channel longitudinal axis; a second channel extending through the connection portion, the second channel defining a second channel longitudinal axis; and a third channel extending through the connection portion, the third channel defining a third channel longitudinal axis, wherein the first channel within the connection portion is parallel to the connection portion longitudinal axis, wherein the second channel within the connection portion is parallel to the connection portion longitudinal axis, and wherein the third channel within the connection portion is parallel to the connection portion longitudinal axis.

35. The exit portion of any preceding clause, wherein the first channel is configured to receive the first substance.

36. The exit portion of any preceding clause, wherein the second channel is configured to receive the second substance.

37. The exit portion of any preceding clause, wherein the third channel is configured to receive a flow of air.

38. The exit portion of any preceding clause, wherein the first substance is a first part of a multiple component adhesive and the second substance is a second part of the multiple component adhesive.

39. The exit portion of any preceding clause, further comprising a fourth channel extending through the connection portion, the fourth channel defining a fourth channel longitudinal axis, wherein the fourth channel within the connection portion is parallel to the connection portion longitudinal axis.

40. The exit portion of any preceding clause, wherein the fourth channel is configured to receive the flow of air.

41. The exit portion of any preceding clause, wherein the connection portion defines a diameter of approximately 0.75 inches.
42. The exit portion of any preceding clause, wherein the connection portion includes a nose portion that has a diameter smaller than the connection portion, wherein the nose portion defines a diameter of approximately 0.655 inches.
43. The exit portion of any preceding clause, wherein the connection portion comprises a threaded connection portion.
44. The exit portion of any preceding clause, wherein the connection portion comprises a twist lock securing tab connection portion.
45. The exit portion of any preceding clause, wherein a distance between the first channel longitudinal axis and the second channel longitudinal axis at the exit portion is approximately 0.31 inches.
46. In combination: an exit portion of a manifold configured for a first substance and a second substance to travel therethrough, the exit portion comprising: a connection portion defining a connection portion longitudinal axis; a first channel extending through the connection portion, the first channel defining a first channel longitudinal axis; and a second channel extending through the connection portion, the second channel defining a second channel longitudinal axis; and an insert removably connectable to the second channel, the insert defining an insert channel, wherein a diameter of the insert channel is less than a diameter of the second channel.
47. The combination of any preceding clause, wherein with the insert connected to the second channel, a first distance between an outlet of the insert channel and a first channel outlet of the first channel is greater than a second distance between a second channel outlet of the second channel and the first channel outlet of the first channel.
48. The combination of any preceding clause, wherein with the insert connected to the second channel, an outlet of the insert channel is spaced a greater distance from the connection portion than a first channel outlet of the first channel.
49. The combination of any preceding clause, wherein with the insert connected to the second channel, an outlet of the insert channel is located closer to the connection portion longitudinal axis than a first channel outlet of the first channel and a second channel outlet of the second channel.
50. The combination of any preceding clause, wherein the first channel is configured to receive the first substance.
51. The combination of any preceding clause, wherein the second channel is configured to receive the second substance.
52. The combination of any preceding clause, wherein a first viscosity of the first substance is higher than a second viscosity of the second substance.
53. The combination of any preceding clause, wherein with the insert connected to the second channel, the insert channel is configured to restrict a flow of the second substance through the insert channel.
54. The combination of any preceding clause, wherein with the insert connected to the second channel, the insert channel is configured to increase pressure of a flow of the second substance through the insert channel.
55. The combination of any preceding clause, wherein with the insert connected to the second channel, the insert is configured to promote more efficient mixing of the second substance with the first substance.
56. The combination of any preceding clause, wherein with the insert connected to the second channel, the second channel and the insert together define a longer length than the first channel.
57. The combination of any preceding clause, wherein the insert includes a removal portion configured to remove the insert from the second channel.
58. In combination: an exit portion of a manifold configured for a first substance and a second substance to travel therethrough, the exit portion comprising: a connection portion defining a connection portion longitudinal axis; a first channel extending through the connection portion, the first channel defining a first channel longitudinal axis; and a second channel extending through the connection portion, the second channel defining a second channel longitudinal axis; a first insert removably connectable to the second channel, the first insert defining a first insert channel, wherein the first insert channel defines a first length and a first diameter, wherein the first diameter of the first insert channel is less than a diameter of the second channel; and a second insert removably connectable to the second channel, the second insert defining a second insert channel, wherein the second insert channel defines a second length and a second diameter, wherein the second diameter of the second insert channel is less than a diameter of the second channel, and wherein the second length and the second diameter of the second insert channel are different than the first length and the first diameter of the first insert channel.
59. An exit portion of a manifold configured for a first substance and a second substance to travel therethrough, the exit portion comprising: a connection portion defining a connection portion longitudinal axis, the connection portion including an external connection portion; a first channel extending through the connection portion, the first channel defining a first channel longitudinal axis, wherein the first channel defines a first channel internal connection portion; and a second channel extending through the connection portion, the second channel defining a second channel longitudinal axis, wherein the second channel defines a second channel internal connection portion.
60. The exit portion of any preceding clause, further comprising a mixing tip removably connectable to the external connection portion.
61. The exit portion of any preceding clause, further comprising an insert removably connectable to the first channel internal connection portion.
62. The exit portion of any preceding clause, wherein the insert defines an insert channel, wherein a diameter of the insert channel is less than a diameter of the first channel.
63. The exit portion of any preceding clause, wherein with the insert connected to the first channel, an outlet of the insert channel is spaced a greater distance from the connection portion than a second channel outlet of the second channel.
64. The exit portion of any preceding clause, wherein the first channel is configured to receive the first substance.
65. The exit portion of any preceding clause, wherein the second channel is configured to receive the second substance.

66. The exit portion of any preceding clause, wherein a first viscosity of the first substance is lower than a second viscosity of the second substance.

67. The exit portion of any preceding clause, wherein with the insert connected to the first channel, the insert channel is configured to increase pressure of a flow of the first substance through the insert channel.

68. The exit portion of any preceding clause, wherein with the insert connected to the first channel, the insert is configured to promote more efficient mixing of the first substance with the second substance.

69. The exit portion of any preceding clause, wherein the insert includes a removal portion configured to remove the insert from the first channel.

70. An exit portion of a manifold configured for a first substance and a second substance to travel therethrough, the exit portion comprising: a connection portion defining a connection portion longitudinal axis; a first channel extending through the connection portion, the first channel defining a first channel longitudinal axis; a second channel extending through the connection portion, the second channel defining a second channel longitudinal axis; a third channel extending through the connection portion, the third channel defining a third channel longitudinal axis; and a valve assembly disposed at an exit portion of the third channel, the valve assembly transitionable between a closed position and an open position.

71. The exit portion of any preceding clause, wherein the first channel is configured to receive the first substance.

72. The exit portion of any preceding clause, wherein the second channel is configured to receive the second substance.

73. The exit portion of any preceding clause, wherein the third channel is configured to receive a flow of air, and wherein with the valve assembly in the closed position the flow of air cannot flow through the valve assembly and with the valve assembly in the open position the flow of air is able to flow out the valve assembly and the third channel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An exit portion of a manifold configured for a first substance and a second substance to travel therethrough, the exit portion comprising:

a connection portion defining a connection portion longitudinal axis;

a first channel extending through the connection portion, the first channel defining a first channel longitudinal axis;

a second channel extending through the connection portion, the second channel defining a second channel longitudinal axis;

a third channel extending through the connection portion, the third channel defining a third channel longitudinal axis; and a fourth channel extending through the connection portion, the fourth channel defining a fourth channel longitudinal axis, wherein the first channel within the connection portion is oblique to the connection portion longitudinal axis, wherein the second channel within the connection portion is oblique to the connection portion longitudinal axis, wherein the third channel within the connection portion is oblique to the first channel and the second channel, and wherein the fourth channel within the connection portion is oblique to the first channel and the second channel, and wherein the first channel is configured to receive the first substance, wherein the second channel is configured to receive the second substance, and wherein the third channel is configured to receive a flow of air.

2. The exit portion of claim 1, wherein the first substance is a first part of a multiple component adhesive and the second substance is a second part of the multiple component adhesive.

3. The exit portion of claim 1, wherein the third channel is parallel to the connection portion longitudinal axis.

4. The exit portion of claim 1, wherein the third channel is oblique to the connection portion longitudinal axis.

5. The exit portion of claim 1, wherein the fourth channel is configured to receive the flow of air.

6. The exit portion of claim 1, wherein the connection portion defines a diameter of approximately 0.75 inches.

7. The exit portion of claim 6, wherein the connection portion includes a nose portion that has a diameter smaller than the connection portion, wherein the nose portion defines a diameter of approximately 0.655 inches.

8. The exit portion of claim 1, wherein the connection portion comprises a threaded connection portion.

9. The exit portion of claim 1, wherein the connection portion comprises a twist lock securing tab connection portion.

10. The exit portion of claim 1, wherein a distance between the first channel longitudinal axis and the second channel longitudinal axis at the exit portion is approximately 0.31 inches.

11. A manifold for a first substance and a second substance to travel therethrough, the manifold comprising:

a block having an inlet portion and an exit portion, the exit portion comprising a connection portion defining a connection portion longitudinal axis, wherein a first portion of the block defines an air inlet port;

a first channel extending through the connection portion, the first channel defining a first channel longitudinal axis;

a second channel extending through the connection portion, the second channel defining a second channel longitudinal axis;

a third channel extending through the connection portion, the third channel defining a third channel longitudinal axis, wherein the third channel is in fluid communication with the air inlet port; and a fourth channel extending through the connection portion, the fourth channel defining a fourth channel longitudinal axis, wherein the first channel within the connection portion is oblique to the connection portion longitudinal axis, wherein the second channel within the connection portion is oblique to the connection portion longitudinal axis, wherein the third channel within the connection portion is oblique to the first channel and the second channel, and wherein the fourth channel within the connection portion is oblique to the first channel and the second channel, and wherein the first channel is configured to receive the first substance, wherein the second channel is configured to receive the second substance, and wherein the third channel is configured to receive a flow of air.

12. The manifold of claim 11, wherein the first substance is a first part of a multiple component adhesive and the second substance is a second part of the multiple component adhesive.

13. The manifold of claim 11, wherein the third channel is parallel to the connection portion longitudinal axis.

14. The manifold of claim 11, wherein the third channel is oblique to the connection portion longitudinal axis.

15. The manifold of claim 11, wherein the fourth channel is configured to receive the flow of air.

16. The manifold of claim 11, wherein the fourth channel is in fluid communication with the air inlet port.

17. The manifold of claim 16, wherein a third portion of the block defines a grease port, wherein the first channel is in fluid communication with the grease port.

18. The manifold of claim 17, wherein the second channel is in fluid communication with the grease port.

19. An exit portion of a manifold configured for a first substance and a second substance to travel therethrough, the exit portion comprising:

a connection portion defining a connection portion longitudinal axis;

a first channel extending through the connection portion, the first channel defining a first channel longitudinal axis;

a second channel extending through the connection portion, the second channel defining a second channel longitudinal axis; and a third channel extending through the connection portion, the third channel defining a third channel longitudinal axis; and a fourth channel extending through the connection portion, the fourth channel defining a fourth channel longitudinal axis, wherein the first channel within the connection portion is parallel to the connection portion longitudinal axis, wherein the second channel within the connection portion is parallel to the connection portion longitudinal axis, wherein the third channel within the connection portion is parallel to the connection portion longitudinal axis, and wherein the fourth channel within the connection portion is parallel to the first channel and the second channel, and wherein the first channel is configured to receive the first substance, wherein the second channel is configured to receive the second substance, and wherein the third channel is configured to receive a flow of air.

20. The exit portion of claim 19, wherein the first substance is a first part of a multiple component adhesive and the second substance is a second part of the multiple component adhesive.

21. The exit portion of claim 19, wherein the fourth channel is configured to receive the flow of air.

22. The exit portion of claim 19, wherein the connection portion defines a diameter of approximately 0.75 inches.

23. The exit portion of claim 22, wherein the connection portion includes a nose portion that has a diameter smaller than the connection portion, wherein the nose portion defines a diameter of approximately 0.655 inches.

24. The exit portion of claim 19, wherein the connection portion comprises a threaded connection portion.

25. The exit portion of claim 19, wherein the connection portion comprises a twist lock securing tab connection portion.

26. The exit portion of claim 19, wherein a distance between the first channel longitudinal axis and the second channel longitudinal axis at the exit portion is approximately 0.31 inches.

27. In combination:

an exit portion of a manifold configured for a first substance and a second substance to travel therethrough, the exit portion comprising:

a connection portion defining a connection portion longitudinal axis;

a first channel extending through the connection portion, the first channel defining a first channel longitudinal axis; and a second channel extending through the connection portion, the second channel defining a second channel longitudinal axis; and an insert removably connectable to the second channel, the insert defining an insert channel, wherein a diameter of the insert channel is less than a diameter of the second channel, wherein with the insert connected to the second channel, an outlet of the insert channel is located closer to the connection portion longitudinal axis than a first channel outlet of the first channel and a second channel outlet of the second channel.

28. The combination of claim 27, wherein the first channel is configured to receive the first substance.

29. The combination of claim 28, wherein the second channel is configured to receive the second substance.

30. The combination of claim 29, wherein a first viscosity of the first substance is higher than a second viscosity of the second substance.

31. The combination of claim 29, wherein with the insert connected to the second channel, the insert channel is configured to restrict a flow of the second substance through the insert channel.

32. The combination of claim 29, wherein with the insert connected to the second channel, the insert channel is configured to increase pressure of a flow of the second substance through the insert channel.

33. The combination of claim 29, wherein with the insert connected to the second channel, the insert is configured to promote more efficient mixing of the second substance with the first substance.

34. The combination of claim 27, wherein with the insert connected to the second channel, the second channel and the insert together define a longer length than the first channel.

35. The combination of claim 27, wherein the insert includes a removal portion configured to remove the insert from the second channel.

* * * * *